United States Patent [19]

Baker et al.

[11] Patent Number: 5,327,291
[45] Date of Patent: Jul. 5, 1994

[54] COMPACT OBJECTIVE LENS

[75] Inventors: James G. Baker, Bedford, N.H.; William T. Plummer; Jon Van Tassell, both of Concord, Mass.

[73] Assignee: Polaroid Corporation, Cambridge, Mass.

[21] Appl. No.: 860,401

[22] Filed: Mar. 30, 1992

[51] Int. Cl.$^5$ .............................. G02B 3/02; G02B 9/04
[52] U.S. Cl. ..................................... 359/716; 359/717; 359/740; 359/793; 359/794
[58] Field of Search ................... 359/793-794, 359/740, 716-717, 715, 771, 772, 791, 792

[56] References Cited

U.S. PATENT DOCUMENTS

| | | | |
|---|---|---|---|
| 682,017 | 9/1901 | Aldis . | |
| 697,959 | 4/1902 | Abbe . | |
| 706,650 | 8/1902 | Goerz . | |
| 2,586,418 | 9/1950 | Davis | 88/57 |
| 2,721,501 | 10/1955 | Bertele | 88/57 |
| 3,185,061 | 8/1962 | Westphalen | 95/45 |
| 3,388,650 | 12/1964 | Westphalen | 95/44 |
| 3,604,786 | 9/1971 | Baker | 350/212 |
| 3,784,287 | 1/1974 | Grey | 350/226 |
| 3,967,884 | 7/1976 | De Jager | 350/226 |
| 4,174,153 | 11/1979 | Laurent | 350/184 |
| 4,394,071 | 7/1983 | Yamada | 350/422 |
| 4,443,067 | 4/1984 | Owen, Jr. | 350/422 |
| 4,505,566 | 3/1985 | Noguchi | 354/400 |
| 4,542,961 | 9/1985 | Sato | 350/475 |
| 4,561,730 | 12/1985 | Lawson et al. | 359/715 |
| 4,645,311 | 2/1987 | Rothe | 350/432 |
| 4,669,848 | 6/1987 | Wakabayashi | 354/400 |
| 4,791,441 | 12/1988 | Nishi et al. | 354/195.12 |
| 4,830,474 | 5/1989 | Nakayama et al. | 350/422 |
| 4,832,470 | 5/1989 | Wakamiya | 350/453 |
| 4,913,537 | 4/1990 | Takase | 350/422 |
| 4,932,764 | 6/1990 | Simpson, Jr. | 350/441 |
| 5,000,552 | 3/1991 | Simpson, Jr. | 350/480 |
| 5,005,038 | 4/1991 | Ogawa et al. | 354/400 |

FOREIGN PATENT DOCUMENTS 3242608 10/1991 Japan .

OTHER PUBLICATIONS

"The Triplet Lens and Its Modifications", -R. Kingslake, A History of the Photographic Lens, Academic Press, Inc., Chapter 7, pp. 103-115, 1989.

Primary Examiner—Bruce Y. Arnold
Assistant Examiner—James Phan
Attorney, Agent, or Firm—Francis J. Caufield

[57] ABSTRACT

A lens system for a folding reflex camera is provided. The system includes: (a) a first group on the object side of the system's stop which (i) has a positive dioptric power, (ii) includes an aspheric surface, and (iii) has a concave surface adjacent to the stop; and (b) a second group on the image side of the stop consisting of either a single positive component or the combination of a single positive component and one or more focusing elements. The system includes at least two elements made of materials differing in dispersive powers where at least one of the elements is of plastic. The system can comprise just two plastic elements and even with such a simple configuration achieves excellent optical performance including a relatively flat field, relatively low distortion, and at least partial correction for lateral chromatic aberration.

18 Claims, 43 Drawing Sheets

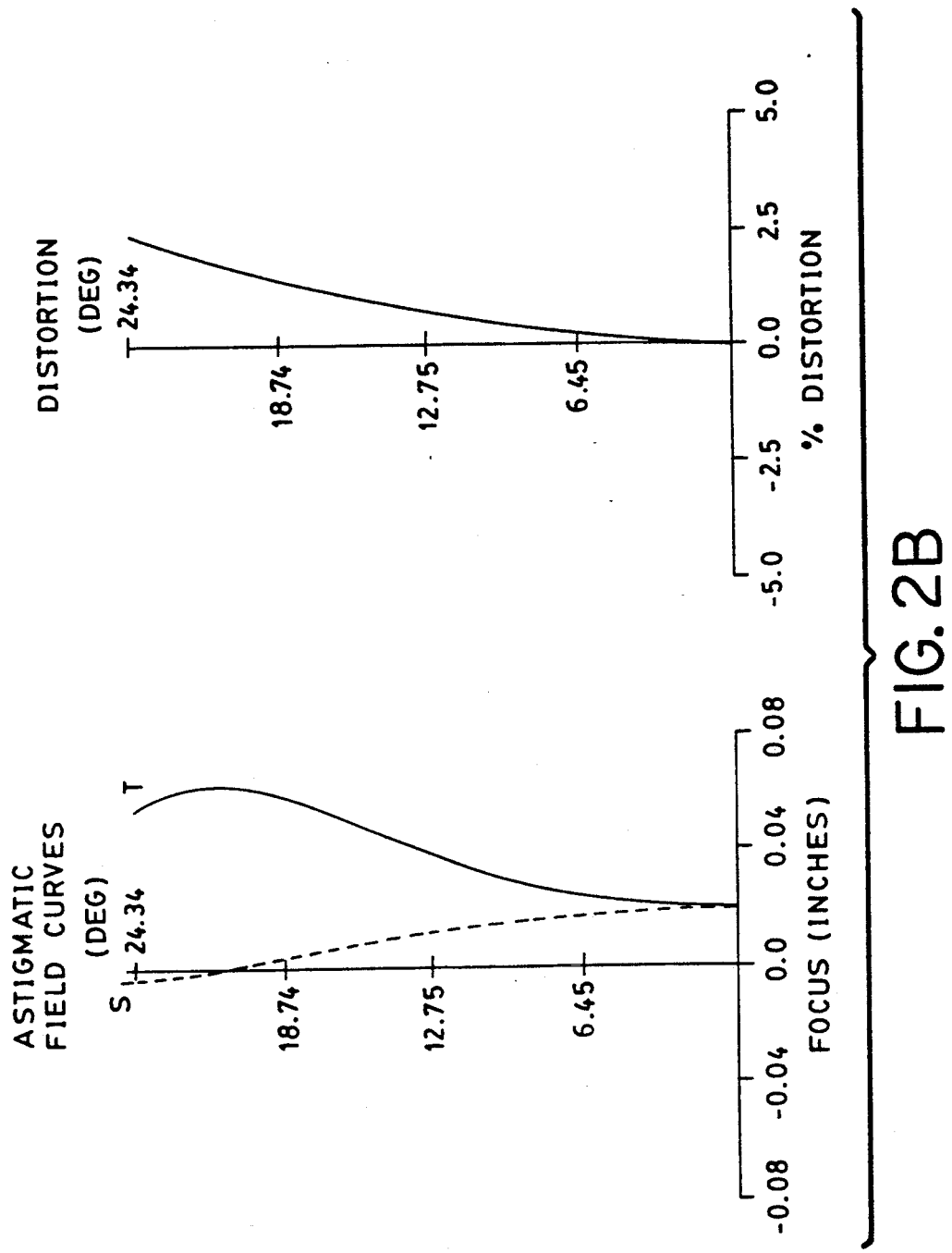

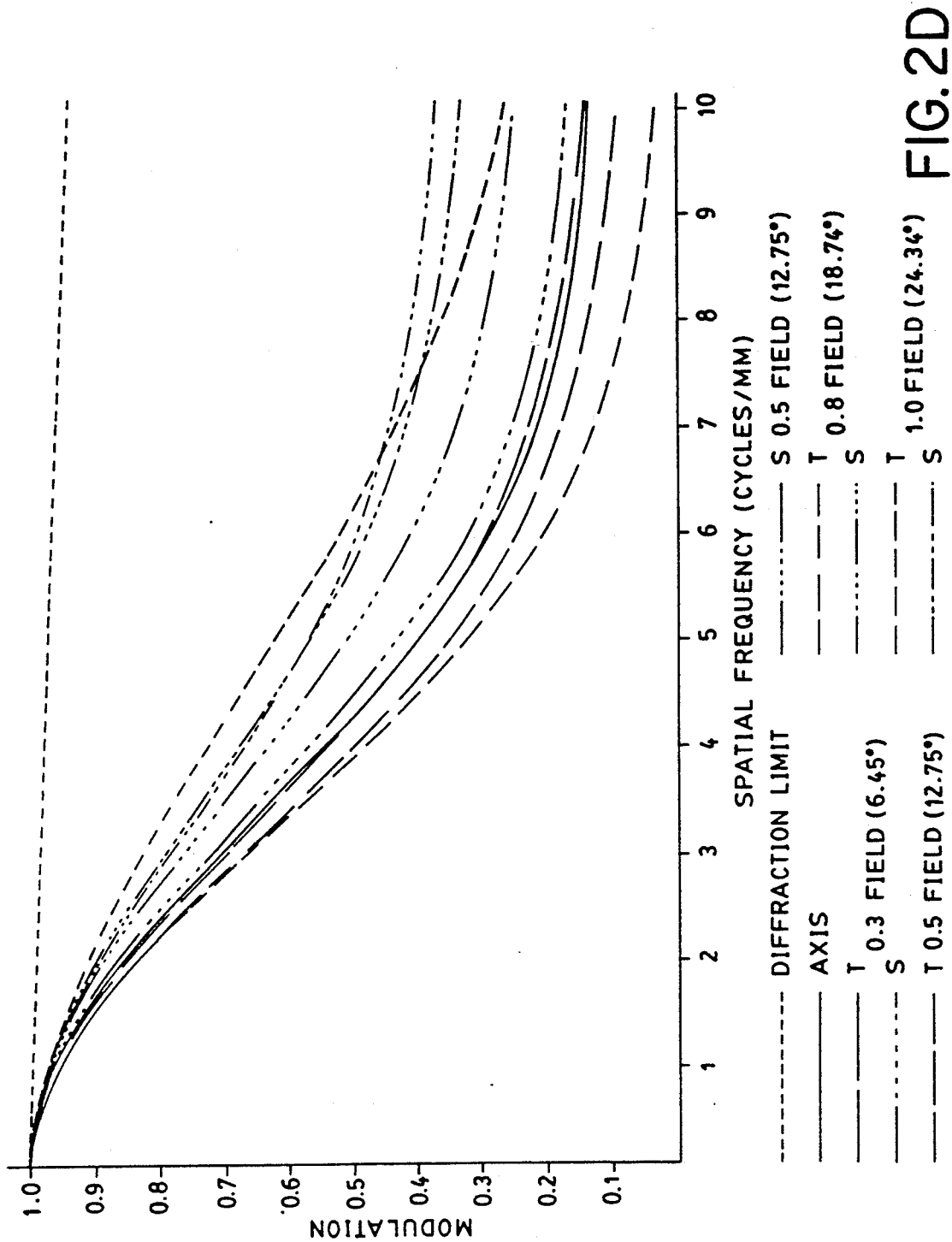

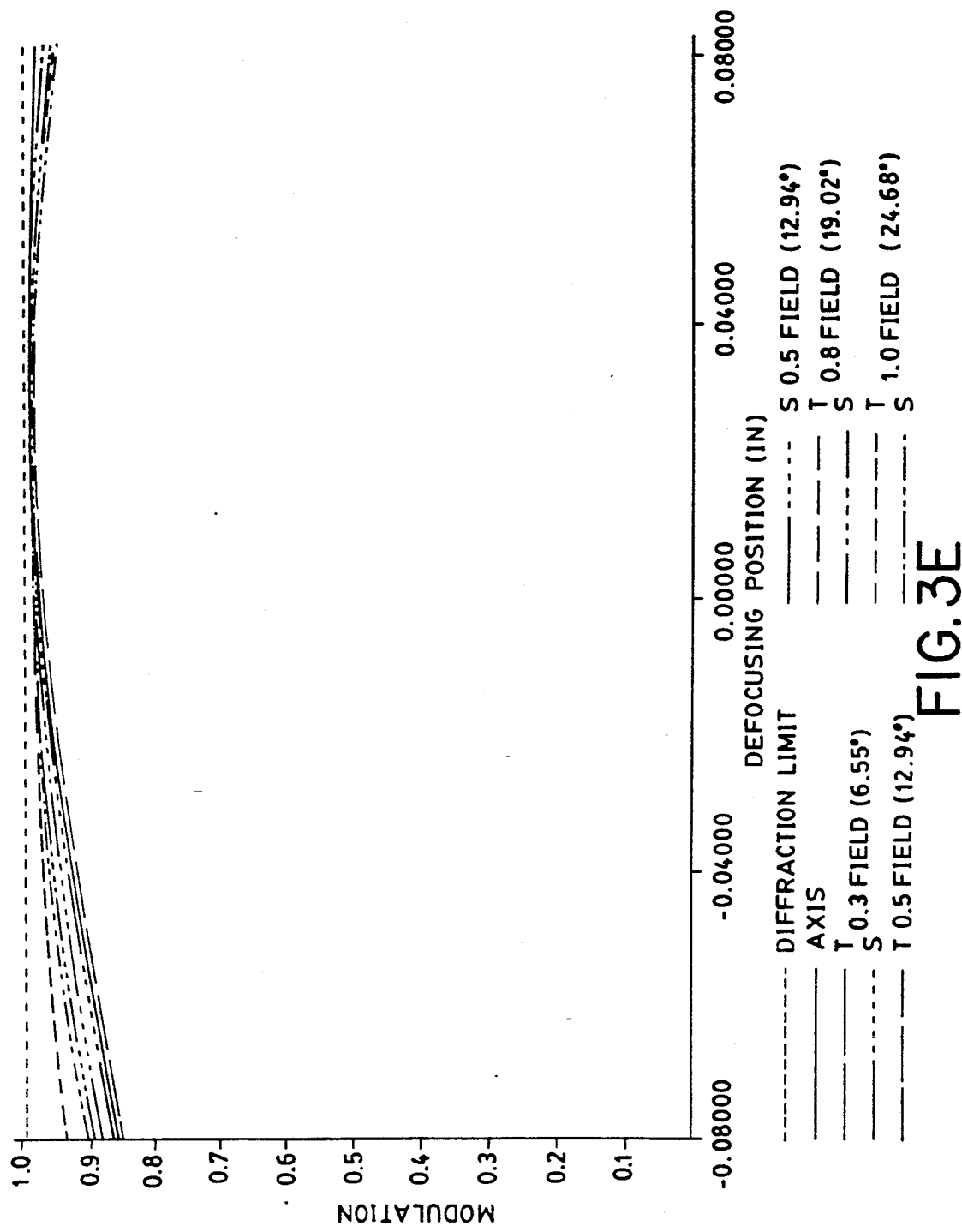

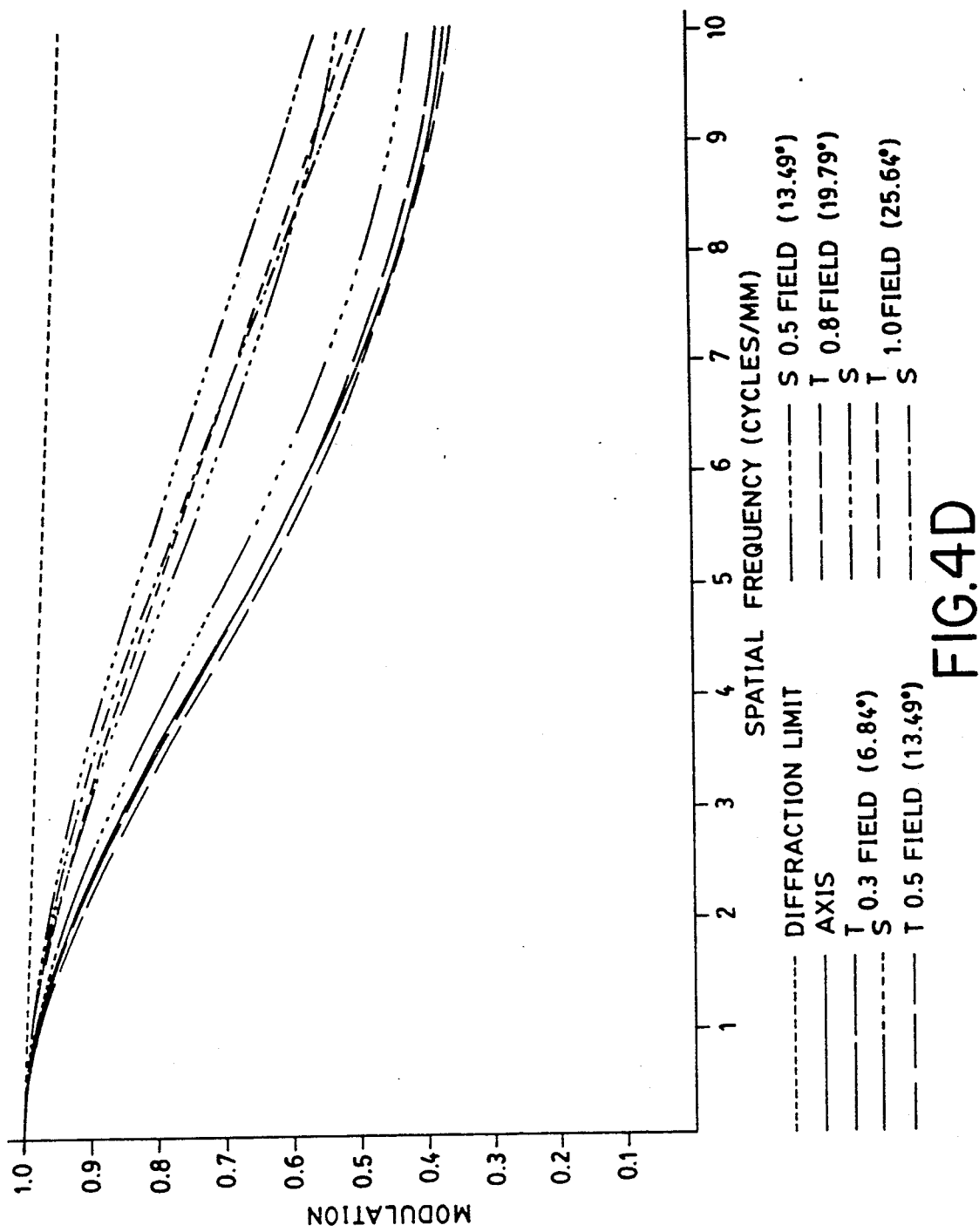

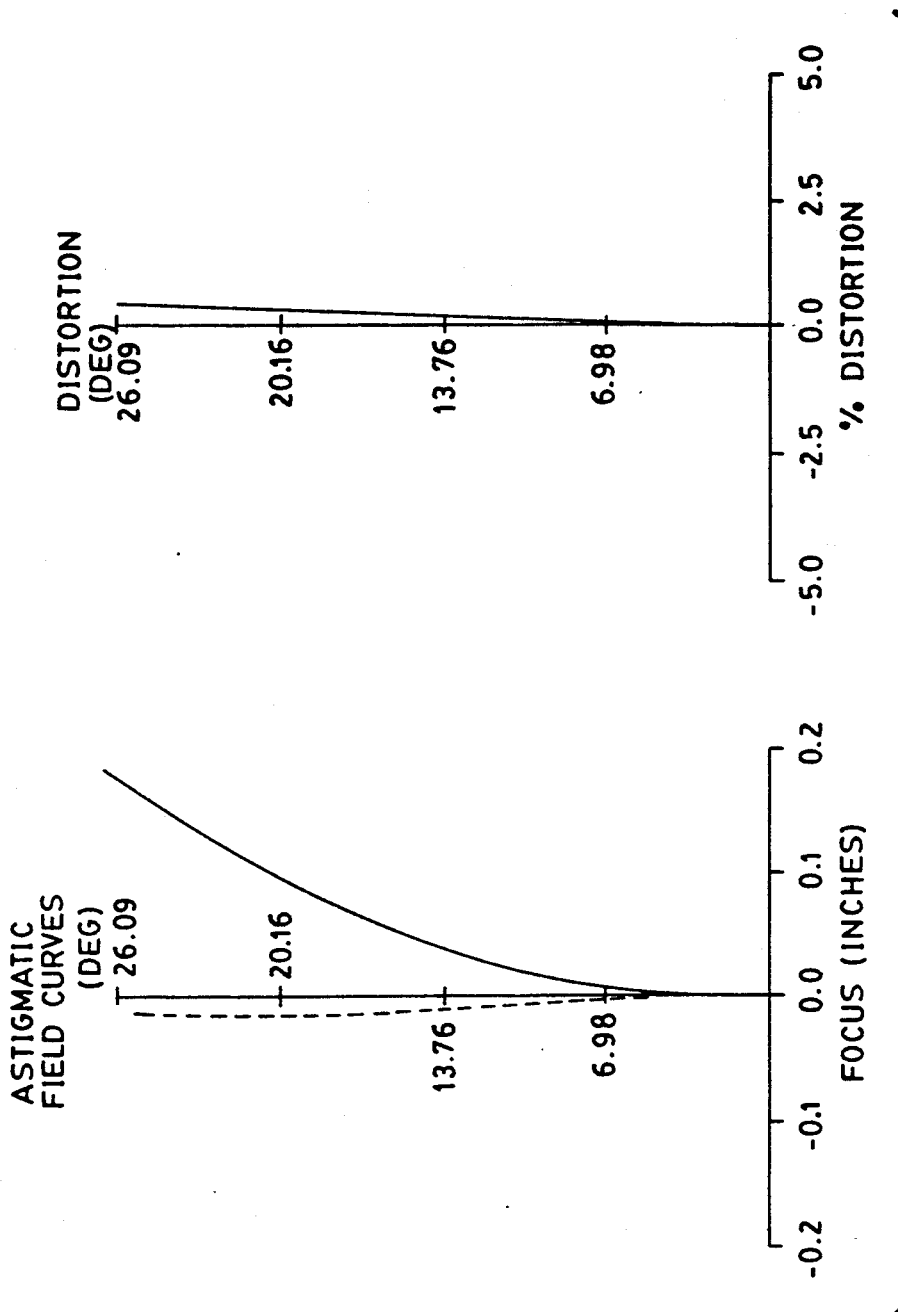

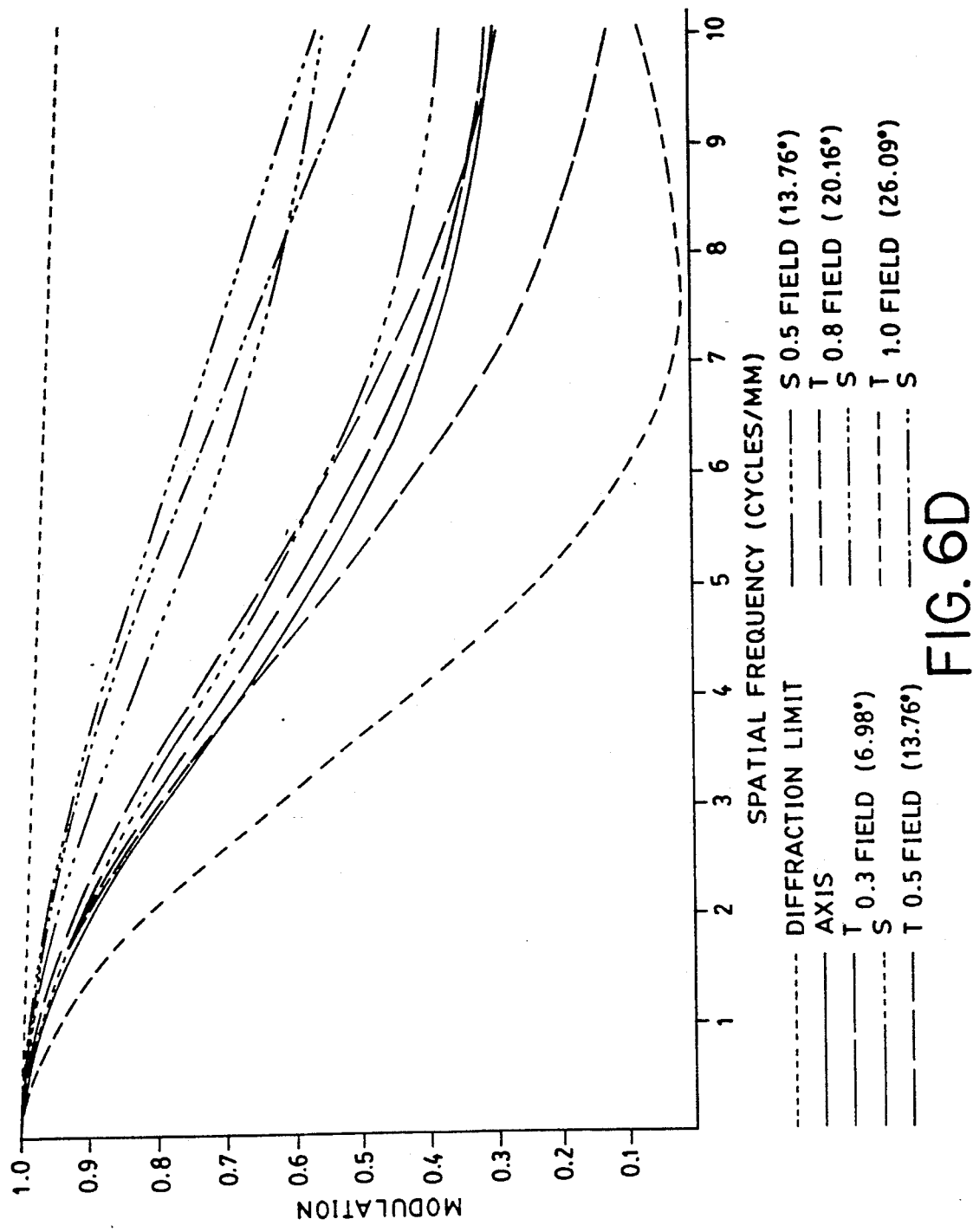

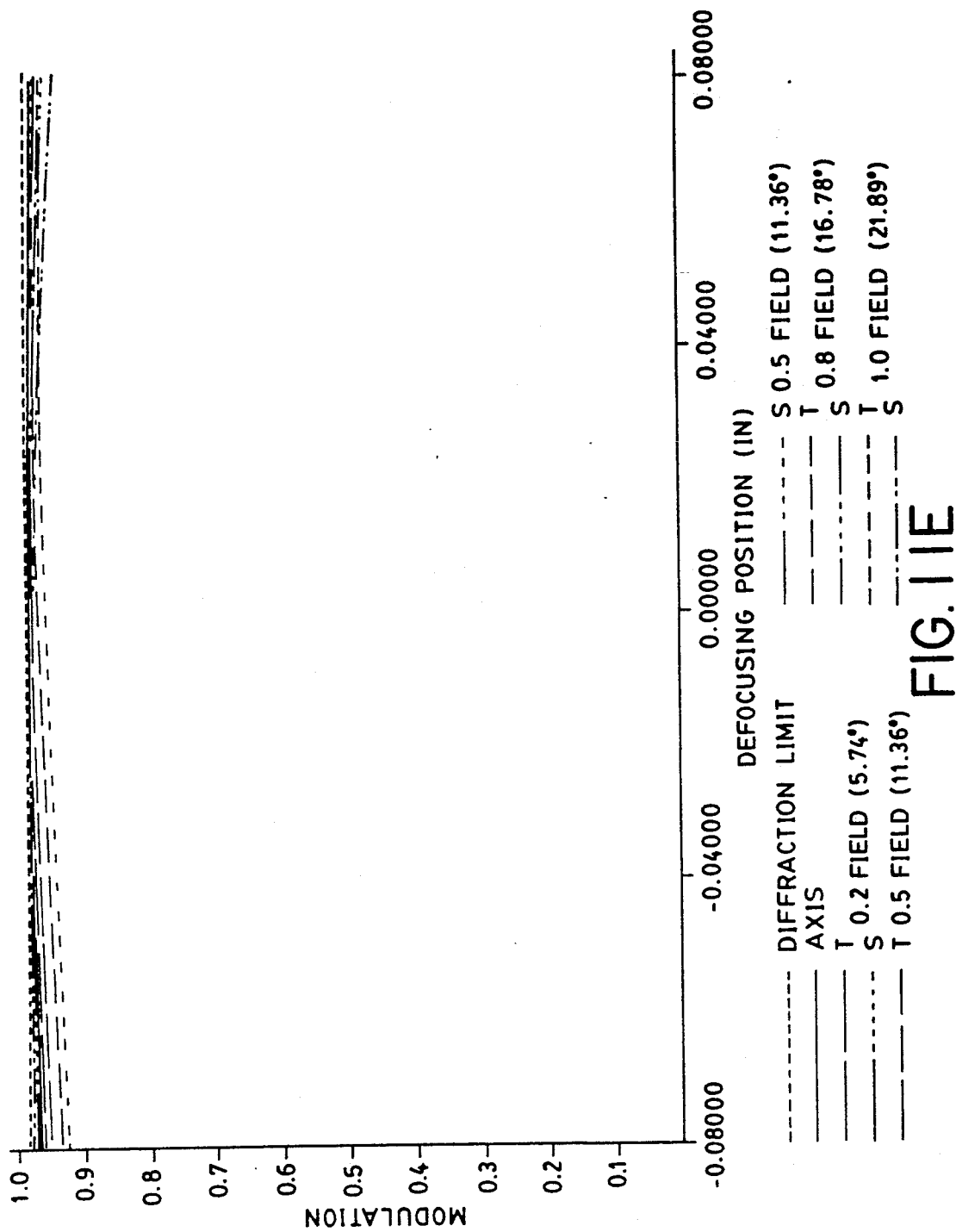

COMPACT OBJECTIVE LENS

FIELD OF THE INVENTION

This invention relates to objective lens systems for use in cameras and, in particular, to objective lens systems for use in folding, reflex cameras.

BACKGROUND OF THE INVENTION

1. Description of the Prior Art

Numerous objective lens systems for cameras have been proposed. Examples employing two elements include Simpson, Jr. et al., U.S. Pat. Nos. 4,932,764 and 5,000,552, and Davis, U.S. Pat. No. 2,586,418. See also Aldis, U.S. Pat. No. 682,017, discussed below. A two element lens for use in a copying machine, as opposed to a camera, is disclosed in Japanese Patent Publication No. 3-242608. Similarly, Rothe, U.S. Pat. No. 4,645,311, discloses a two element design including an aspheric surface for use in an optical scanner.

Three element designs include Bertele, U.S. Pat. No. 2,721,501, Grey, U.S. Pat. No. 3,784,287, De Jager, U.S. Pat. No. 3,967,884, and Sato, U.S. Pat. No. 4,542,961 in which an aspheric surface is used, as well as the early Cooke/Taylor triplet and variations thereof. See Kingslake, R., *A History of the Photographic Lens*, Academic Press, New York, 1989, pages 103-115.

The incorporation of a focusing element or group in an objective lens system is disclosed in the following patents: Westphalen, U.S. Pat. Nos. 3,185,061 and 3,388,650, Laurent, U.S. Pat. No. 4,174,153, Yamada, U.S. Pat. No. 4,394,071, Owen, Jr. et al., U.S. Pat. No. 4,443,067, Wakabayashi, U.S. Pat. No. 4,669,848, Nishi et al., U.S. Pat. No. 4,791,441, Nakayama et al., U.S. Pat. No. 4,830,474, Takase, U.S. Pat. No. 4,913,537, and Ogawa et al., U.S. Pat. No. 5,005,038. A construction of this general type for use in a viewfinder is disclosed in Wakamiya, U.S. Pat. No. 4,832,470. A magnifying lens employing an aspheric surface for attachment to the objective of a camera is disclosed in Baker, U.S. Pat. No. 3,604,786, and the use of an auxiliary lens for short range work is disclosed in Noguchi, U.S. Pat. No. 4,505,566.

Also of interest is U.S. Pat. No. 697,959, dated Apr. 22, 1902 to Ernst Abbe. He discusses how an aspheric surface can be used to improve far off-axis performance of a landscape type lens (cemented doublet and stop).

Notwithstanding the variety of objective lens systems which have been previously proposed, there still exists a need for lens systems of relatively simple construction which can be mass produced at low cost. In particular, such systems are needed in the field of multiple purpose hand cameras which are used by individuals and families, as well as for commercial applications, such as in the preparation of advertisements and the like, where small scale photographs of good to excellent quality can be useful and economic.

The present invention addresses this need and provides objective lens systems which 1) contain a minimum number of elements, 2) can be manufactured at low cost, and 3) have optical and physical properties suitable for use in a mass produced camera.

2. Design Principles

As is known from basic optical principles, even a simple, single lens element with spherical surfaces possesses a paraxial image position conjugate to an object distance, and an equivalent focal length, which together comprise the element's "Gaussian" optics of first order magnitude. For a rotational lens system, the usual case for practical objectives intended for mass production, there are no second order aberrations.

The chromatic variations of both image location and image size, that is to say, longitudinal and lateral chromatic aberrations, can be construed as of third order in magnitude. For the monochromatic third order of approximation and, in particular, for the development of a power series which represent the x and y intercepts on the image surface of a light ray from an object point after transit through the optical system, there will be five independent mathematical coefficients of series terms which represent the conditions to be reduced essentially to zero or at least to optimized small non-zero values. These "Seidel" coefficients in physical meaning have to do with spherical aberration, coma, astigmatism, curvature of field, and distortion.

The development of the associated power series can be carried out in explicit formulations of object distance, curvature of the object surface if any, off-axis position of the object point, intercepts of a given ray in the entrance pupil, or the equivalent in image space, and the like. Thus, the x and y intercepts of a given ray on a desired image surface can be given as a power series in 5 variables, one of which is the wavelength, or in 4 variables monochromatically, or even in 3 if rotational relationships are employed. The variables may be simple, as for example the direction of the object point as seen from the center of the entrance pupil (2 variables), and the x and y intercepts of a ray from the object point on the entrance pupil, or in terms of selected functions of the simple variables. The design task if formulated in simplest terms is to bring all rays from an object point into sharp focus at an image point. The location of the image point may not be exactly where desired but may include a displacement in x, y and z according to allowable tolerances. For example, a lateral displacement in the image surface may be permitted to some degree, in the nature of distortion, one of the Seidel conditions.

In the fifth order of approximation one encounters nine monochromatic aberrations, plus chromatic variations of the five Seidel conditions, and secondary chromatic variations of the image position in longitudinal displacement, as well as secondary chromatic variations of magnification, or of the equivalent focal length if the object plane lies at infinity. Higher orders of power series approximation have been worked out by various theorists, but the complexities of solution are such as to confine the higher order formulas generally to analysis rather than to synthesis of optical structures.

The above mentioned power series contain the basic parameters of construction of the optical system, such as the radii of curvature of the multiple surfaces, the axial spacings of the surfaces, the indices of refraction of the media used, including the wavelength dependence in some mathematical form, and if any particular surface is aspheric, that is, nonspherical, the aspheric coefficients that define the shape of the surface according to the order of approximation. The object of the invention is thus to select a set of parameters which can be used to cost-effectively to produce an objective lens system which can be successfully employed for family or general purpose applications and the like.

3. Historic Lens Designs

In the past, so-called landscape lenses have combined a single meniscus lens element with spherical surfaces with a stop at an optimum location in the lens barrel, such that one can say that the meniscus is curved in a general sense about the stop. Even if the aperture-ratio is quite limited, as for example, f/16 or slower, such a landscape lens is afflicted with distortion. With the stop forward, the distortion is barrel in nature, and if the stop is rearward of the meniscus, the distortion is pin-cushion. If the stop is rearward, the overall length is accordingly reduced. In addition, compromises have to be made with curvature of field, chromatic aberrations, astigmatism and residual aberrations of spherical aberration and coma. Nevertheless, vast numbers of family photographs have been made by means of such simplified objectives, optimized as well as may be from the complex of considerations.

In accordance with the invention, it has been found that the optical performance can be improved even for a plastic material having a relatively low index and moderate dispersion characteristics by means of at least one surface of the meniscus becoming aspheric. Use of an aspheric of optimum shape has been found to reduce distortion and to reduce astigmatism to a level sufficient to flatten the mean image surface. By means of modern manufacturing techniques known in the art the use of at least one aspheric surface per plastic element is practical for mass production.

As discussed in detail below, the photographic objective of the present invention has two lens groups, one before a centrally located stop and one after. Thus, in general terms, it can be considered to resemble that of the Aldis lens (see Aldis, U.S. Pat. No. 682,017, issued Sep. 3, 1901).

Symmetrical or nearly symmetrical objectives of two meniscus elements enclosing a central stop are known in the art and have many uses, particularly for medium to wide angle performance where a "slow" lens may be used. The well-known "Hypergon", U.S. Pat. No. 706,650 by Carl Paul Goerz, which at a high aperture-ratio such as f/60 can cover very wide angle fields on a nearly flat image surface, uses this approach. The symmetry of the arrangement eliminates most of the coma even for an infinite object distance, although not entirely. The very restrictive central stop reduces the spherical aberration and longitudinal chromatic aberrations to manageable proportions and the rest of the residual coma as well. The effectiveness of the thin Hypergon menisci arises from the near optical cancellation of the convex and adjacent concave surfaces of the individual meniscus, the power, though low, coming partly from the separation of the convex and concave surfaces, that is, from the thickness of the individual meniscus. An optimization causes the tangential and radial image surfaces to lie close to a mean nearly flat image surface and to one another as well.

A difficulty with the more or less symmetrical double meniscus form is that the principal points and indeed the perspective center lie more or less within a rather long lens barrel. The overall length of the objective from front surface vertex to the axial point of the image surface is thereby greater than the equivalent focal length, resulting usually in a lack of compactness in the camera itself. Indeed, an important requirement of the modern hand camera is compactness. Another requirement is that the clear apertures of front and rear surfaces be relatively modest which means that the menisci cannot be very far from the central stop, front and rear, if an adequate field of view is to be covered.

Unsymmetrical objectives employing at least one strong meniscus component preceding the stop, which in some cases is only a single element, are also known in the art. This structure enhances several characteristics of the front element of the Hypergon. The inner concave surface opposed to and lying at a moderate axial distance from the stop provides to some extent for a reduced Petzval sum and reduction in astigmatism caused by the meniscus component as a whole, while at the same time a substantial thickness of the meniscus component preserves much of the net lens power needed for focusing the oncoming rays from a distance object. These historic designs, however, have not achieved the optical performance at low cost which the present invention achieves.

SUMMARY OF THE INVENTION

In accordance with certain of its aspects, the invention provides a lens system which comprises:

(a) a first group on the object side of the system's stop or aperture which (i) has a positive dioptric power, (ii) includes a concave surface preceding and adjacent to the stop or aperture, and (iii) includes at least one aspheric surface; and (b) a second group on the image side of the stop or aperture consisting of a single component having only two air surfaces and a positive power;

the overall system (i) having a total diagonal field of view not exceeding about 60 degrees;

(ii) having a relatively flat or weakly concave field;

(iii) having relatively low distortion;

(iv) being corrected at least partially for lateral chromatic aberration; and (v) having at least two elements made of plastic materials differing in dispersive powers, where at least one of the elements is plastic.

In certain embodiments, the second group includes an aspheric surface. In other embodiments, the second group includes means for focusing the system over a range of object distances from infinity down to about 4.0 times the effective focal length of the system.

In its simplest form, the lens system includes just two elements. Even for this level of simplicity, the system achieves excellent performance, particularly with regard to correction of lateral color and distortion (see below). This is, in part, a consequence of the use of a thick front element, the choice of materials for their dispersion, and their sequence.

The thick front element, while appearing strongly positive, actually is not. In fact, it acts much like a Galilean telescope as evidenced by the nearly parallel bundle of rays in the intervening space between it and the second element (see, for example, FIG. 1A). Most of the power in the system is in the second element.

The shape or bending of the thick front element about the real stop, along with the inclusion of an aspheric surface aids in the control of aberrations as does the use of an aspheric surface with the second element. The entire system may be injection molded for mass production, and the placement of the rear element is relatively insensitive to tilt and decentering errors because, while more positive than the thick front element, it is less positive than the system as a whole.

In overview, the two element embodiment of the invention can be considered an asymmetric system comprising a thick front telescopic element bent about a following real stop which in turn is followed by a more dispersive more powerful positive element.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

BRIEF DESCRIPTION OF THE DRAWINGS

FIGS. 11A–11E are similar to FIGS. 1A–7E showing the example of FIG. 3 in conjunction with a close-up lens.

BRIEF DESCRIPTION OF THE TABLES

Figure 1A:
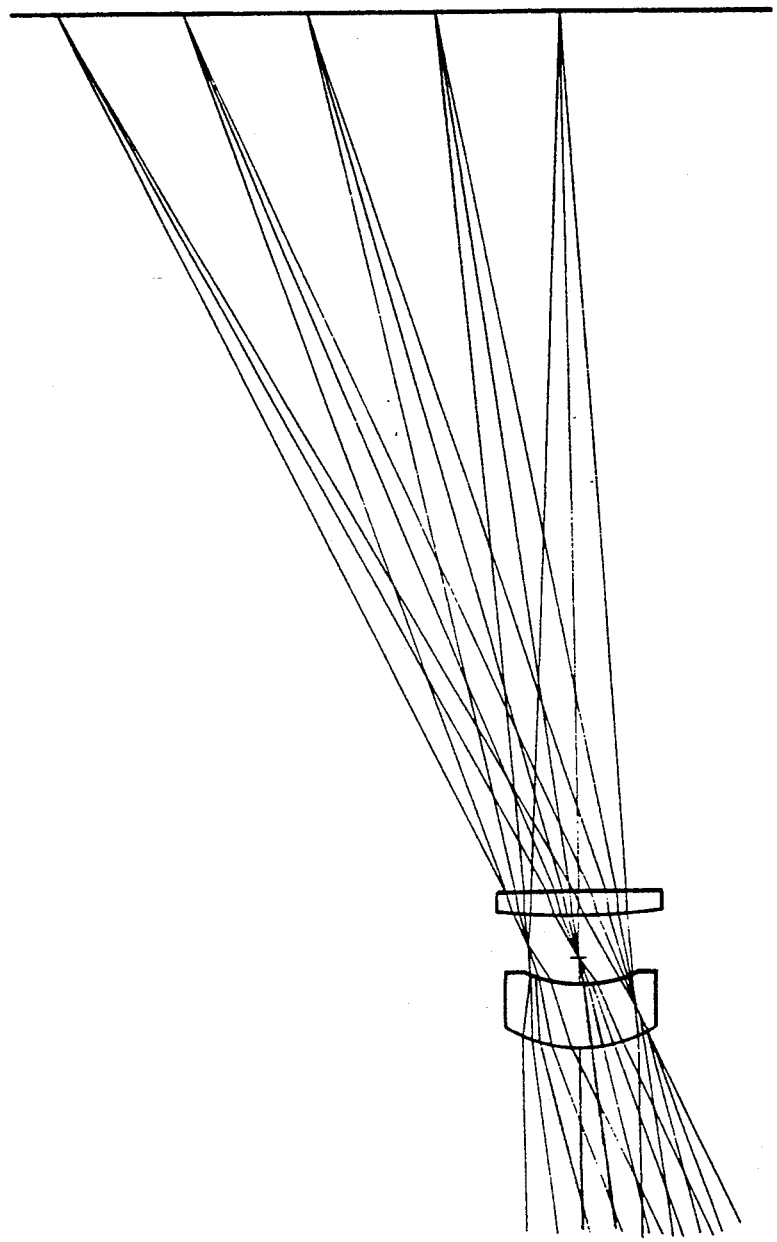
FIGS. 1A–7E show lens systems constructed in accordance with the present invention. In each of these figures, the configuration of the system is shown in the "A" panel of the figure, the residual astigmatism and distortion as a function of field angle is shown in the "B" panel, the ray aberrations (blur) as a function of position over the field at three different wavelengths is shown in the "C" panel, the MTF versus field angle at the paraxial image surface (r = −80 inches) is shown in the "D" panel, and the departure in the modulation at 1 cycle/mm with changes in the position of the image surface of best focus from its nominal or paraxial position is shown in the "E" panel.
Figure 1B:
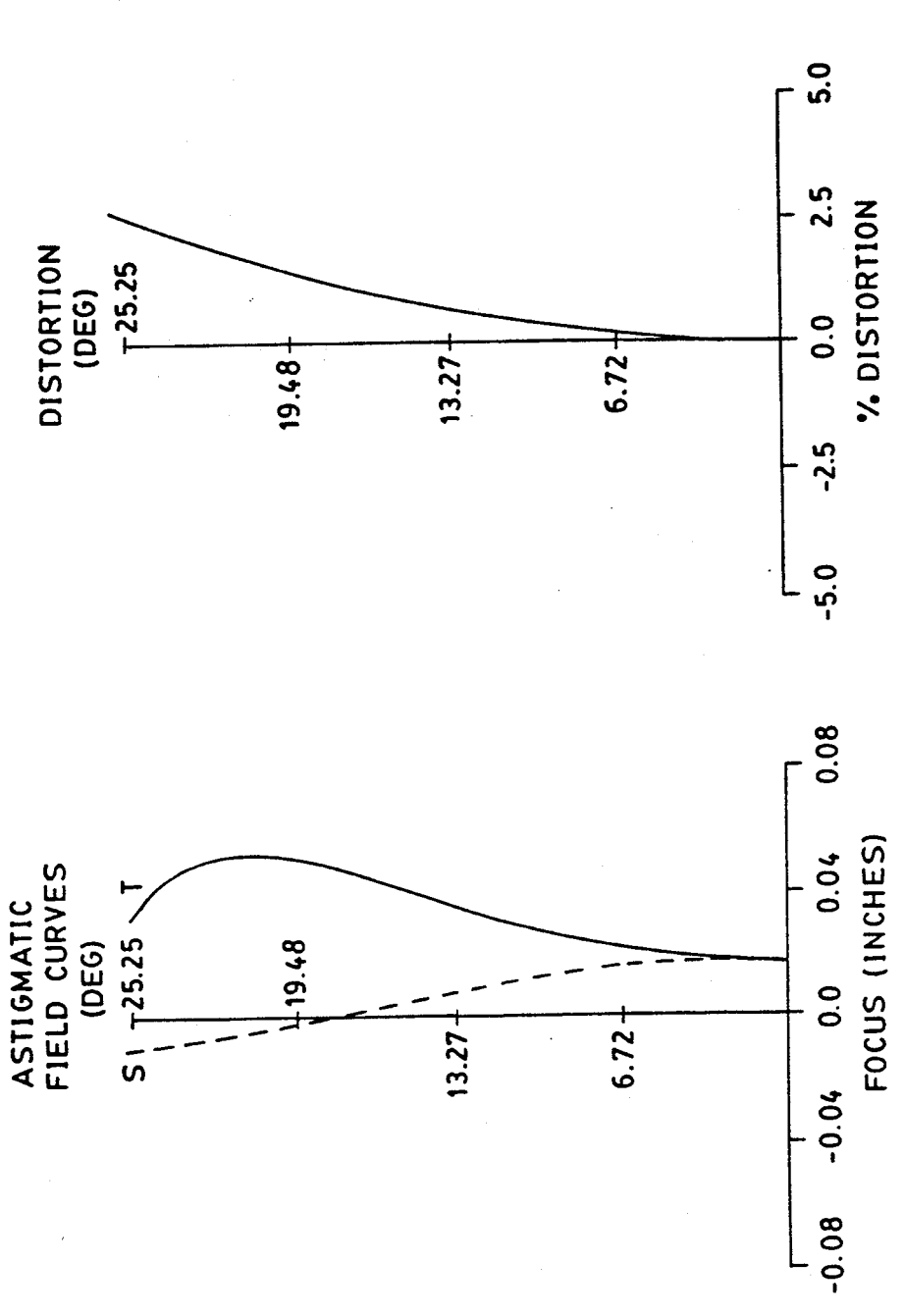
Figure 1C:
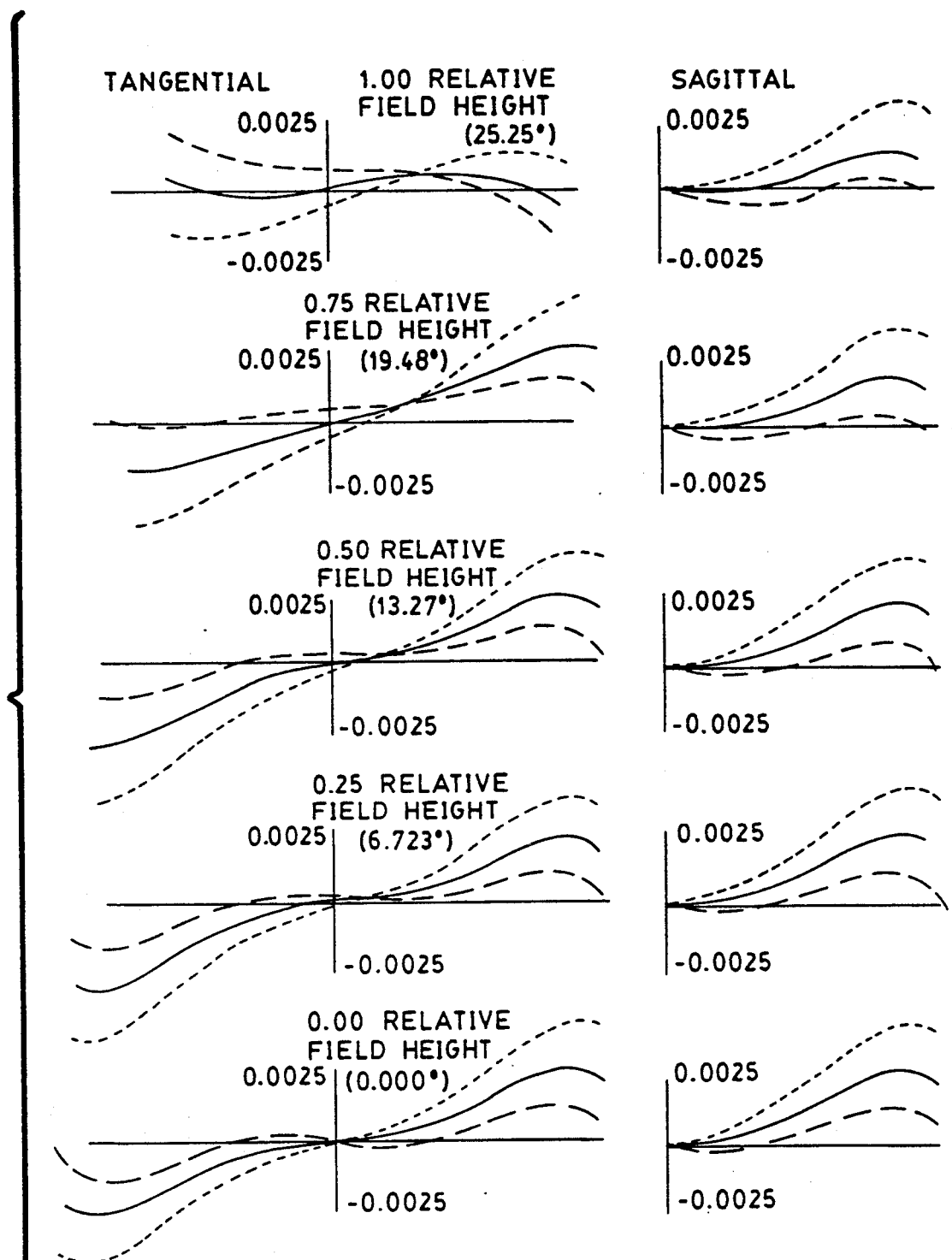
Figure 1D:
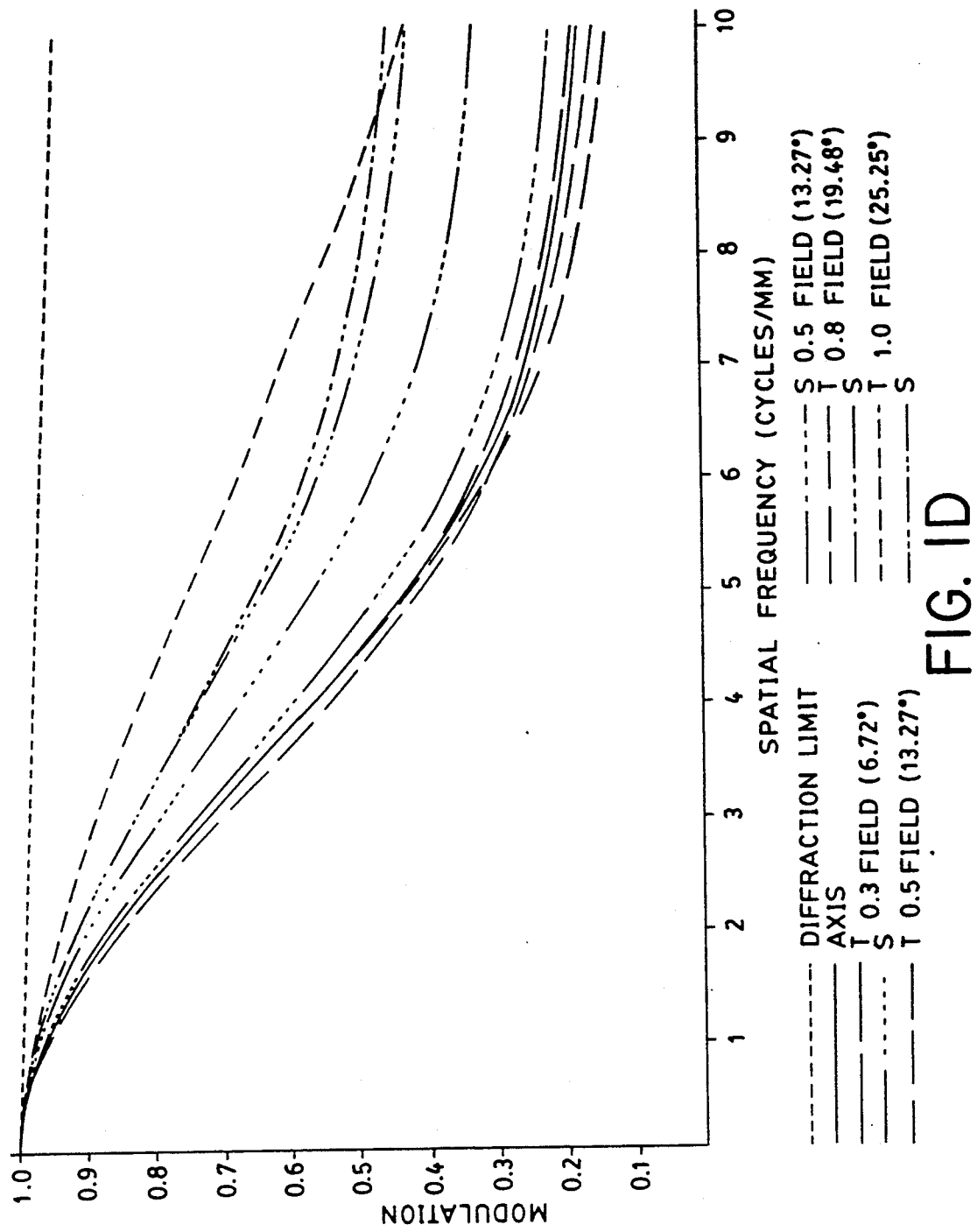
Figure 1E:
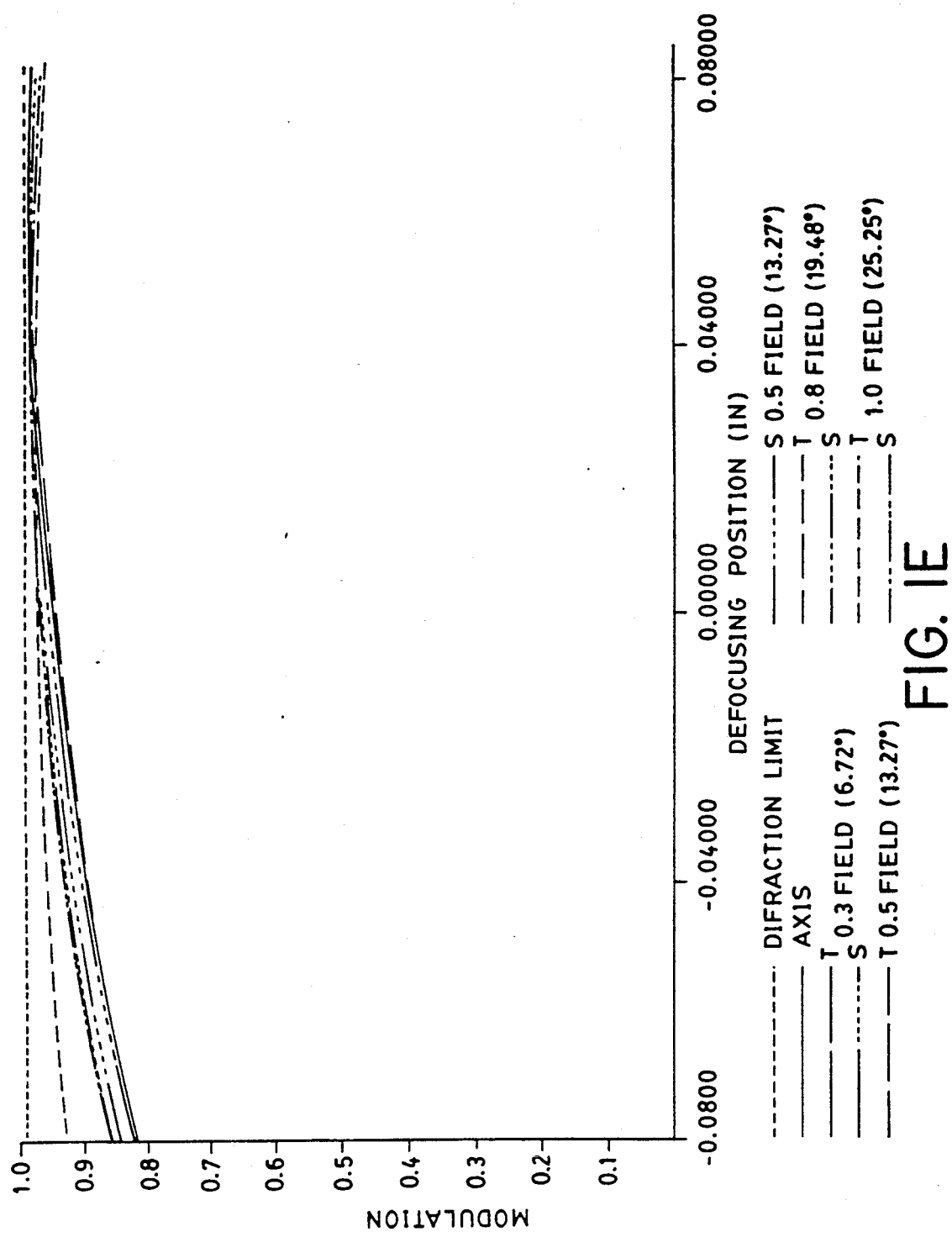
Figure 2A:
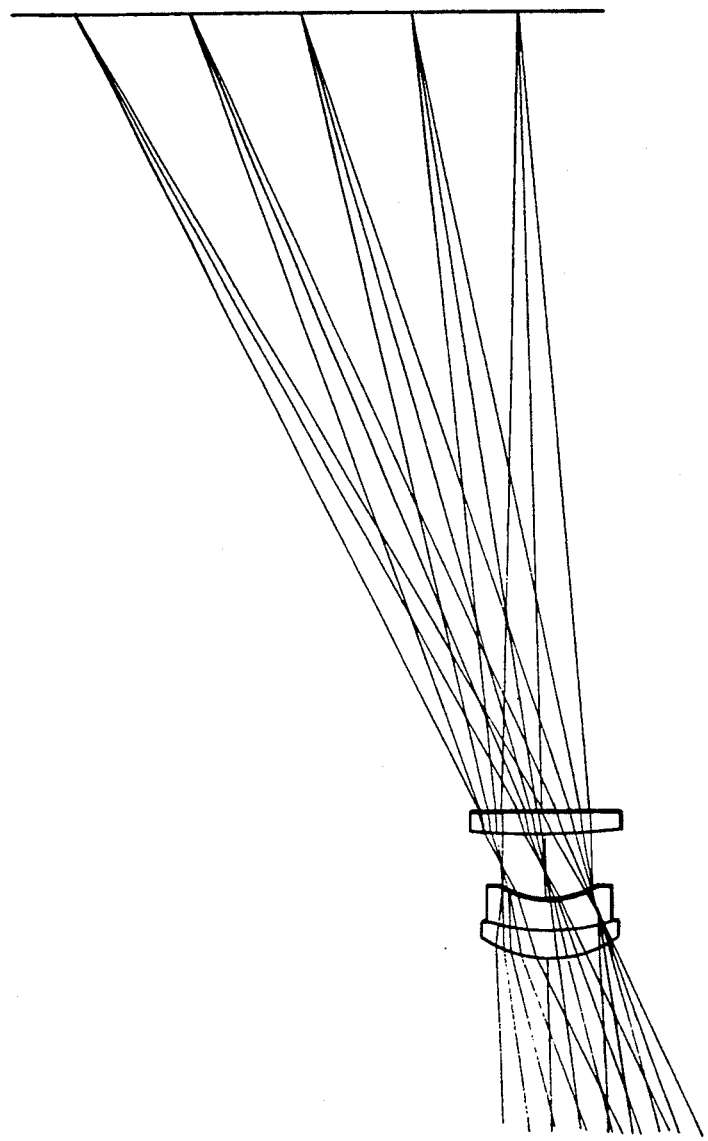
Figure 2C:
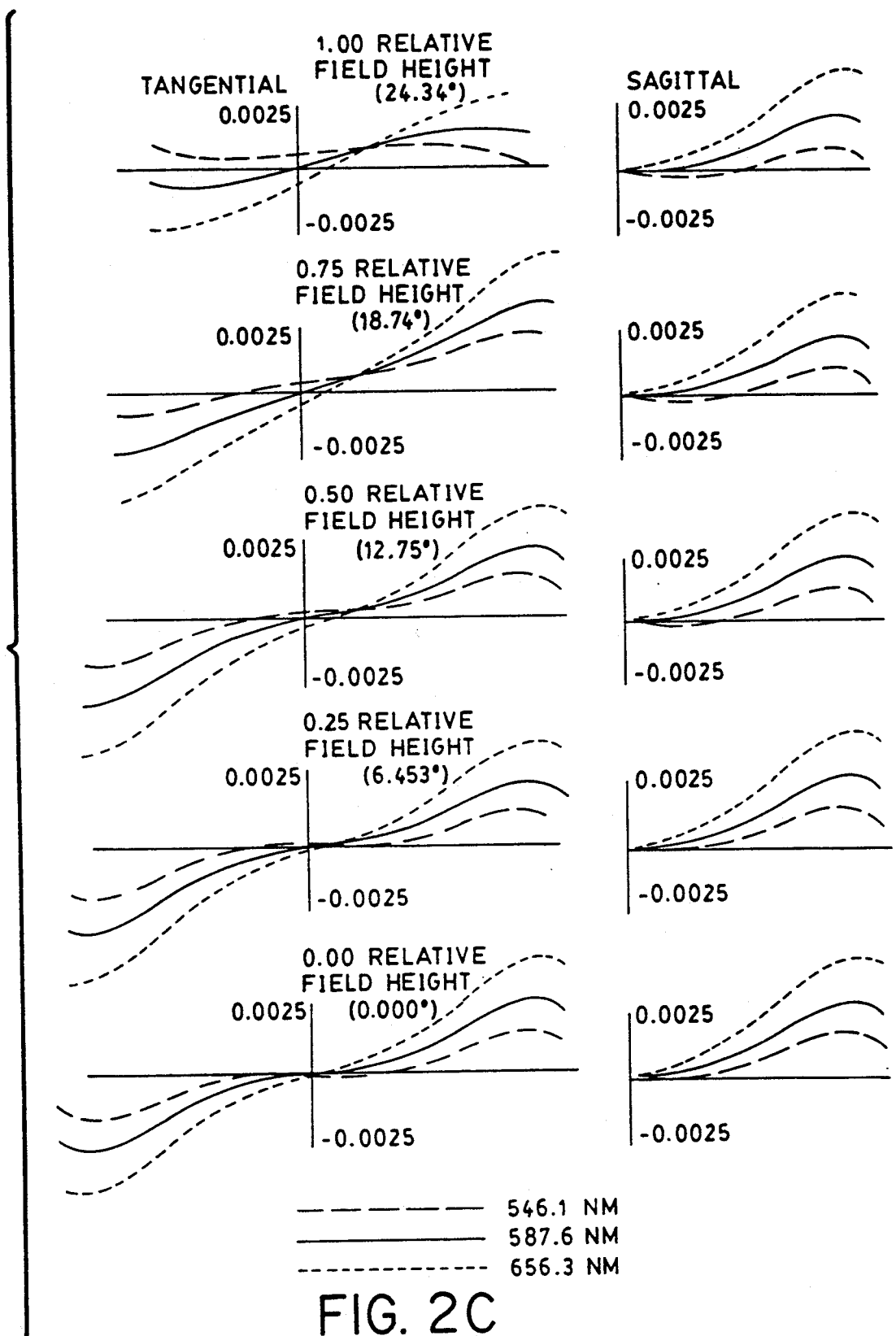
Figure 2E:
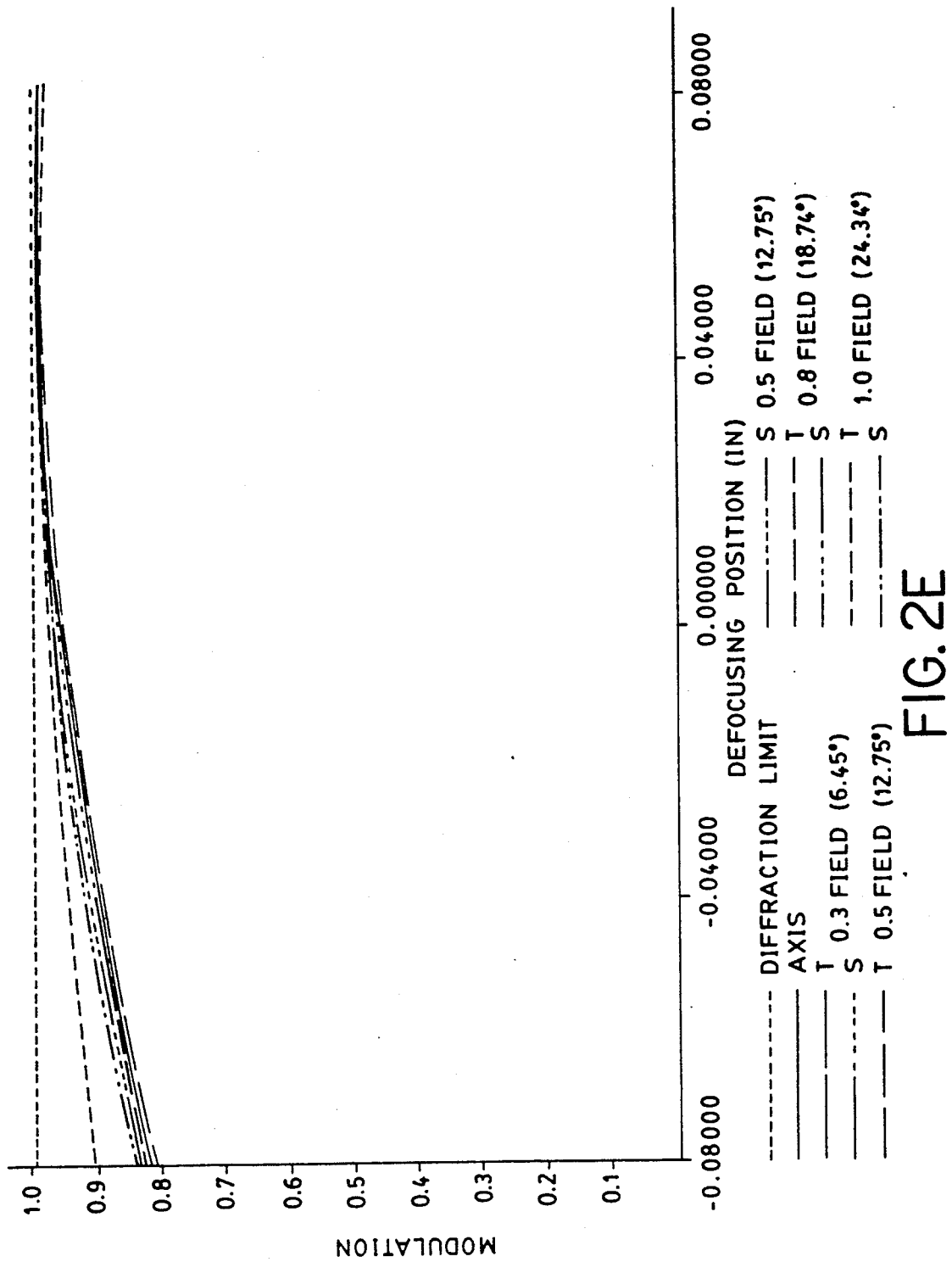
Figure 3A:
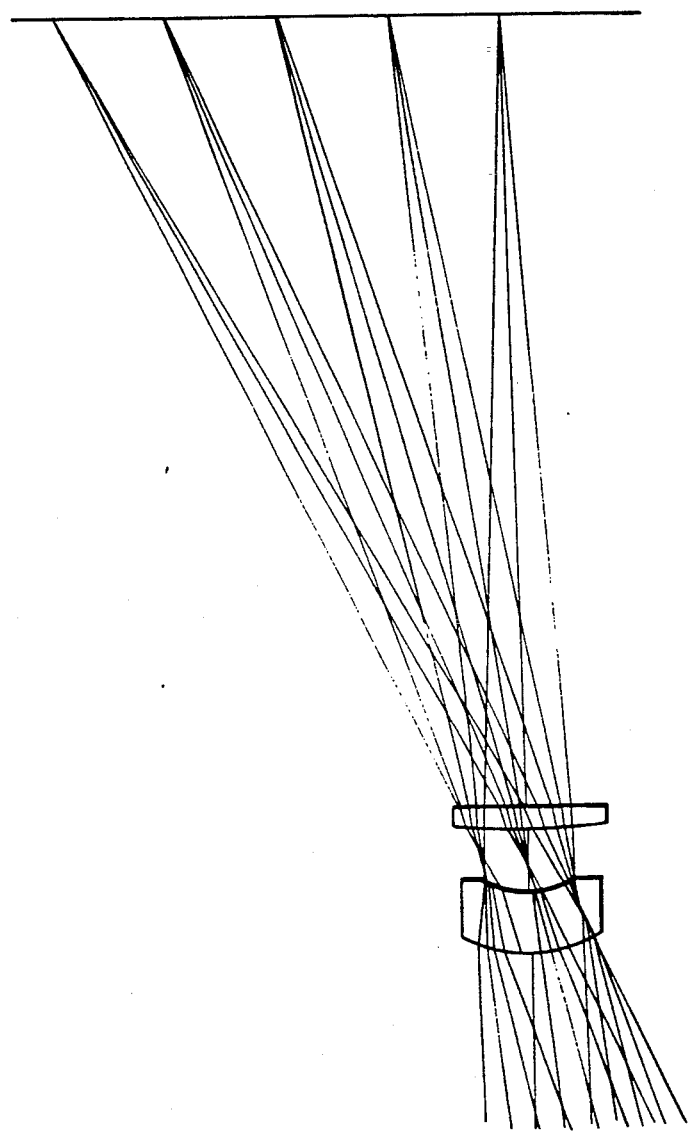
Figure 3B:
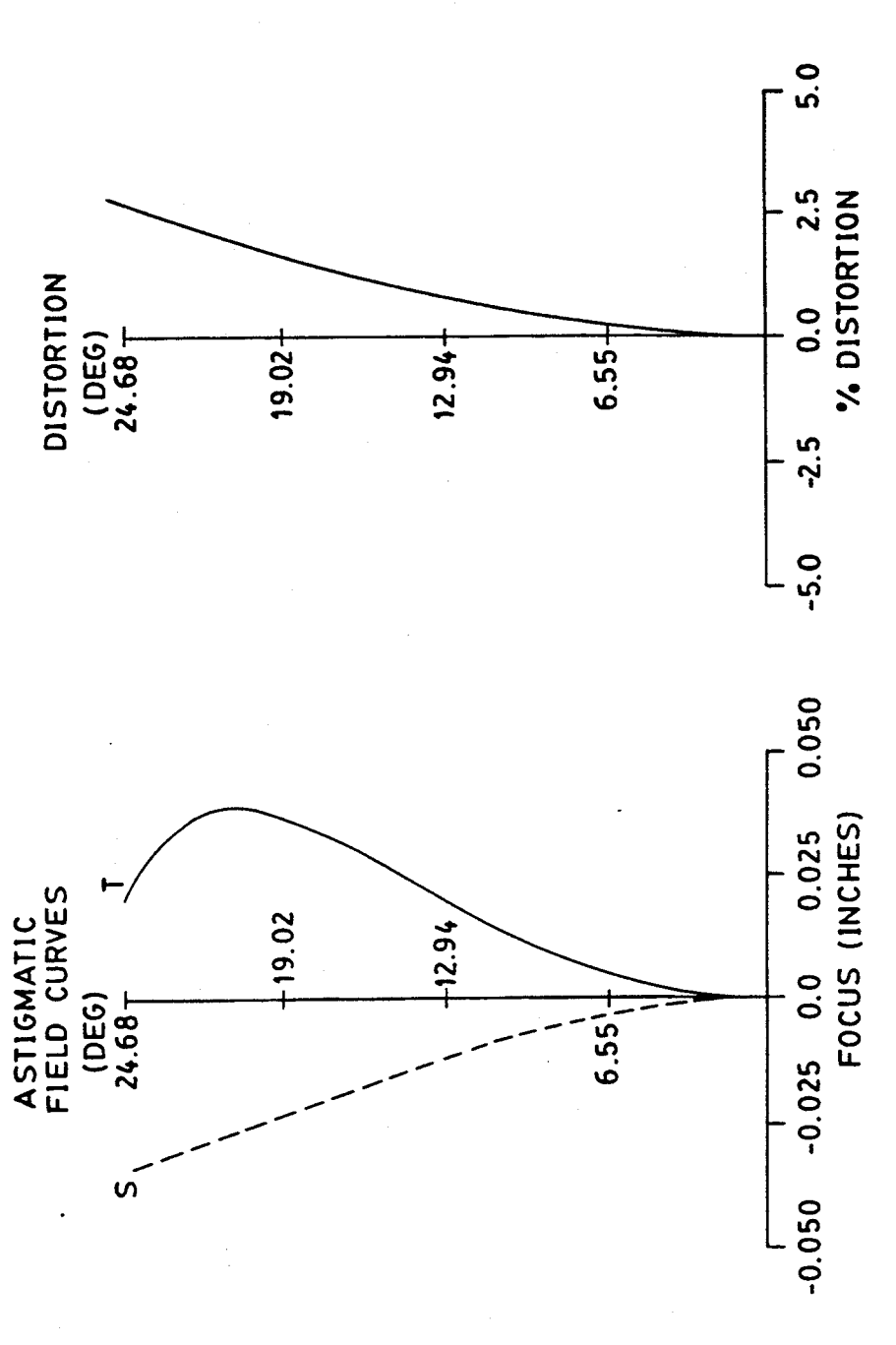
Figure 3C:
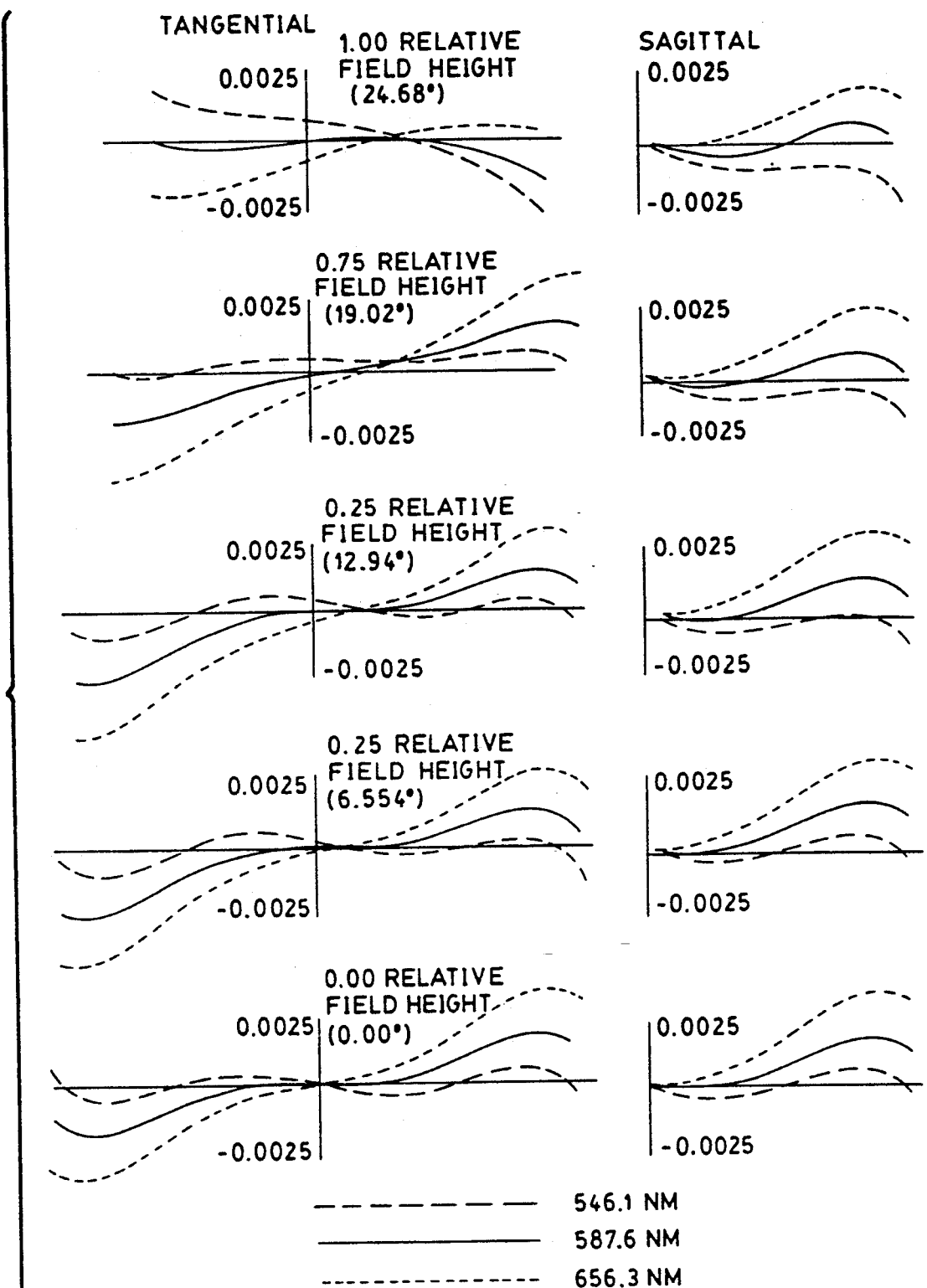
Figure 3D:
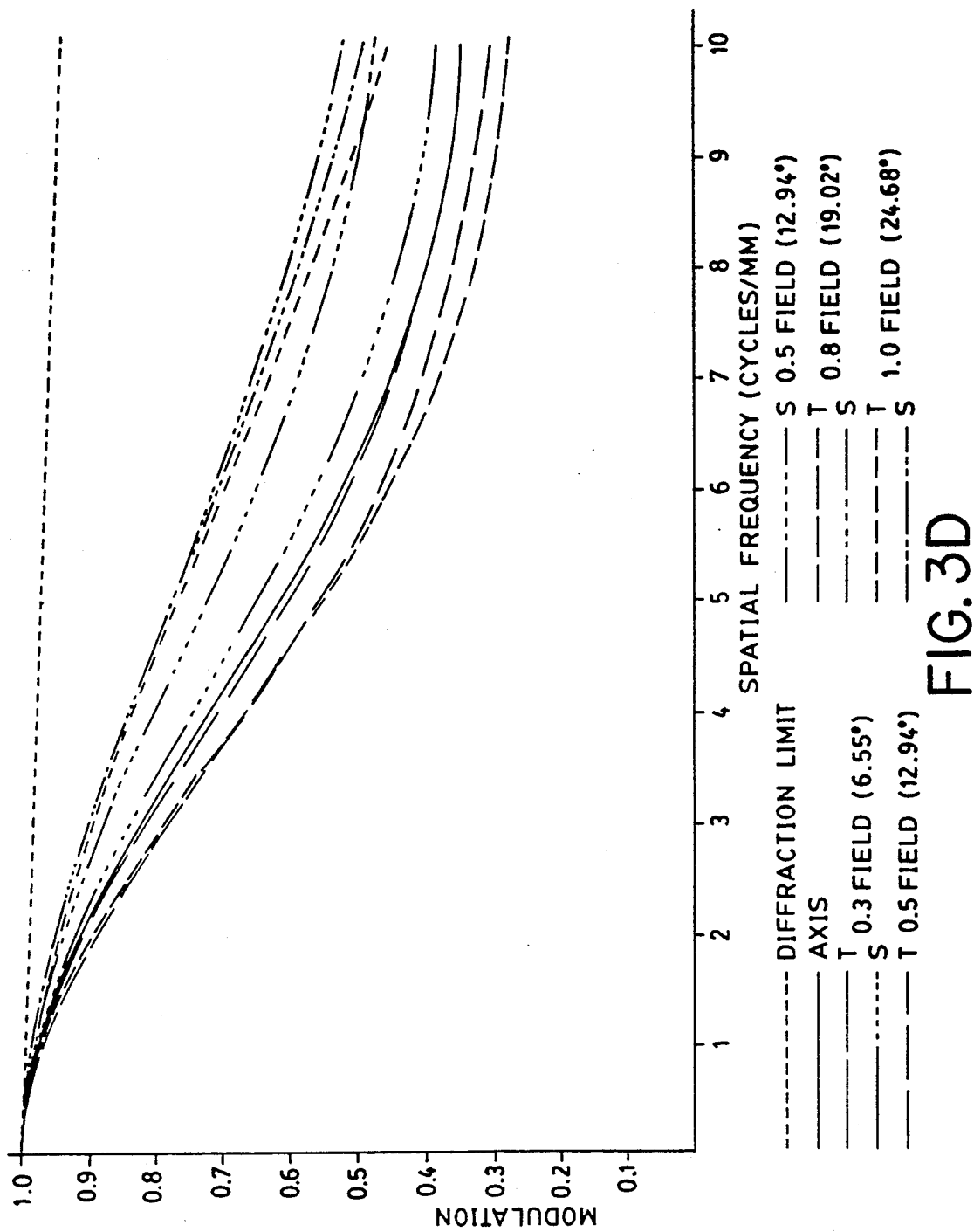
Figure 4A:
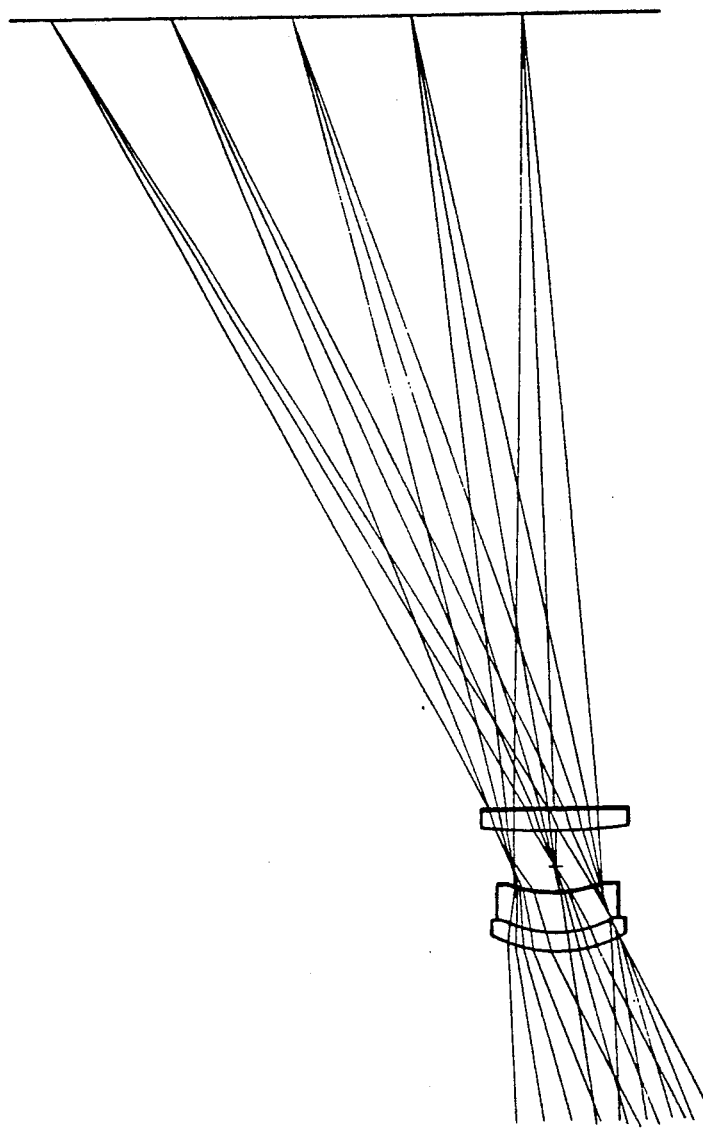
Figure 4B:
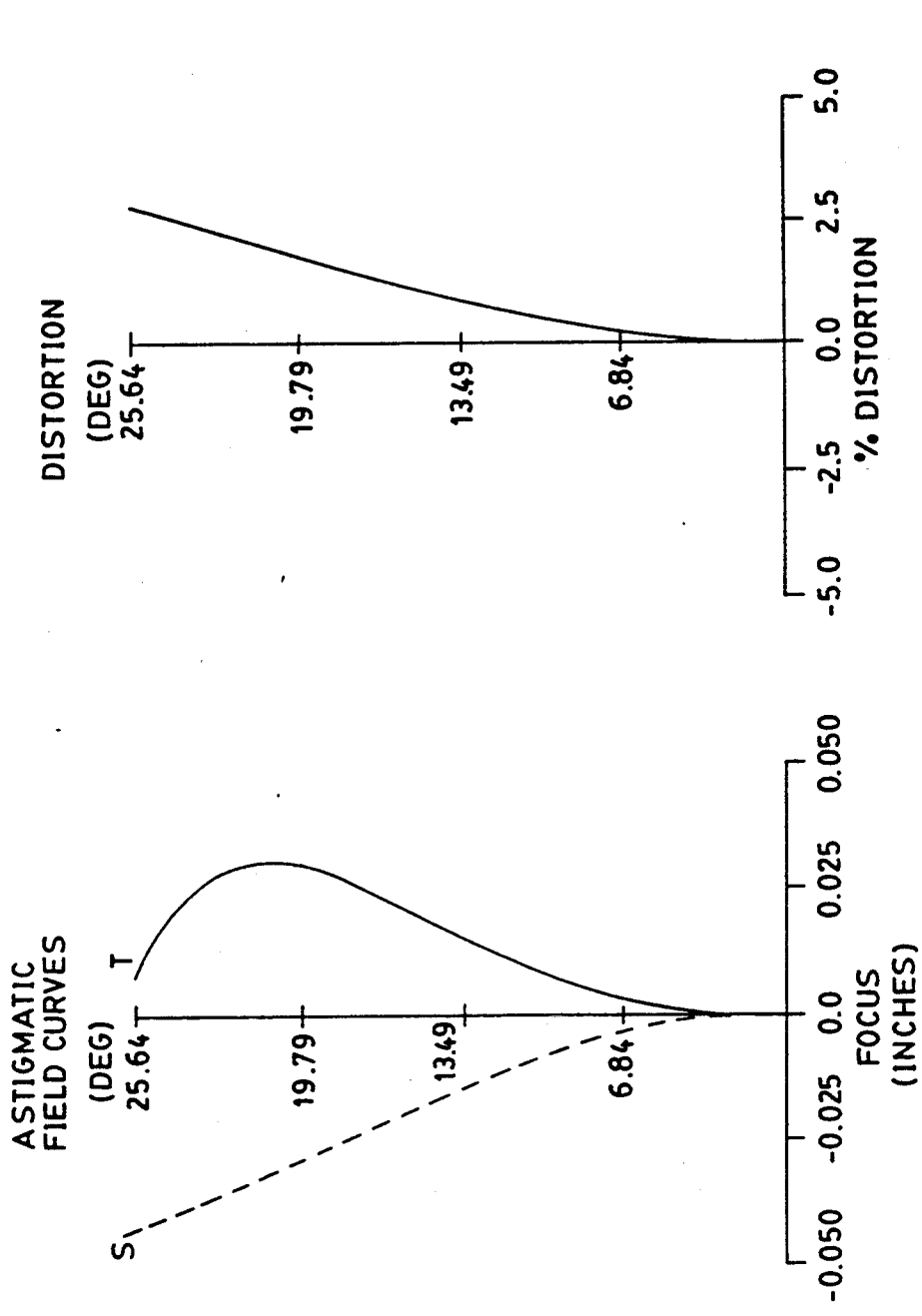
Figure 4C:
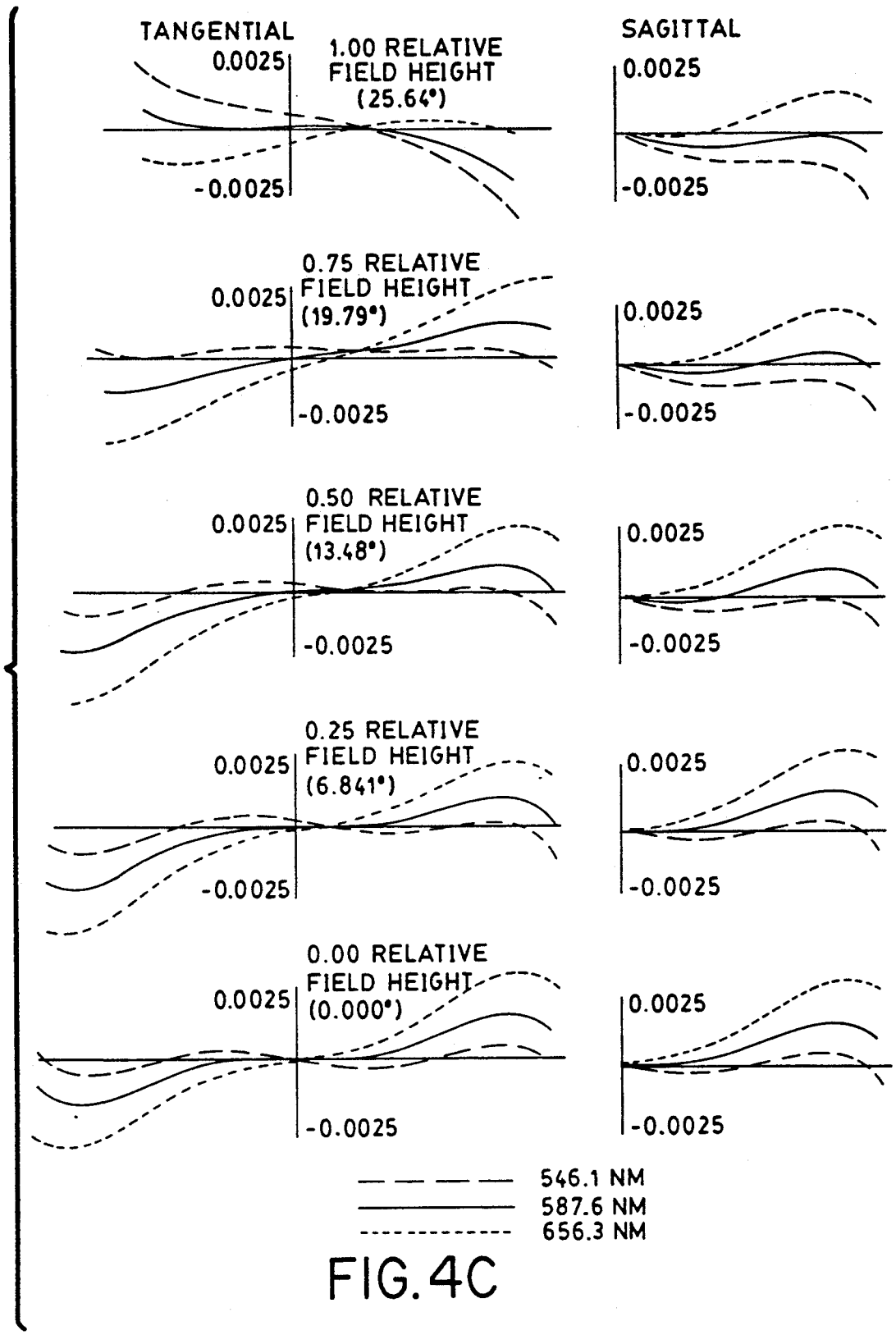
Figure 4E:
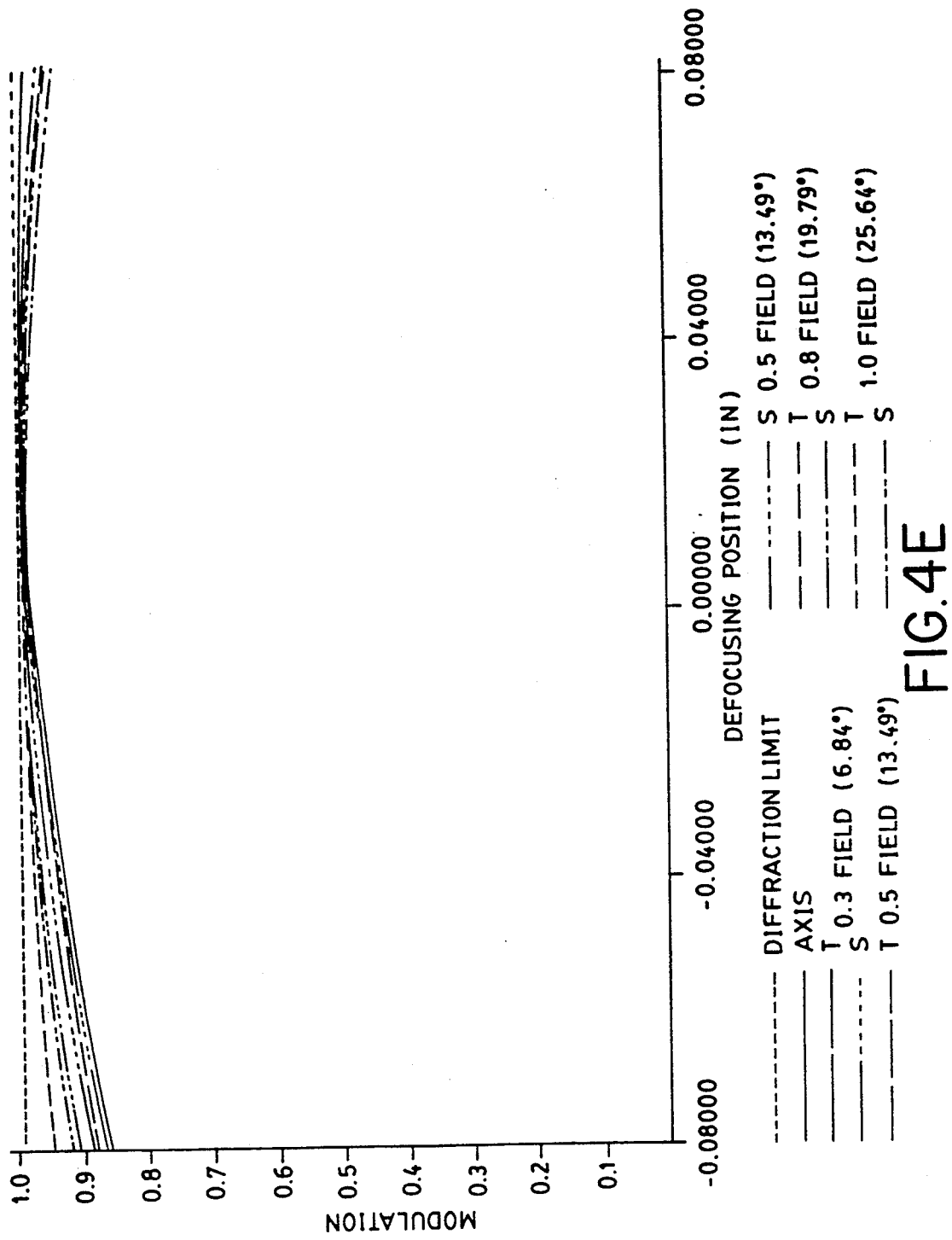
Figure 5A:
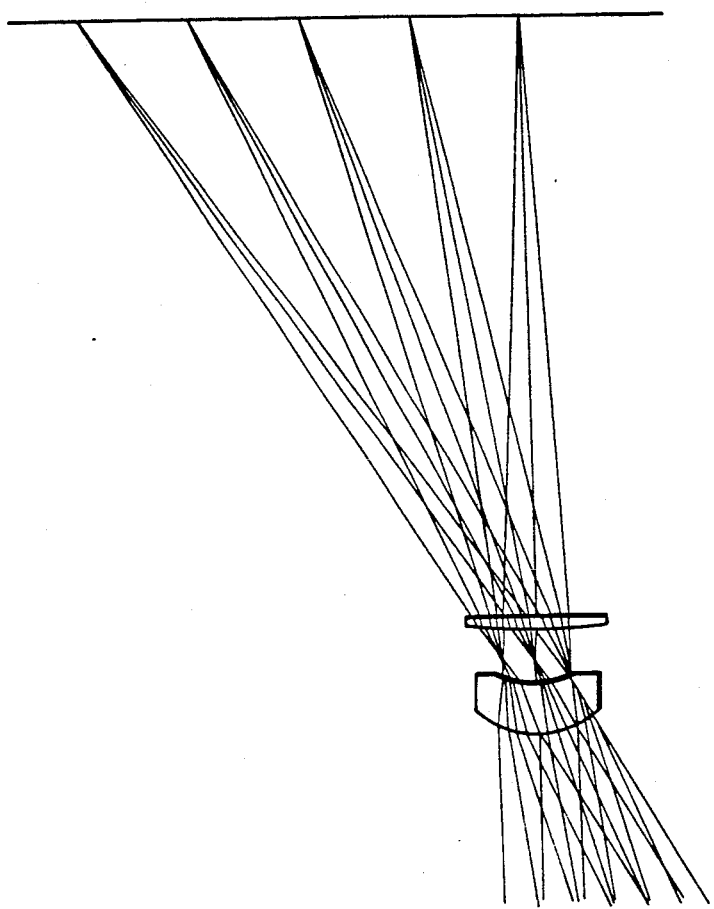
Figure 5B:
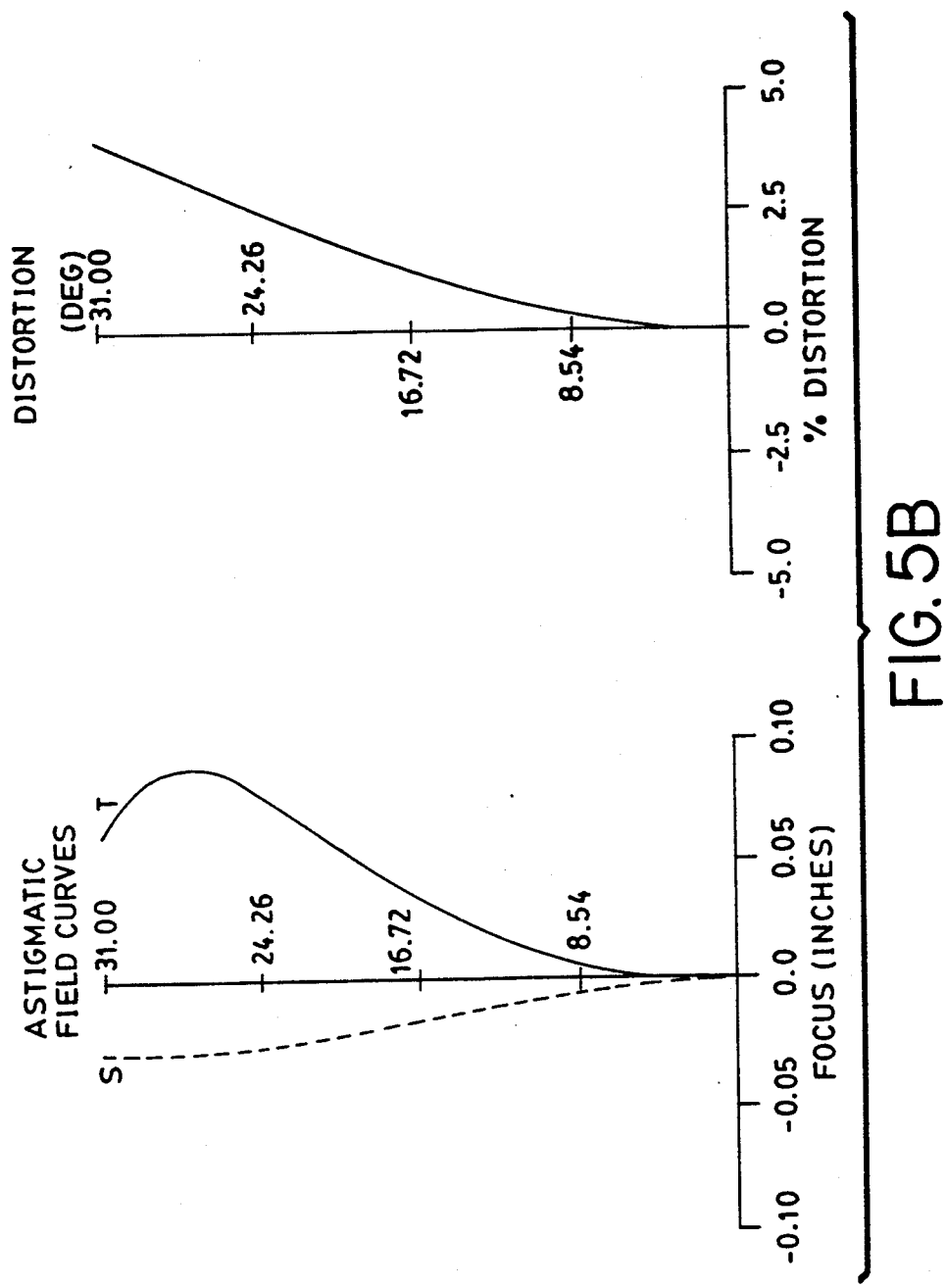
Figure 5C:
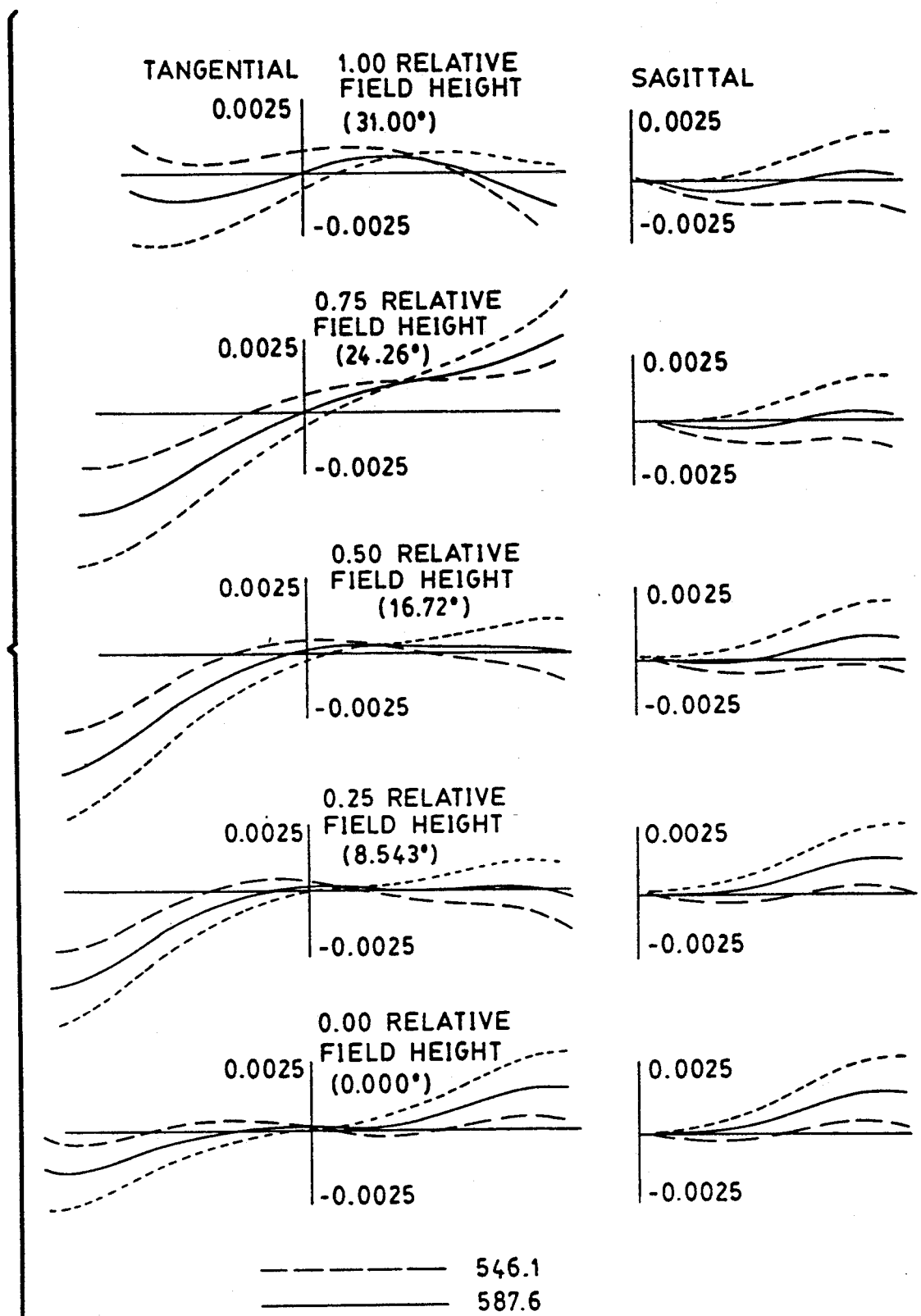
Figure 5D:
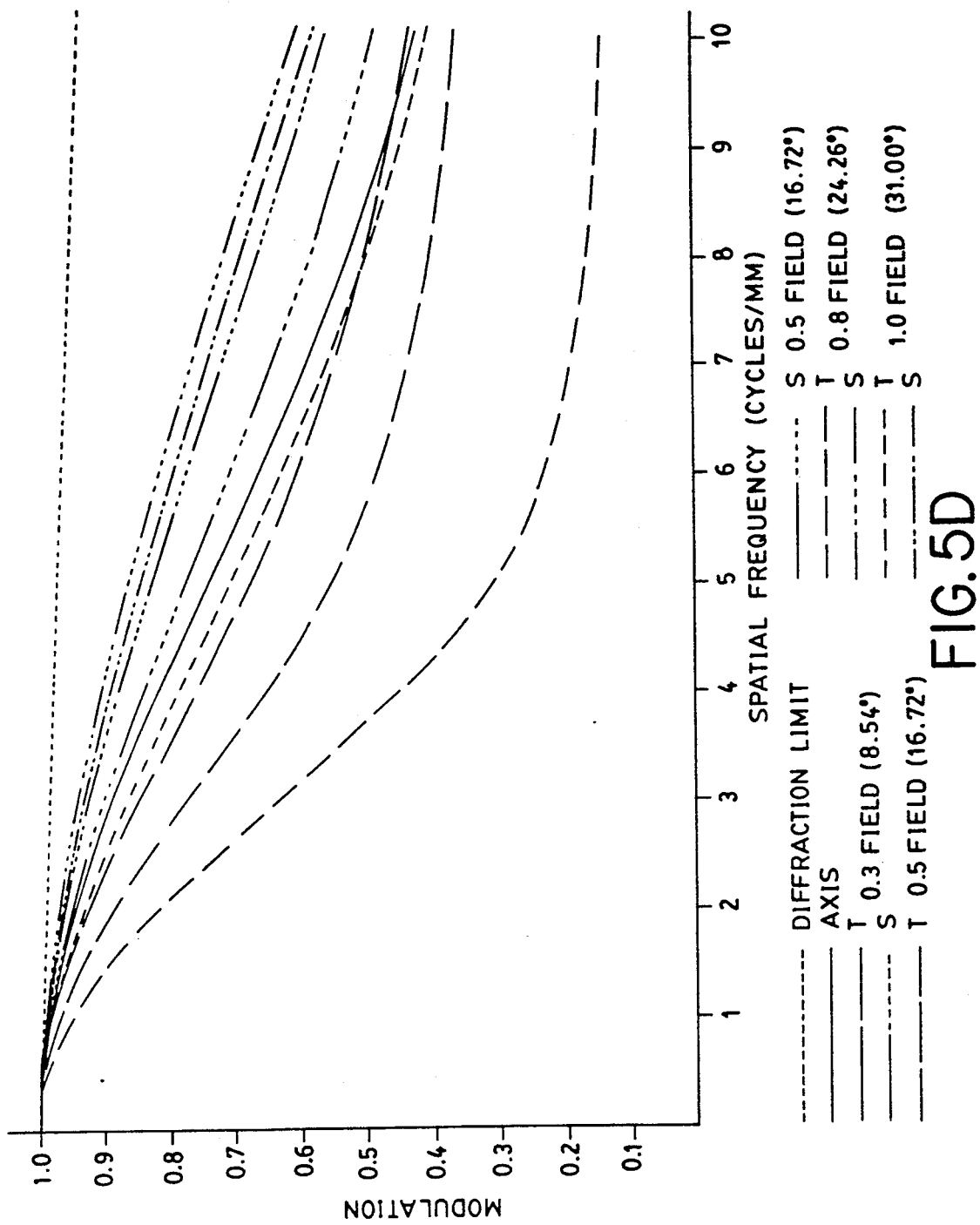
Figure 5E:
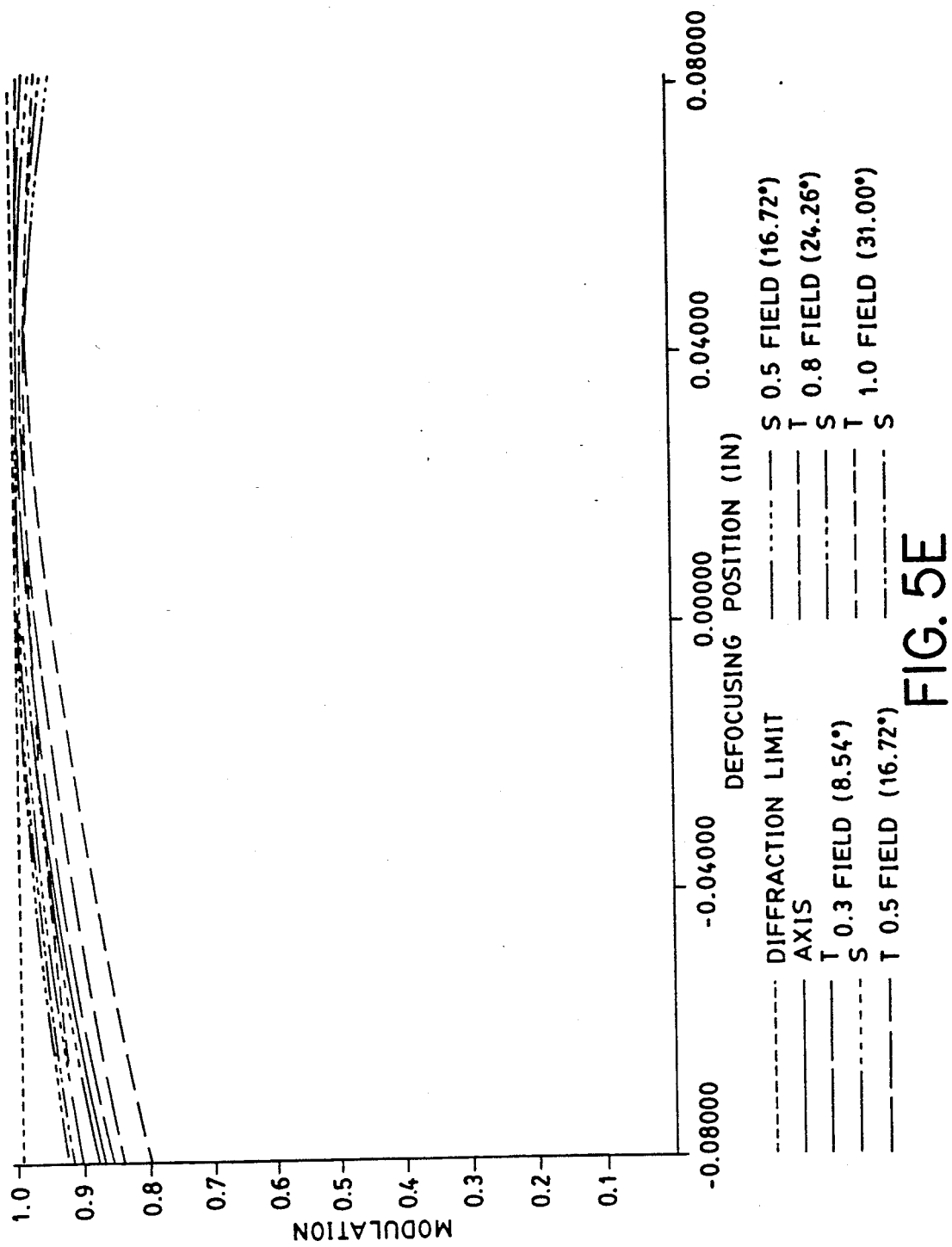
Figure 6A:
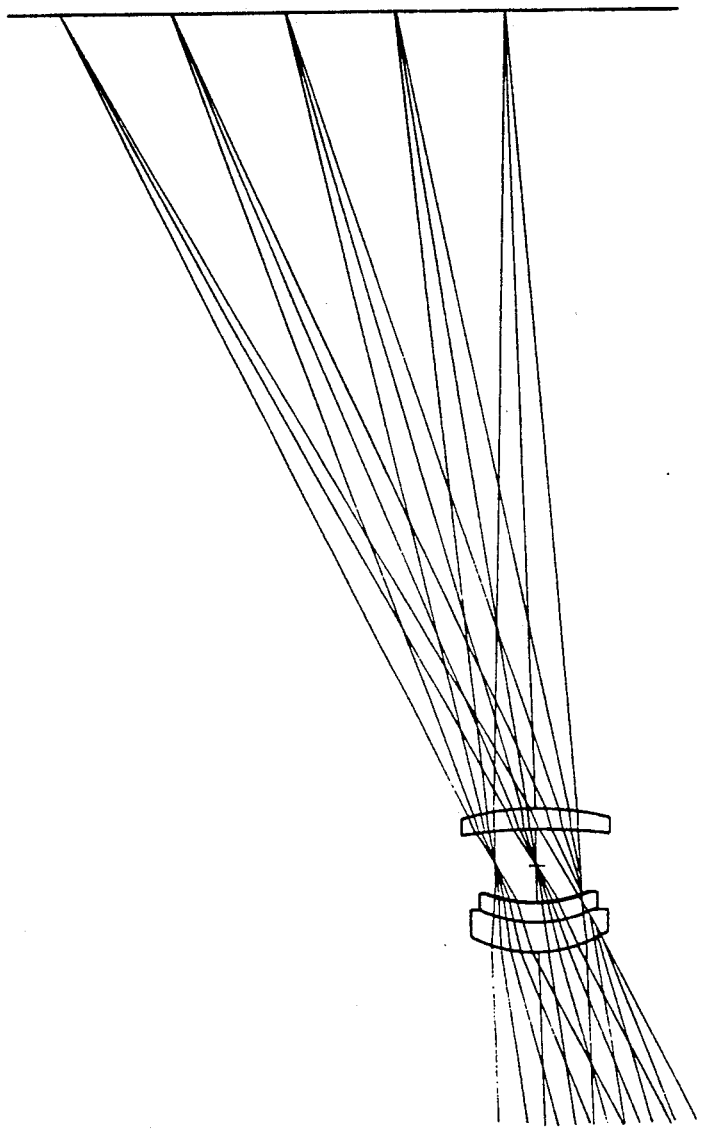
Figure 6C:
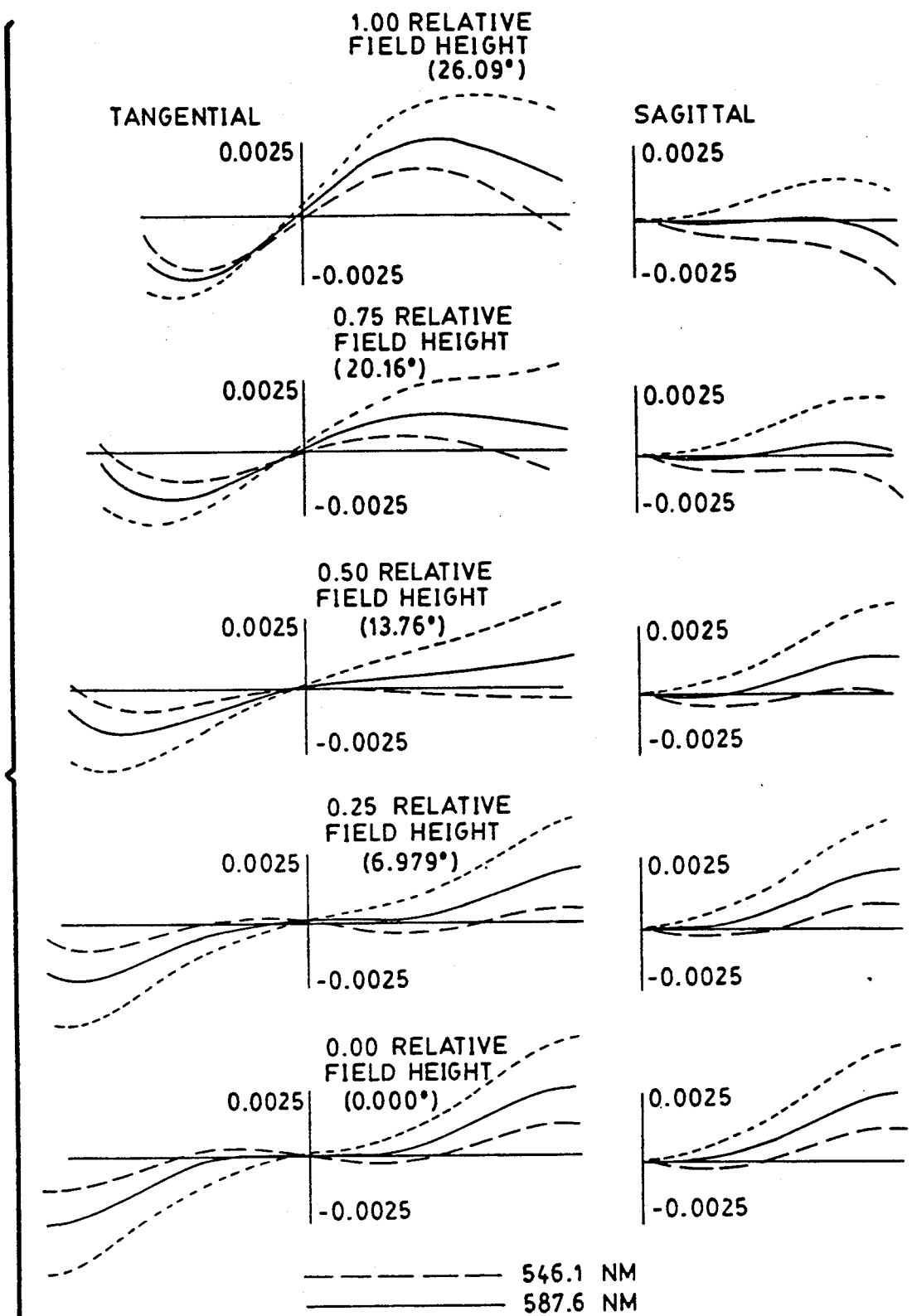
Figure 6E:
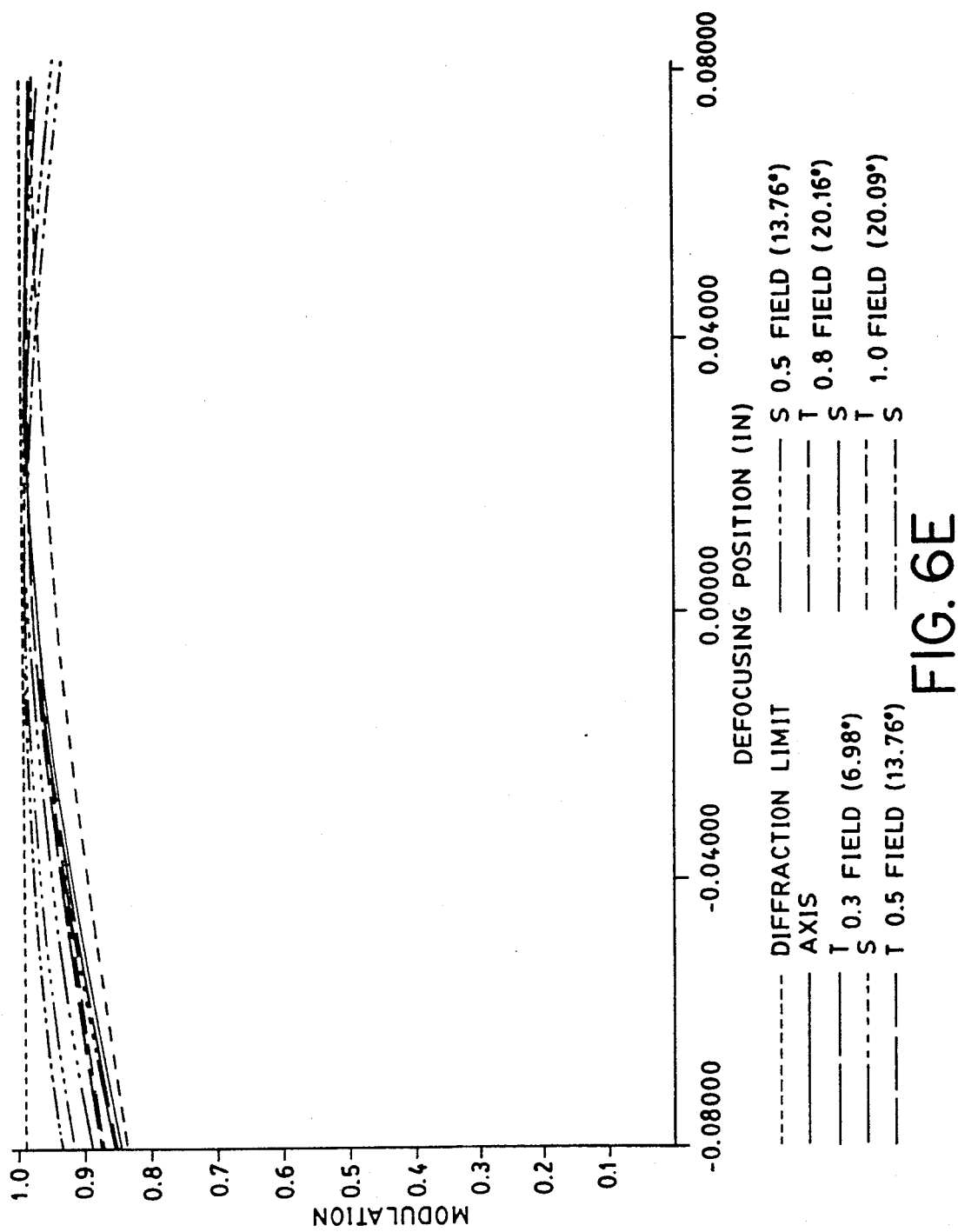
Figure 7A:
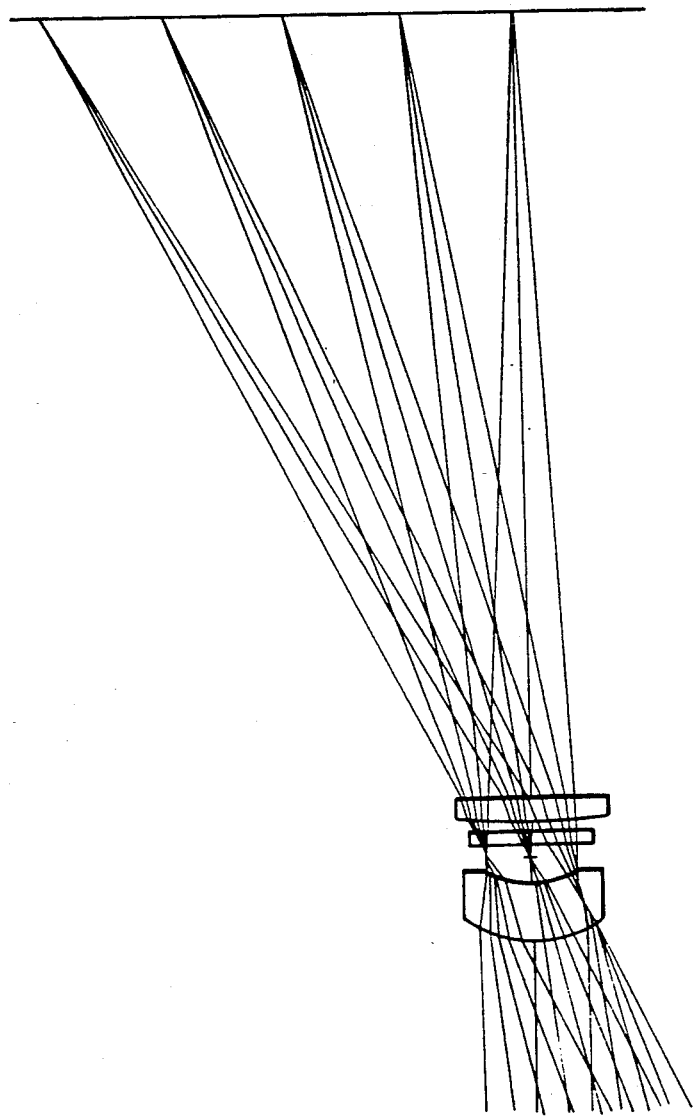
Figure 7B:
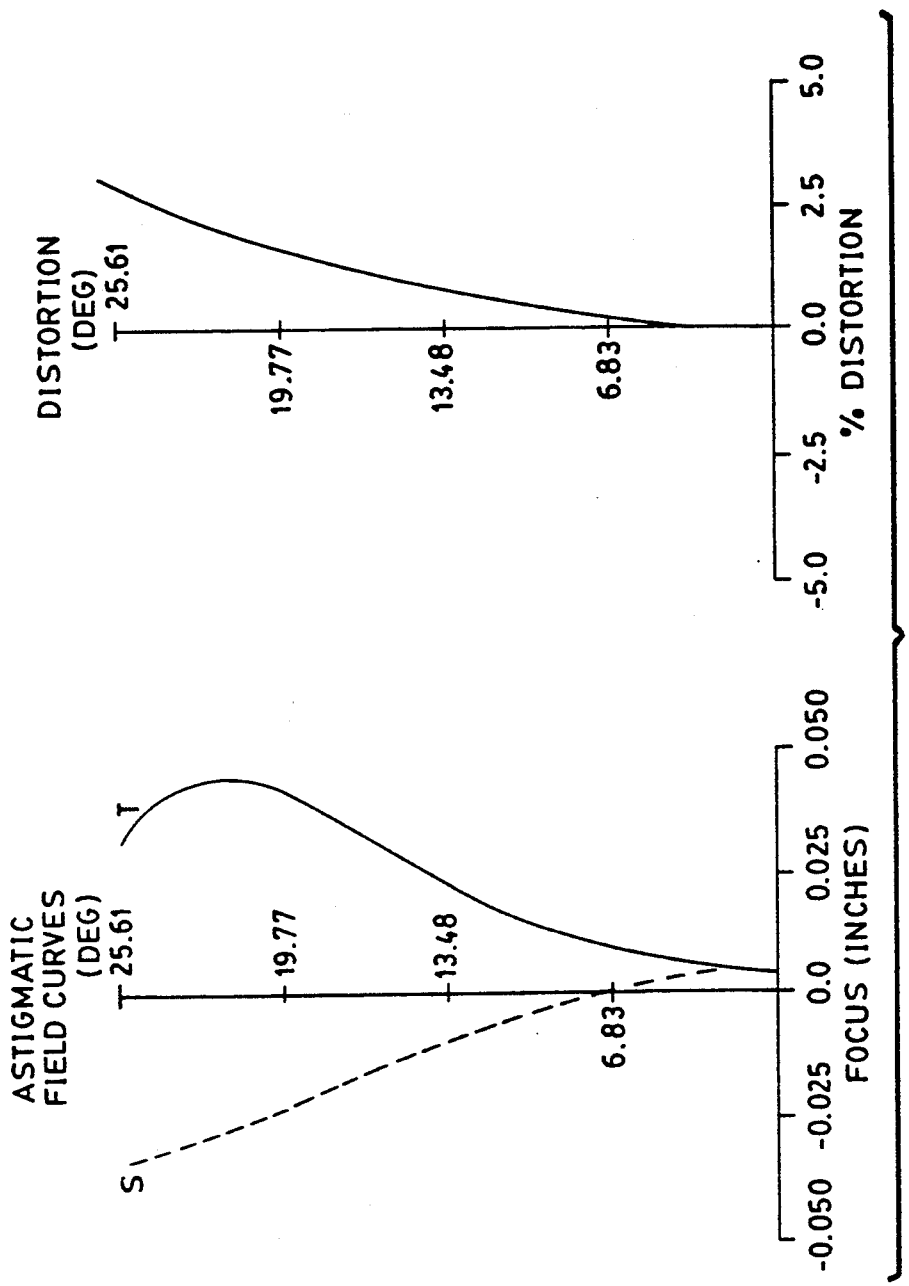
Figure 7C:
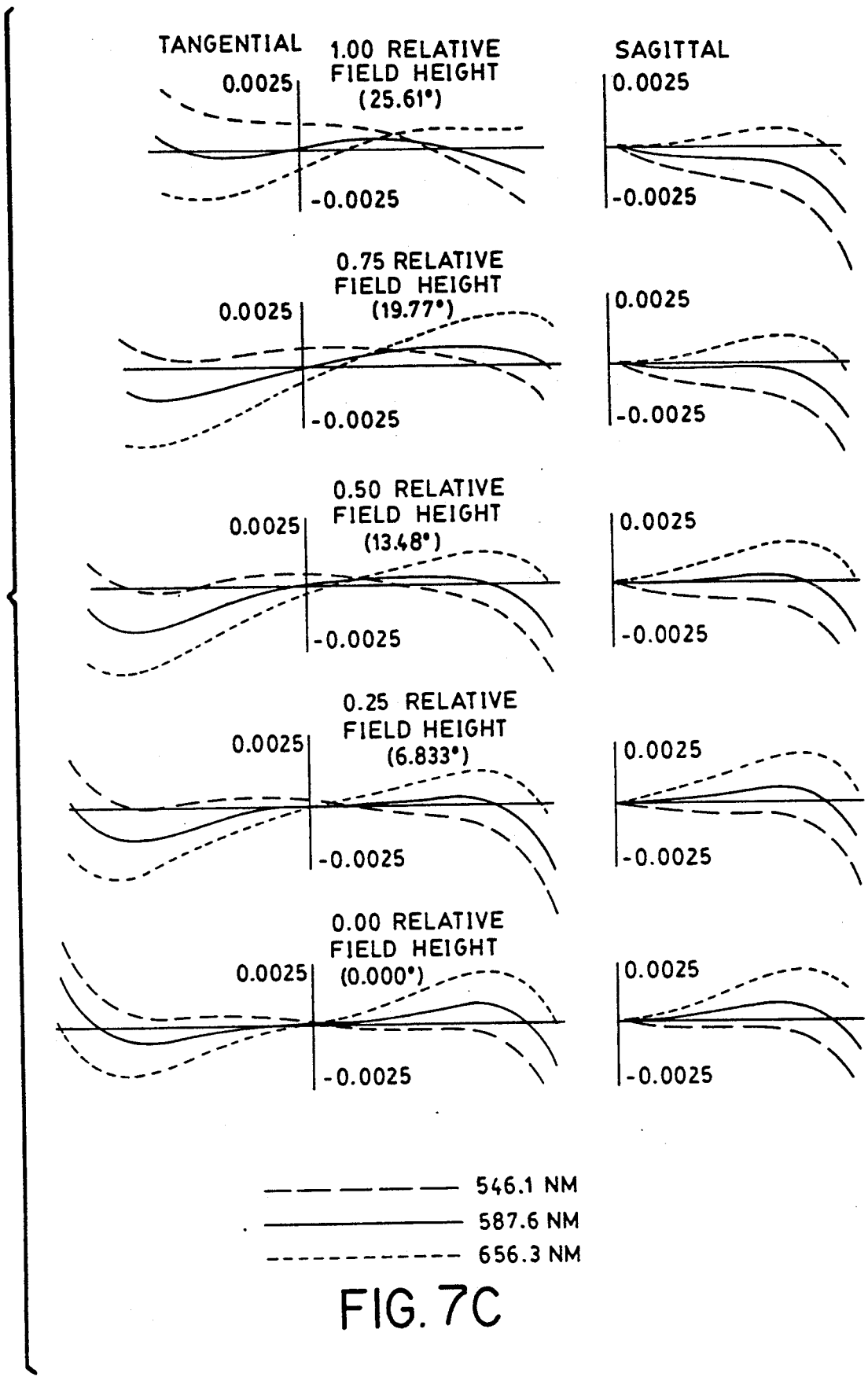
Figure 7D:
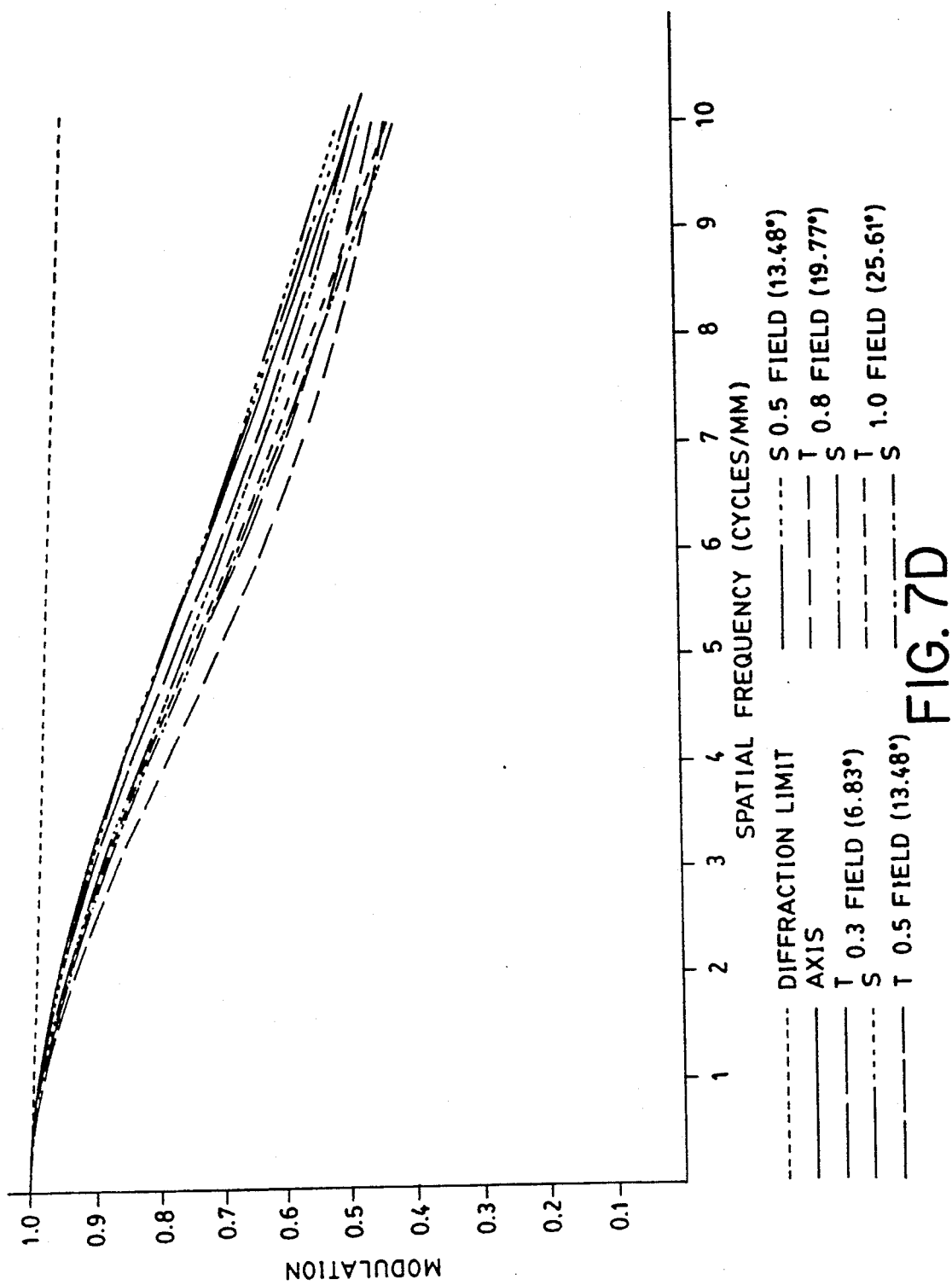
Figure 7E:
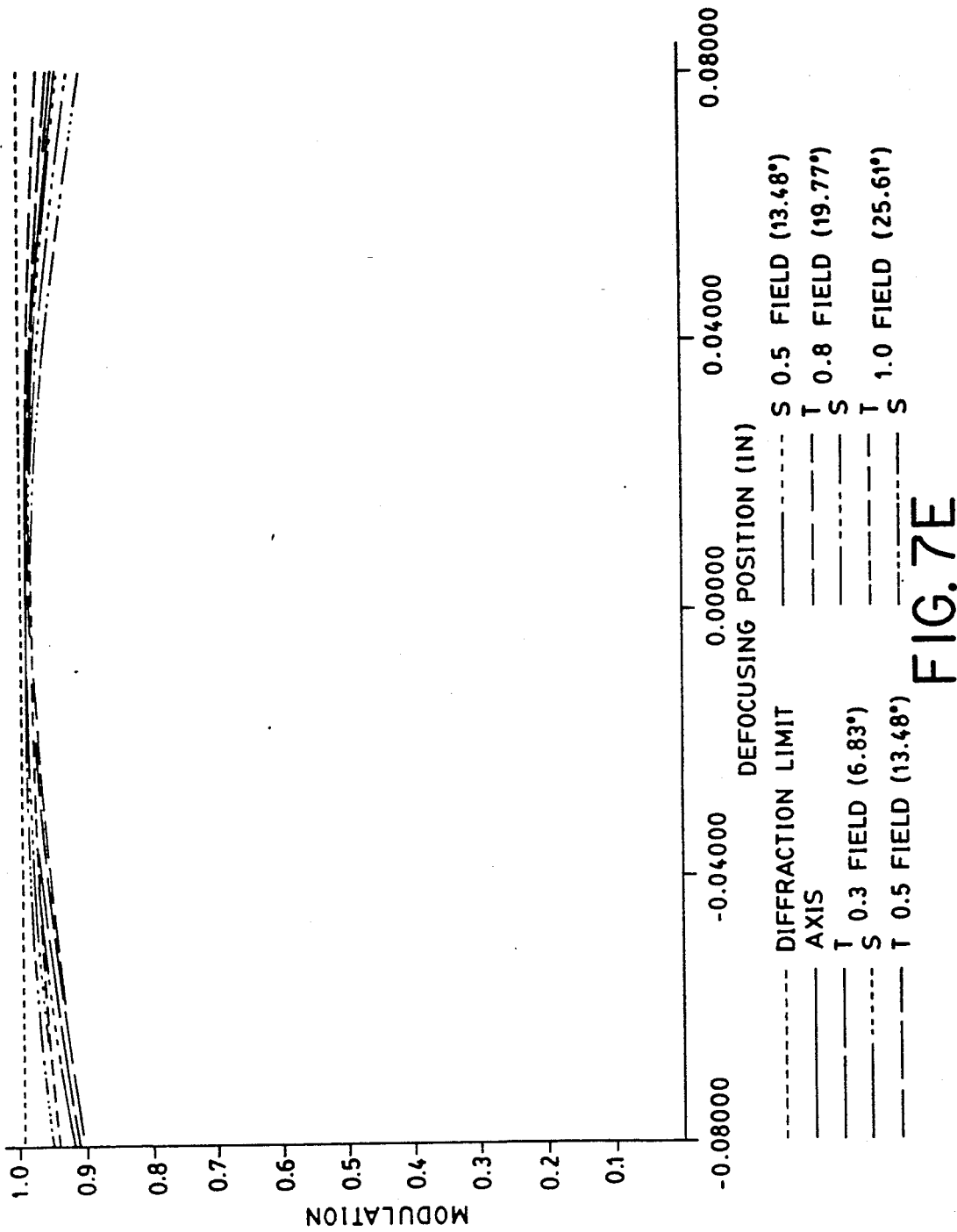

Tables 1–7 give prescriptions for the examples corresponding to FIGS. 1A through 7E and Table 8 gives the prescription of the example corresponding to FIG. 11A–11E.

DESCRIPTION OF THE PREFERRED EMBODIMENTS

1. General Principles and Features

In general terms, the objective lens systems of the present invention have moderate speeds, e.g., f/8 or slower, and field angles no larger than 62 degrees relative to the full diagonal of the format.

As can be seen from the Figures and Tables, the systems may include two plastic elements of differing dispersions, one forward and the other to the rear of a central stop, with not more than one aspheric surface per plastic element. When desired, additional elements in glass or plastic can be included or the rear element may be glass. The lens systems are normally used with photographic film, but can be used with other types or kinds of light-sensitive recording media, such as in all-electronic cameras, infra-red detectors, and the like.

The lens systems are intended for use in imaging objects whose distance from the system is at least four equivalent focal lengths. The systems can have internally disposed focusing means immediately following the stop or objective focusing as a whole can be used. Auxiliary lenses can be added externally or within the objective structure to extend the useful range of object distances, such as for a hyperfocal object distance for scenic shots, or for close-up portrait photography, or for even closer technical or artistic applications.

In terms of overall design, the systems have a first (front) lens group forward of the central stop (to the left in the usual lens drawing) such that the surface adjacent to the stop is a concave "air" surface curved about the stop and such that the first lens group has at least some positive focusing power. The axial bundle emerging from the concave surface and about to pass through the stop thus has convergence and of itself is able to produce a real image at some location to the right in the usual convention. For example, in Example 1 discussed below, the equivalent focal length (EFL) of the first lens group (single element in this instance) is 2.556 in units of the focal length of the objective as a whole. The reciprocal gives the dioptric power, namely, 0.391 where the power of the overall system is 1.000.

If in the general case the dioptric power of the front group is made very small, the positive power of the rear group must be correspondingly large. Such a situation leads to imbalance in distortion correction, astigmatism, coma and even spherical aberration. If the power of the first group is too large, there will again be an imbalance among the various corrections. Accordingly, the range of dioptric power for the first group ($K_1$) should be between about 0.200 and about 0.500 of the total power of the lens system ($K_0$), corresponding to a range in the equivalent focal length of the front group from about 5.000 down to about 2.000 relative to the EFL of the entire lens system.

The first group with its weak net positive power can be viewed as a corrector for the rearward strongly positive group, the combination by design yielding a flat or nearly flat mean image surface, which can be optimized to conform to a known non-flat film surface such as may exist on the average when cut film is stacked sequentially in a supply pack, or when the sensitive surface is flat, or only relatively flat for any reason.

The first group includes a meniscus component which serves to reduce the diameter of the oncoming axial bundles of rays defined by the entrance pupil. This, in turn, has a telephoto effect which improves the compactness of the imaging system. Thus, if the effective cross-section of the axial bundle is reduced to, for example, 84% of the bundle in object space, the aperture stop is then small, and the optical focusing by the second group operates on a smaller bundle to produce the desired positive focal length for the system as a whole. The back focus is also reduced which provides for compactness in the camera itself.

For example, in Example 1, the overall length from front vertex to focal point for an infinite object distance is only 0.961 times the EFL of the entire lens system, which represents a great improvement in compactness over the symmetrical double meniscus form. The distance of the stop from the focal point is 0.875 times the EFL, which again accentuates the compactness resulting from the use of the compressing front meniscus component.

The front meniscus component, which is relatively thick, is used in combination with the rear positive group to minimize the aberrations of the lens system. The rear positive group of itself makes a strong positive (undercorrected) contribution to the Petzval sum. For example, in Example 1, the rear group by itself leads to a Petzval image surface of curvature −0.461, where a positive Petzval sum corresponds to a negative curvature, that is, to a concave surface curved about the exit pupil with the center of curvature to the left in the usual lens drawing where light travels from left to right. More specifically, the tangential image surface for the second group has a curvature of −2.437, and the radial surface −1.120.

The correcting front meniscus component has strong negative (over-corrected) astigmatism and indeed a slightly negative Petzval sum contribution. In combination, the mean field is adequately coincident with a desired weakly cylindrical concave image surface (e.g., a radius of approximately −80 inches corresponding to the curvature of the average sheet in a film pack) and the performance is approximately anastigmatic.

In accordance with the invention the front lens group can take on various forms adapted for variables as the size of the format, the focal length of the lens system, the effective lens speed, the desired materials for the lens elements, the overall complexity and thus cost of the lens system, and the like. While the invention permits complexity of construction and multiple components forward of the stop, consistent with the desired weak convergence, the construction rearward of the stop is confined strictly to one component, that is with but two "air" surfaces whatever the internal construction of the component may be. (As used herein a "group" comprises one or more air-spaced "components," where a "component" has two air-contacting surfaces and is composed of one or more "elements".)

As discussed further below, a focusing means can be inserted between the stop and the rear component. Except for minor readjustments caused by interpolation of such focusing means, the rear component otherwise retains its characteristics. Except for the focusing means, the invention is therefore restricted to a single rearward component having a moderate total central thickness for purposes of improving compactness, and an "air" surface adjacent to the stop or interpolated focusing means that is generally convex or at most weakly concave, according to the field angle or other combinations of parameters.

The total thickness of the rearward component must be at least a reasonable value to allow for the curvatures of its "air" surfaces. The lower limit is small if the component lies relatively near the stop and if the aperture-ratio is moderate, such as f/10, e.g., the lower limit is on the order of 0.01 times the EFL of the entire lens system. The upper limit is on the order of 0.05 times the EFL if numerous cemented elements, which would unduly increase the cost of the lens system, are to be avoided. At this upper limit, the air surface adjacent to and opposed to the stop or to the interpolated focusing means, if any, tends toward plano and the final air surface tends to become strongly convex and curved more or less about the exit pupil. Also, at the upper limit, the overall length of the objective tends to become somewhat long for a compact construction for the camera. Accordingly, operating towards the middle to lower end of the range of thicknesses for the rearward component is normally preferred.

Similarly, to achieve compactness, the axial displacements of the last air surface of the first group and the first air surface of the rearward component with respect to the stop are relatively small, that is, the respective surfaces lie close to the stop. For the forward group, the concavity requires enough displacement axially from the stop to prevent interference of the periphery of the lens surface in its cell, if any, with the action of the shutter and stop, the latter usually comprising an iris or similar defining and variable opening. Optimum results are generally obtained if the rear surface of the forward component adjacent to the stop lies at a moderate distance from the stop, owing to the strong negative curvature of the surface, and generally curved about the stop, as is the case for the Hypergon.

Generally, the first group will include at least one plastic element having an aspheric surface. In the simplest case the aspherizing may be confined to the concave surface adjacent to and opposed to the stop, if the associated lens element is made of plastic.

Different considerations apply to the rear group than the front group. There are numerous lens designs that have complex structures following the stop, many with lead-off concave surfaces but the overall length of the objective and the clear apertures of the rearmost surfaces become much increased if wide angle performance is to be achieved. For purposes of the present invention, compactness requires that convergence after the stop be not too long delayed, either by too large an axial displacement from stop to lead-off surface of the rear component, or by use of a lead-off concave surface. The present invention is distinguished from the prior art in part from the fact that well-corrected optical performance is achieved even though the rearward component is relatively thin and relatively near the stop.

In quantitative terms, the axial clearance of the forward surface of the rear component from the stop should have a minimum value of about 0.015 times the EFL of the lens system. To achieve compactness, the upper limit is preferably set at about 0.050. For example, in Example 1, the axial separation between the stop and the front refracting surface of the rearward component is 0.038 times the lens system's EFL, which is within the 0.050 limit. While an even larger value is permissible for some applications, in general, the 0.050 value is appropriate for most applications of the present invention.

With respect to the rear component, there is also another way of looking at the limitations on total thickness and location. It is important as to the location of the convex rear air surface, if the front surface of the rear component tends toward plano. In this instance most of the converging power rests with the convex last refracting surface. The resulting strong curvature about the exit pupil is favorable for reducing the contribution of the surface to the undercorrected astigmatism of the system, particularly if the net convergence of the front component is weak. Conversely, if the element is thin, the axial separation from the stop becomes larger and indeed at or near the upper bound stated above. The refractive power of the component reacts favorably on the correction for distortion, that is, toward an inward or barrel-type refraction which offsets most if not all of the outward or pin-cushion refraction of the forward group. Correction for distortion need not be complete and thus the overall system can be held to a pin-cushion residual acceptable according to the application.

It should be noted that with respect to the off-axis refracting power of the rear component, a larger air space produces a kind of lever arm action which must not be overdone. It should also be noted that, except for wider angle systems, as the air space becomes larger and the rear component thinner, the first air surface of the rear component tends to become more and more convex and the rear surface weaker. This result holds true even if a focusing means is interpolated between the stop and the rear component.

In accordance with the invention, it is preferred to use at least one aspheric surface in the front group and not more than one in the rear component. The aspheric coefficients of power terms in a series expression for the physical shape of the aspheric surface act as additional parameters, both for the forward group and for the rear component. Optimization procedures then produce favorable compactness, relatively short barrel lengths as an offshoot of compactness, and above all, improved correction for the many lower and higher order aberrations described above. Also, by means of these parameters, as well as the other optical parameters of the system, economy of construction, insensitivity to alignment errors, relative insensitivity to thermal changes of focus, and the like can be achieved to a greater or lesser extent depending upon the particular application.

Prior plastic systems used as camera objectives, including those having aspheric surfaces, have in many cases suffered from uncorrected longitudinal and lateral chromatic aberrations, as indeed have the landscape plastic and glass simple systems described earlier.

While the double meniscus systems with central stop generally have excellent correction for lateral chromatic aberration, that is to say, far off-axis images are more or less point-like rather than short spectra, the double meniscus forms are not short nor even compact. If the design makes use of a relatively short unsymmetrical barrel, as for the present invention, lateral chromatic aberration, if present, may indeed lead to degraded image quality at large off-axis angles. In the case of longitudinal chromatic aberration at f/10 more or less, the situation is much more forgiving. If not overdone, an improvement in depth of focus may even result.

Accordingly, in accordance with certain aspects of the invention, the lens system neglects longitudinal chromatic aberration but corrects for lateral chromatic aberrations. A short lens barrel also is helpful in this respect and may be thought of as a by-product of the designs conforming in other ways to the ranges and limitations expressed in this specification. In addition, a choice of materials front and rear is helpful.

Thus, the front group, at least for the simplest constructions, produces a net outward dispersion of the chief rays (such rays are defined as passing through the axial point of the real stop, one for each field angle), and the rear component, at least for the simplest constructions, an inward net dispersion. By arrangement of materials, lens powers and locations, a quite complete correction for lateral chromatic aberration over the field of view is achieved. A requirement, however, is that the rear component contain a material of strong dispersive power for a positive element in the rear component, which in the simplest case stands alone. This requirement is all the more important if the rear component lies near the stop. Incomplete correction, though a partial improvement, is allowable according to the image quality sought, but in any event, for purposes of this invention, at least some reduction in the lateral chromatic aberration for the system is generally required, as compared to that obtaining for a completely uncorrected system of equivalent monochromatic correction.

Thus, if a weakly dispersive material such as CHM or plexiglas ® is used for the strongest positive element in the rear component, particularly if the rear component is comprised in the simplest form of but a single positive element, the correction for lateral chromatic aberration in the case of the unsymmetrical objective forms outlined above, though partial, is generally inadequate. For purposes of the present invention one generally must resort to some more dispersive material for use as a positive element in the rear component. Viable materials are available, such as AN (acrylonitrile), styrene, or polycarbonate, where a moldable plastic is used. There will also be the cases where the rear component contains a dispersive glass element with spherical surfaces, aided by a thin contact element of plastic, including plexiglas ® or CHM, if only for the purpose of incorporating an aspheric surface on the plastic element or elements. In all these circumstances the design purpose is to achieve some marked reduction of the lateral chromatic aberration. Objectives not having such a reduction are generally not to be considered as part of the present invention.

Moreover, if the rear component is compounded of at least two materials of high and low dispersive powers, which can be called hyperchromatic for the net action resulting, it becomes possible to continue the correction or reduction in lateral chromatic aberration, even if the material of highest dispersive power for the positive element is not as dispersive as for the simpler, non-hyperchromatic combinations. This is true even if the hyperchromatic pairing lies near the stop. It is for this reason, when taken together with the stated bounds on axial location and dioptric power of the rear component that the present invention includes systems with two or more elements bonded together in optical contact to effect the correction and to simulate the action of non-existing single materials.

In summary, it is a purpose of this invention to require that a reduction in lateral chromatic aberration for the system as a whole be effected at least in part, as measured by the spectral spread in the image surface of an otherwise desired image point, according to the off-axis angle and spectral band-width, for uncorrected and totally or partially corrected systems being compared.

Thus, the inventive systems comprise a type of unsymmetrical objective which is compact, in terms of both barrel length and overall length, which provides improved performance for systems of moderate speed, such as f/8 or slower, having only a single rear component or which may incorporate a focusing means between said rear component and stop, such an objective having acceptable correction for distortion not exceeding 5%, according to aspheric powers and complexity of construction.

For practical reasons, any given plastic moldable element should either have spherical surfaces or not more than one of its two surfaces aspheric. To do otherwise, that is to say, if both surfaces were to be made aspheric, one usually will encounter serious misalignment, that is, lateral decentering of the respective aspheric zones, particularly if higher order aspheric terms of significance are present. Similarly, it is not feasible in large production runs for a design to have bonded aspheric surfaces of contact between adjacent elements of different materials. For purposes of the present invention, therefore, one can say that if more than one aspheric surface is used forward of the stop (that is to say, on the long conjugate side of the stop), there will be a corresponding number of plastic elements with any given aspheric at an air surface of the host element. In general, it is sufficient for the purposes of the present invention to limit the number of aspheric surfaces forward of the stop to not more than two. According to the application, the particular aspheric surface may lie either on the forward surface of its host element or on the rear. For the single rear component, having therefore only two air surfaces, either one of these two surfaces may be aspheric but in general not both.

The objectives can be further modified by interpolation of some form of focusing means immediately following the stop and preceding the above discussed rear component. It is intended that the maximum axial distance between the shutter and rear surface vertex of the rear component not be increased, but that instead, enough space be left between the stop and the front surface vertex of the rear component for the aforesaid interpolation of a focusing means. Further discussion of the focusing means appears below.

Aspheric surfaces that are separated along the optical axis from front to rear of the objective not only have aspheric power zone by zone on the respective surface but also have a lever arm effect on refracted rays in interaction between one another. If the aspheric surfaces are far apart, the aspheric power zone by zone on either surface may be weak but varying in strength of the refractions in interplay over any angular field required. If the aspheric surfaces are close to one another, the respective coefficients often tend to be quite large but usually with less variation over the field. Moreover, higher order aspheric terms that are far apart tend to affect images in the tangential direction more sensitively than at right angles thereto. An image having an ambient aberrational extent in a direction radially outward, particularly if far from the center of the field, may be pulled together to an image core that improves the focusing effect for tangential lines while the skew direction of the image remains only partially improved in focusing effect for radial lines. Sometimes this azimuthal variation in correction may be useful if the uncorrected aberrations have the opposite tendencies, but more often not. If the aspheric surface lies relatively near to the stop, then even the higher order terms may be more tractable in the various azimuths of the image.

In terms of the present invention, the single aspheric of the rearward component, if any, may be on either air surface. Forward of the stop, at least one aspheric air surface preferably lies on the component nearest the stop, whether on the forward or rear surface of this component.

In the text above, the term "air surface" has been used. It is generally true that the hand camera objective is immersed in ordinary air at a density varying with elevation above or below the earth's mean surface. In space technology, however, it may prove necessary to use some other gaseous medium, such as dry nitrogen, or helium, or other gas, at a gas pressure from some maximum value down even to zero if a true vacuum is required. Clearly, the refractive actions of the surfaces of the present invention are not affected substantially thereby, except for a slight refocusing required and calibration of scale, and the governing principles within the scope of this invention remain essentially the same. The term "air" surface is accordingly used herein in a generic sense purely by way of reference, for the case of the vacuum is also included. In particular, in this specification and in the appended claims, the phrases "air surface" and "air-spaced" are to be understood to include a vacuum and media other than air when used in the practice of the invention.

One of the important features of the present invention is that the concave surface adjacent to and forward of the stop is very strongly curved. For Example 1 (FIG. 1 Series and Table 1) the axial curvature (1/R) of this surface is 7.61 in terms of the dioptric power for the system as a whole being taken as 1.000. Such a strong curvature is unusual in camera objectives except for wide angle systems of moderate aperature-ratio, such as f/5 to f/60 or so, the latter as for the Hypergon. Clearly, the front group cannot have the weak net positive power alluded to earlier unless there is at least one strongly positive compensating surface forward of the concave surface adjacent to the stop.

In quantitative terms, the concave surface adjacent to and forward of the stop should in general have a curvature in the range from about 4.0 to about 10.0 without regard to algebraic sign in terms of the dioptric power of the system as a whole being taken as 1.0. In the examples discussed below, the range for this surface is between 5.1 and 7.7. The wider recommended range allows for variations derived from wider field angles, or higher f-numbers, or for some special requirement such as clearance between lens surface and shutter action, where no change in principle occurs.

In the specific instance of Example 1 the lens group forward of the stop is comprised of but a single plastic element of plexiglas ® with the concave surface adjacent to the stop being aspheric. This is about the simplest forms of forward group lying within the scope of the present invention. The element is relatively thick in that the axial thickness is 0.060 of the equivalent focal length, and the forward surface is almost as strongly curved as the rear, the net power arising from the separation of surfaces. As noted above, the net dioptric power of this single element is 0.391 and the equivalent focal length of the element is 2.556. A real image is formed to the right if entered on the usual lens drawing.

For Example 1, the single component lying rearward of the stop is formed of but a single element of styrene and the rear surface of this element is both weakly curved and aspheric, the surface being slightly convex. If plexiglas ® were to be used for this single rear element instead of styrene, the high v-value or low dispersive power of plexiglas ® would have resulted in a marked amount of lateral chromatic aberration. Although a single rear plexiglas ® positive element does in part counteract the opposite contribution to lateral chromatic aberration of the meniscus lens element forward of the stop, the compensation is inadequate. One can take the net lateral chromatic aberration of such an all-plexiglas ® system as defining lateral chromatic aberration in a quantitative sense, e.g., as the radial extent of an image as a short spectrum instead of as the desired point image measured radially at some off-axis angle between red and blue wavelengths. Uncorrected lateral chromatic aberration is a defect for chief rays too, even though the lens aperture may be stopped down nearly to zero. When styrene is used for the rear component as in Example 1, the radial extent of the short spectrum is reduced virtually to zero.

Example 3 (FIG. 3 Series and Table 3) is closely related to Example 1 in general nature except that polycarbonate or PC has been used instead of styrene. The dispersive power of polycarbonate is approximately the same as for styrene, the respective nu-values being 29.9 (PC) and 30.8 (styrene). For comparison, the nu-value for plexiglas ® is 57.2, while that for AN is 34.9 approximately. Thus, any one of the three dispersive plastic materials styrene, PC or AN will reduce lateral chromatic aberration to acceptable residuals, as compared to use of plexiglas ® alone.

It should be noted that use of a very dispersive medium for the positive lens of the rear component, while needed for reducing or eliminating lateral chromatic aberration, increases the undercorrected longitudinal chromatic aberration of the system as a whole. It should also be noted that if elaborate compounding of elements of different dispersive power is employed within the lens group forward of the stop, or if multiple strong elements are used, as for many photographic objectives, it is feasible to reduce the longitudinal chromatic aberration to such a level that use of plexiglas ® for the rear element will lead to correction for lateral chromatic aberration. Such elaborate construction however results in extra costs and complexity, not in keeping with the needs of an economic photographic objective intended for the mass market.

Within the scope of this invention, it is intended that the longitudinal chromatic aberration of the front group is only partially corrected, if at all, and that the use of a dispersive medium for a positive element in the rear component may actually increase the longitudinal chromatic aberration for the system as a whole. The dividing line rests with the choice of dispersive medium for the rear component, where one can take an averaged value for the rear pairings, if of more than one element, or if but a single element, for the one plastic medium, as being not larger than 44.0, about the halfway point for the specific materials already mentioned. At this halfway point either the longitudinal chromatic aberration of the system as a whole, as a result of elaboration of construction and materials in the front group, is about 50% corrected with the effective elimination of lateral chromatic aberration, or else the lateral chromatic aberration is about half corrected, if the group of elements forward of the stop is not at all corrected for longitudinal chromatic aberration.

Apart from considerations of chromatic corrections there is another reason for elaboration of the structure of the front group. Plastic molded elements are economical and well suited for the mass market. However, at least to some extent, a need exists for having a lead-off element made of an optical glass and generally therefore with spherical surfaces. Hand cameras quite often receive rough treatment in the family environment in that the front surface becomes soiled, abraded, or corroded. Accordingly, for some cameras it becomes desirable to have the simple element used in Example 1 or in Example 3 protected by the addition of a front spherically surfaced glass element. For minimization of costs with respect to lens cells, and other mounting details, it is desirable that the one glass element with a single companion plastic element (with one aspheric surface) comprise a more elaborate front lens group fitting the same cell as for the simpler cases of Examples 1 or 3. Such a two-element front group fitting the same cell and mount as for the single element front component may be called a "drop-in" replacement, to be used or not used, as desired. Examples 2 and 4 (Figures and Tables) thus have glass front elements that by design and in combination with suitably shaped plexiglas ® second elements form "drop-in" equivalents of Examples 1 and 3 having glass front surfaces. The optical performances remain very nearly the same and no new principles are introduced affecting the range of parameters already discussed.

It has been mentioned above that the lens systems incorporating the several principles of this invention can be further modified by the interpolation of focusing means between the stop and the front surface of the rear component. Various forms of focusing are known in the art. One of the oldest is physical movement of the objective as a whole along the optical axis until the image conjugate to the object surface is focused as well as need be on the recording surface of the camera. This kind of focusing can be used with the lens systems of this invention to achieve focusing for object planes from 4 equivalent focal lengths of the objective at the near point through a continuous range up to an infinite object distance.

Interpolation of focusing means can be used instead of the above discussed physical movement of the objective as a whole. In particular, compactness and camera construction may preclude any marked change in position of the objective and instead, one may interpolate a much more compact focusing means. Known in the art is the direct interpolation of one or more dioptrically weak elements of glass or plastic, but only one at a time to accord with any given object distance. Such weak dioptric elements can be arranged on an eccentric wheel and if of plastic molded as a unit to accommodate several interchangeable weak elements according to the angular setting of the disc. For any given object distance the corresponding element will be centered in position on the optical axis between stop and rear component. If of plastic, weak aspherics may also be used for each of the weak elements on the disc to improve performance according to the object distance. Such aspherics are permitted and are not to be confused with the aspherics previously described on one of the air surfaces of the rear component.

Another form of focusing known in the art is the interpolation of a pair of plates, each with an external plano optical surface, in close juxtaposition on the optical axis immediately following the stop as, for example, that disclosed in U.S. Pat. No. 3,583,790 issued to James G. Baker on Jun. 8, 1971. The opposed and adjacent internal surfaces of the pair of plates can be of an aspheric shape of analytic mathematical surfaces described in detail by polynomial expressions of non-rotational terms in x and y up to some cutoff term in what may otherwise be a power series that represents the desired analytic surface mathematically to any desired precision. The polynomial terms may include the ordinary second and higher order rotational terms of any dioptric surface and aspherics normally associated with purely rotational aspheric surfaces. Focusing is accomplished by an eccentric rotation of one or both of the plates about axes displaced laterally from the optical axis generally completely outside of the interrupted lens barrel. Another means is to slide one or both of the plates laterally such that the plano surface on each remains in its own plane during the sliding. The quantitative nature of the polynomial terms are optimized throughout the focusing range according to the type of focusing motion of the plates deemed desirable for the application.

2. Specific Embodiments and Applications

FIGS. 1–7 illustrate various lens systems constructed in accordance with the invention. Corresponding prescriptions appear in Tables 1 to 7, respectively. The dimensions given in these tables have been normalized to the EFL of the lens which is nominally 100 mm. The aspheric coefficients set forth in the tables are for use in the following equation:

$$z(r) = \frac{cr^2}{1 + [1 - (1 + K)c^2r^2]^{\frac{1}{2}}} + Ar^4 + Br^6 + Cr^8 + Dr^{10}$$

where $r^2 = x^2 + y^2$, c is the curvature at the pole of the surface, K is a conic constant ($K = -e^2$), which for the lenses of Tables 1-7 is zero, and A, B, C, and D are the 4th, 6th, 8th, and 10th order deformation terms.

In overview, the examples of FIGS. 1 and 3 show the two-component form of the lens system of the invention. Example 1 uses styrene for the rear component, and Example 3 uses PC. Examples 2 and 4 illustrate the use of a "drop-in" plastic-glass combination with the front element being made of glass. Examples 5-7 show further variations embodying the principles of the invention. Example 5 increases the field to 62 degrees; Example 6 has very low distortion as well as a glass front element; and Example 7 includes a focusing means.

Figure 8:
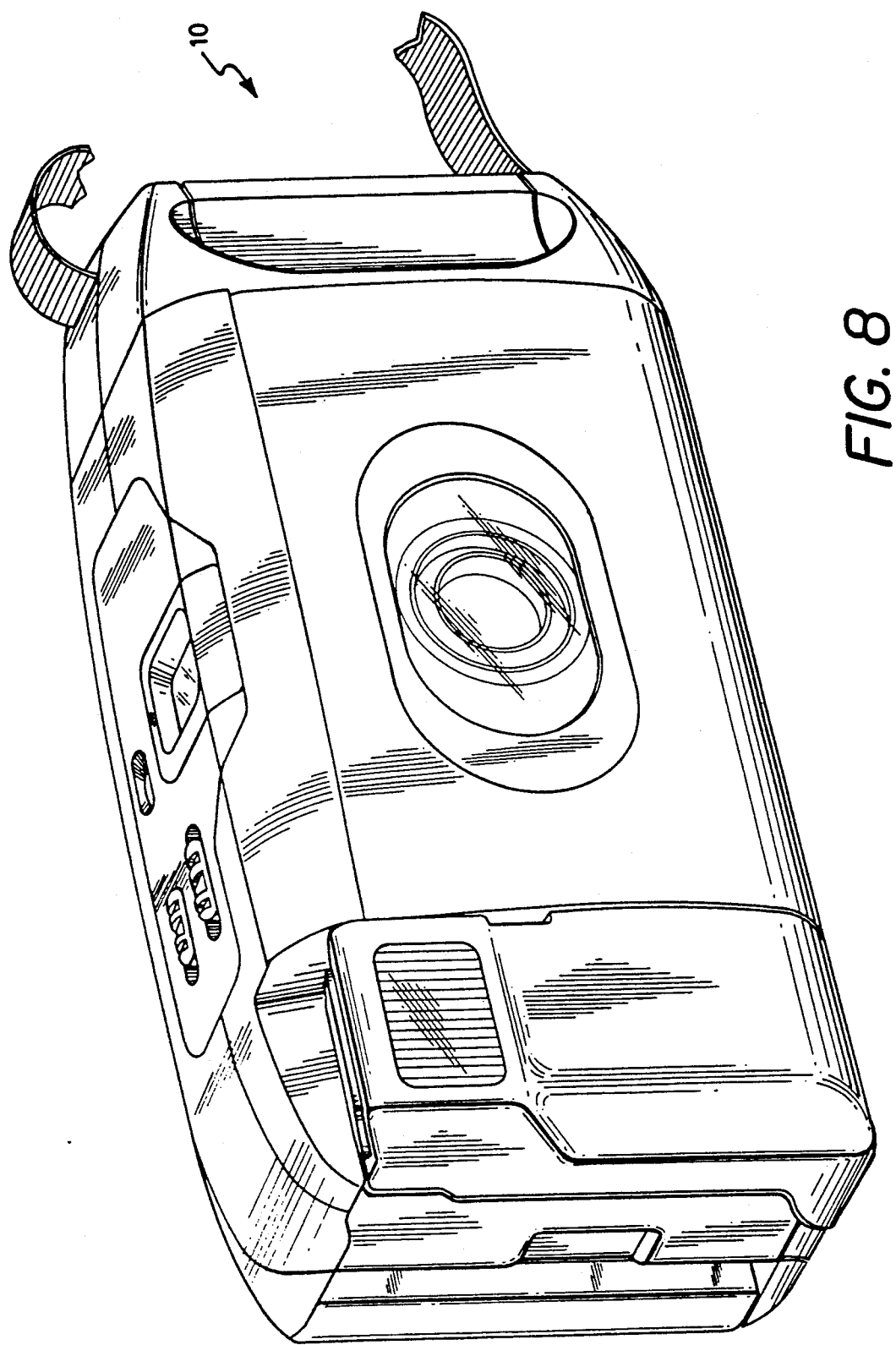
FIG. 8 is a perspective view of a folding reflex camera with which the lens systems of the present invention can be used. As shown in this figure, the camera is in its folded configuration.
Figure 9:
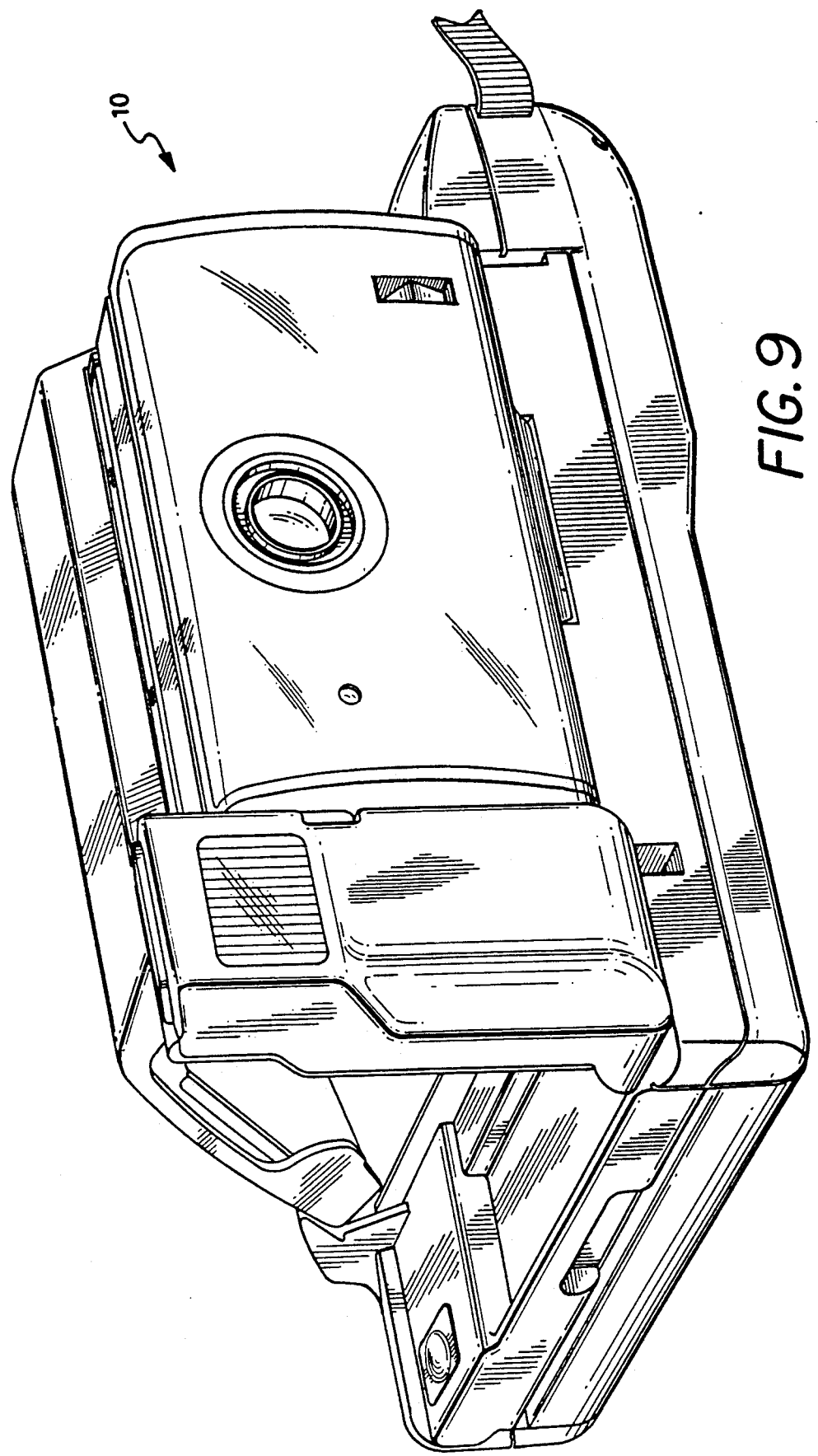
FIGS. 9 and 10 are perspective and side views, respectively, of the camera of FIG. 8 in its unfolded configuration.
Figure 10:
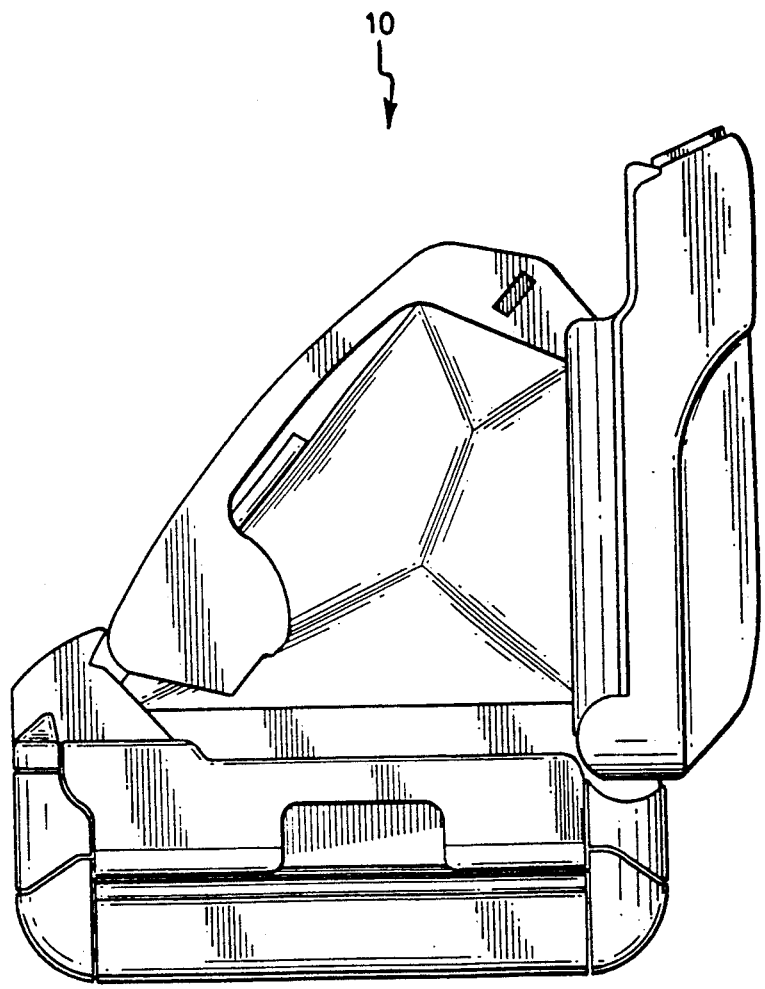
Figure 11A:
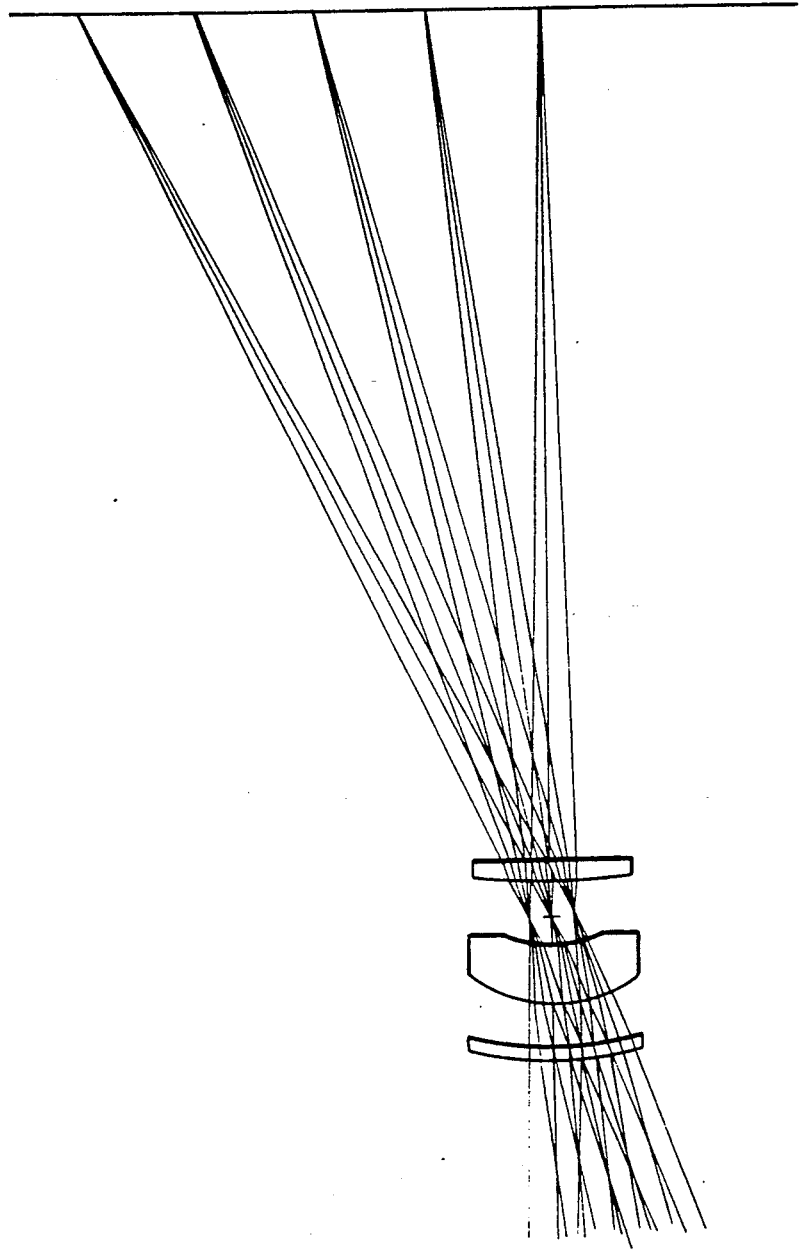
Figure 11B:
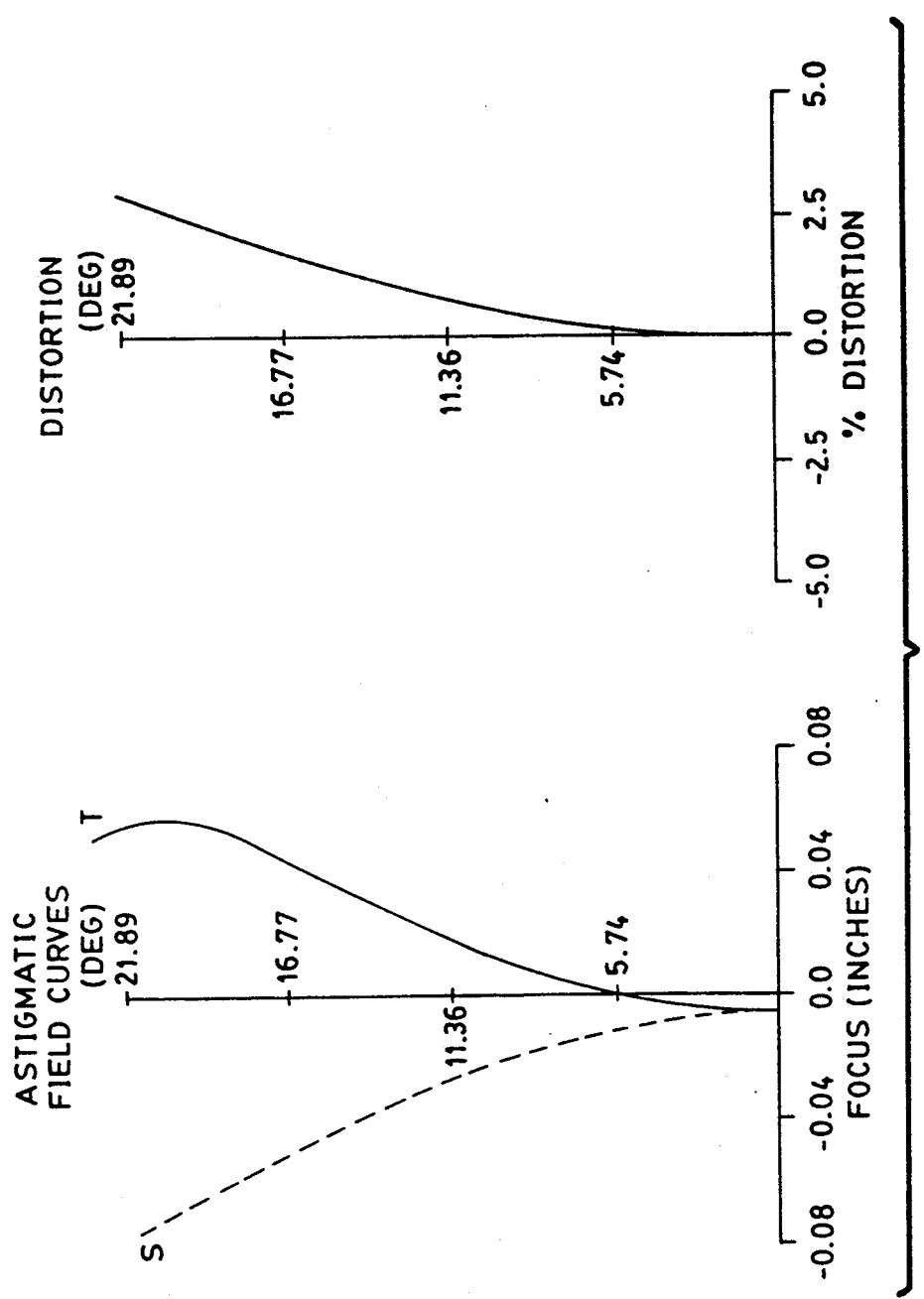
Figure 11C:
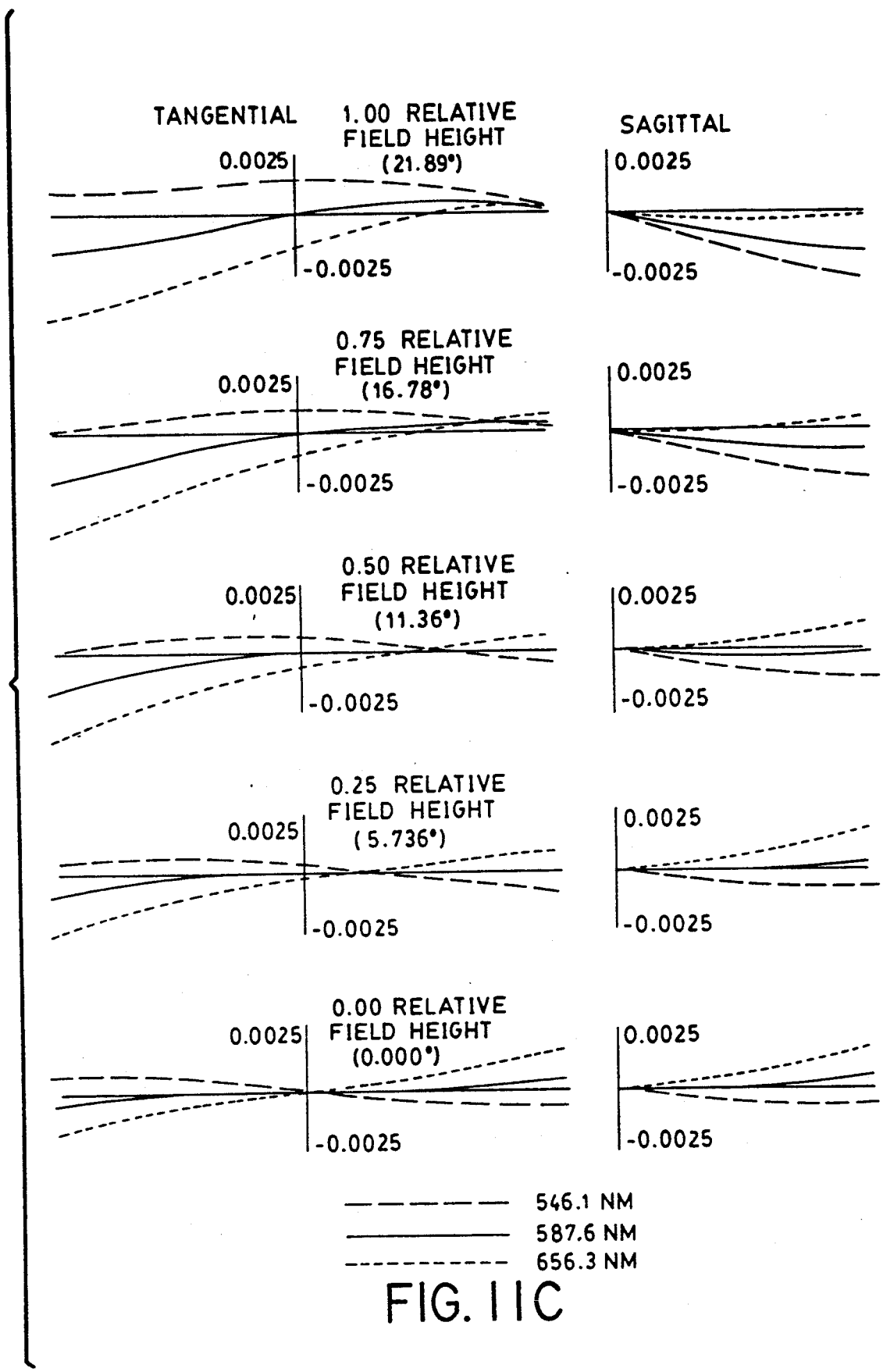
Figure 11D:
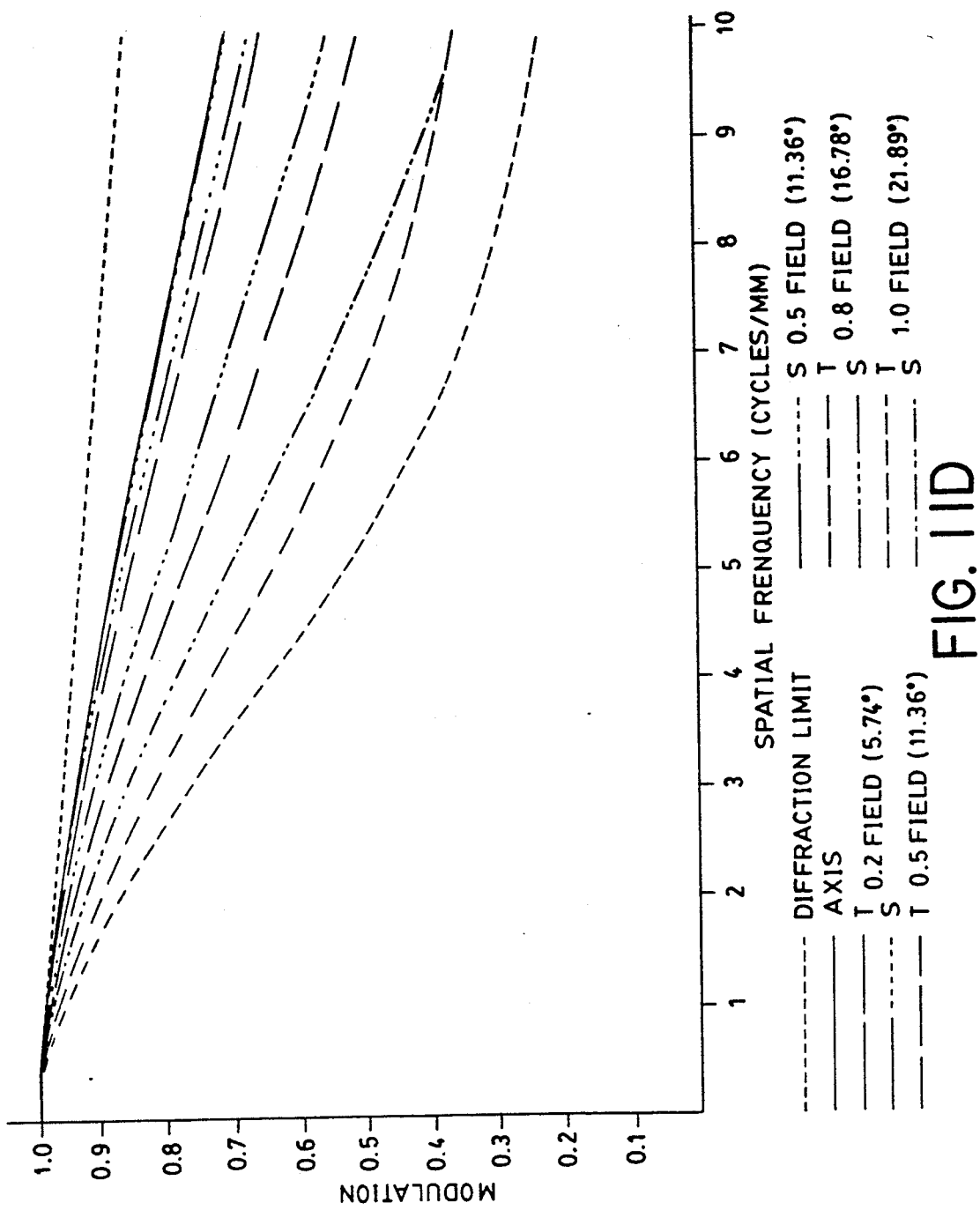

A preferred application of the objective lens systems of the present invention is in connection with a folding, reflex camera 10 such as the one illustrated in FIGS. 8-10. FIG. 8 shows camera 10 in its folded condition and FIG. 9 and 10 in its fully erected, picture taking condition. If the base of camera 10 is placed on the horizontal, the objective "looks" slightly up. The camera preferably accepts instant, or self-processable, film whose format can be, for example, 2.15 by 2.87 inches with a diagonal of 3.586 inches.

Prior to taking a picture, camera 10, upon actuation by pressing a shutter button, automatically determines which one of two zones the subject is in and then, depending on the zone, sets the objective lens system in one of two possible configurations to assure that the subject will be sharply reproduced (see below).

In both of its configurations, the lens system preferably has a maximum aperture of f/10 with a semi-field coverage of 14.25 by 18.76 degrees with a half diagonal of 23.05 degrees. The effective focal length preferably is 99.1 mm. Preferably, distortion is less than 3%, and the blur diameter due to all aberrations is less than 0.005 inches.

The lens system, here preferably example 7 of FIGS. 7A-7E and Table 7, preferably includes two plastic elements. The first element is molded of plexiglas ® and has an aspheric rear surface. Following the first element is a stop which is preferably oblong in shape being longer along the y-axis, the up and down of the camera, than in the x-axis, the horizontal azimuth of the camera.

Following the stop, adjacent and in alignment with it, are a pair of apertured reciprocating blades (not shown) that open and close to control exposure. In the x-direction, the maximum aperture is f/14 while in the y-direction, it is f/10 for an average overall aperture of about f/12. Hence, the f/10 designation has been adopted to go along with the maximum in the y-direction.

Following the reciprocating blades is a second positive lens made of polystyrene having a first surface which is spherical and a second surface which is aspheric.

Following the second element is a plano mirror (not shown) for folding the optical path and following that is the film surface which is slightly curved inwardly, i.e., the ends bend toward the front of the camera 10. In particular, the film surface is curved in the x-z plane and, as such, must be included in evaluating the overall performance of the camera optical system, i.e., objective plus curved film surface, because it relaxes the demands on the objective for correcting curvature of field.

The second, longer focal length configuration of the lens system is achieved by introducing a supplemental lens in the intervening space between the two elements of the first configuration. This lens is preferably made of plexiglas ®, has a net negative power and is positioned along the optical axis following the stop and shutter blades. This element is preferably all spherical, although an aspheric surface can be included if desired. By introducing this element, the net power of the combination is reduced, nominally focusing it at 11 feet with a range of focus of 8 feet to infinity. A suitable prescription for this focusing lens, focusing to infinity for example, to an image position preset beyond a focal point for alternate usage, for use with the lens system of Table 3 is given in Table 7. The front vertex of the focusing lens is located 0.0128 behind the stop in Table 7.

As discussed above, the lens system's front plastic element can be replaced by a glass-plastic combination. The glass element can be made of BK7 glass from the OHARA glass catalog. In both the near and far configurations, the remainder of the optics following the glass-plastic pair are as before. As also discussed above, the glass-plastic pair is preferably packaged so that its outside shape and dimensions match those of the plastic front element of the all plastic version so that it can be used as a "drop-in" replacement during manufacturing. This is accomplished by encapsulating the outside exterior surfaces of the glass-plastic combination in a casing which closely matches the exterior geometry of the plastic version.

With both the all plastic and glass-plastic version, a close-up lens can be provided. The close-up lens, which is a manual, external attachment, can be made of plexiglas ® and preferably has spherical surfaces. This element is intended to be used at a aperture no larger than f/40 so its shape is not critical, just its power. It can nominally focus the camera at 12 inches and can have a range of focus which is largely dependent on exposure errors rather than optical capability. This is because exposure errors vary as the inverse of the fourth power and are large at this distance range (small changes result in large exposure errors) while focus errors are less sensitive. In other words, the exposure errors will become noticeable so quickly that they will completely overwhelm any blurriness that may be present. A suitable prescription for the close-up lens for use with the lens system of Table 3 is given in Table 8. The rear vertex of the close-up lens is forward of the front vertex of the lens system of Table 3.

Although specific embodiments of the invention have been described and illustrated, it is to be understood that a variety of modifications which do not depart from the scope and spirit of the invention will be evident to persons of ordinary skill in the art from the foregoing disclosure. For example, the front group may be made of glass and the rear moldable plastic with the difference in their Abbé v-values exceeding 10 numerically. The following claims are intended to cover the specific embodiments set forth herein as well as such modifications, variations, and equivalents.

TABLE 1

| Surface No. | Radii | Separations | n(d) | nu |
|---|---|---|---|---|
| 1 | 0.1369 | 0.0604 | 1.492 | 57.2 |
| 2 | 0.1314* | 0.0257 | | |
| 3 | Stop | 0.0380 | | |
| 4 | 0.843 | 0.0203 | 1.592 | 30.8 |
| 5 | −18.18* | 0.817** | | | overall length = 0.9614;
48.9°, infinite object distance
f = 1.000
*aspheric
**back focus, inf. obj. dist. (to focal point)
Aspheric Surface Data:

| Surface | A | B | C | D |
|---|---|---|---|---|
| 2 | $0.345 \times 10^2$ | $0.121 \times 10^0$ | $0.180 \times 10^{-3}$ | $0.277 \times 10^{+1}$ |
| 5 | $-0.481 \times 10^0$ | $-0.108 \times 10^4$ | $-0.351 \times 10^{-2}$ | $-0.609 \times 10^{-5}$ |

TABLE 2

| Surface No. | Radii | Separations | n(d) | nu |
|---|---|---|---|---|
| 1 | 0.1363 | 0.0221 | 1.516 | 64.1 |
| 2 | 0.1631 | 0.0010 | | |
| 3 | 0.1664 | 0.0374 | 1.492 | 57.2 |
| 4 | 0.1315* | 0.0257 | | |
| 5 | Stop | 0.0381 | | |
| 6 | 0.8440 | 0.0203 | 1.592 | 30.8 |
| 7 | −18.19* | 0.817** | | |

OAL = 0.9616;
48.9°, inf. obj. distance
f = 1.000
*aspheric
**back focus, inf. obj. dist. (to focal point)
Aspheric Surface Data:

| Surface | A | B | C | D |
|---|---|---|---|---|
| 4 | $0.354 \times 10^2$ | $0.136 \times 10^0$ | $0.725 \times 10^{-3}$ | $0.275 \times 10^{+1}$ |
| 7 | $-0.479 \times 10^0$ | $-0.108 \times 10^4$ | $-0.349 \times 10^{-2}$ | $-0.605 \times 10^{-5}$ |

TABLE 3

| Surface No. | Radii | Separations | n(d) | nu |
|---|---|---|---|---|
| 1 | 0.1351 | 0.0610 | 1.492 | 57.2 |
| 2 | 0.1297* | 0.0260 | | |
| 3 | Stop | 0.0384 | | |
| 4 | 0.7628 | 0.0205 | 1.586 | 29.9 |
| 5 | 10.50* | 0.811** | | |

OAL = 0.9569;
49.4°, inf. obj. distance
f = 1.000
*aspheric
**back focus, inf. obj. dist. (to focal point)
Aspheric Surface Data:

| Surface | A | B | C | D |
|---|---|---|---|---|
| 2 | $0.370 \times 10^2$ | $0.115 \times 10^0$ | $0.167 \times 10^{-3}$ | $0.252 \times 10^{+1}$ |
| 5 | $-0.676 \times 10^0$ | $-0.102 \times 10^4$ | $-0.326 \times 10^{-2}$ | $-0.554 \times 10^{-5}$ |

TABLE 4

| Surface No. | Radii | Separations | n(d) | nu |
|---|---|---|---|---|
| 1 | 0.1378 | 0.0223 | 1.516 | 64.1 |
| 2 | 0.1650 | 0.0010 | | |
| 3 | 0.1670 | 0.0378 | 1.492 | 57.2 |
| 4 | 0.1332* | 0.0260 | | |
| 5 | Stop | 0.0385 | | |
| 6 | 0.8694 | 0.0205 | 1.586 | 29.9 |
| 7 | −18.44* | 0.814** | | |

OAL = 0.9601;
49.4°, inf. obj. distance
f = 1.000
*aspheric
**back focus, inf. obj. dist. (to focal point)
Aspheric Surface Data:

| Surface | A | B | C | D |
|---|---|---|---|---|
| 4 | $0.346 \times 10^2$ | $0.129 \times 10^0$ | $0.671 \times 10^{-3}$ | $0.249 \times 10^{+1}$ |

TABLE 4-continued

| | | | | |
|---|---|---|---|---|
| 7 | $-0.695 \times 10^0$ | $-0.943 \times 10^3$ | $-0.323 \times 10^{-2}$ | $-0.548 \times 10^{-5}$ |

TABLE 5

| Surface No. | Radii | Separations | n(d) | nu |
|---|---|---|---|---|
| 1 | 0.1442 | 0.0627 | 1.492 | 57.2 |
| 2 | 0.1448* | 0.0295 | | |
| 3 | Stop | 0.0438 | | |
| 4 | 1.1082 | 0.0151 | 1.586 | 29.9 |
| 5 | −7.201* | 0.811** | | |

OAL = 0.9621;
62°, inf. obj. distance
f = 1.000
*aspheric
**back focus, inf. obj. dist. (to focal point)
Aspheric Surface Data:

| Surface | A | B | C | D |
|---|---|---|---|---|
| 2 | $0.323 \times 10^2$ | $0.117 \times 10^0$ | $0.167 \times 10^{-3}$ | $0.253 \times 10^{+1}$ |
| 5 | $-0.136 \times 10^0$ | $-0.439 \times 10^3$ | $-0.327 \times 10^{-2}$ | $-0.556 \times 10^{-5}$ |

TABLE 6

| Surface No. | Radii | Separations | n(d) | nu |
|---|---|---|---|---|
| 1 | 0.1659 | 0.0339 | 1.621 | 60.3 |
| 2 | 0.2070 | 0.0011 | | |
| 3 | 0.2092 | 0.0161 | 1.492 | 57.2 |
| 4 | 0.1511* | 0.0416 | | |
| 5 | Stop | 0.0410 | | |
| 6 | −0.5831 | 0.0218 | 1.586 | 29.9 |
| 7 | −0.3173* | 0.874** | | |

OAL = 1.0295;
52.2°, inf. obj. distance
f = 1.000
*aspheric
**back focus, inf. obj. dist. (to focal point)
Aspheric Surface Data:

| Surface | A | B | C | D |
|---|---|---|---|---|
| 4 | $0.281 \times 10^2$ | $0.234 \times 10^0$ | $0.453 \times 10^{-3}$ | $0.225 \times 10^{-11}$ |
| 7 | $-0.439 \times 10^1$ | $-0.877 \times 10^3$ | $-0.247 \times 10^{-1}$ | $-0.489 \times 10^{-8}$ |

TABLE 7

| Surface No. | Radii | Separations | n(d) | nu |
|---|---|---|---|---|
| 1 | 0.1351 | 0.0610 | 1.492 | 57.2 |
| 2 | 0.1297* | 0.0260 | | |
| 3 | Stop | 0.0128 | | |
| 4 | −266.1* | 0.0128 | 1.492 | 57.2 |
| 5 | Plano | 0.0119 | | |
| 6 | 0.7628 | 0.0205 | 1.586 | 29.9 |
| 7 | 10.50* | 0.813** | | |

OAL = 0.9583;
49.4°, inf. obj. distance
f = 1.000
*aspheric
**back focus, inf. obj. dist. (to focal point)
Aspheric Surface Data:

| Surface | A | B | C | D |
|---|---|---|---|---|
| 2 | $0.370 \times 10^2$ | $0.115 \times 10^0$ | $0.167 \times 10^{-3}$ | $0.252 \times 10^{+1}$ |
| 4 | $0.532 \times 10^1$ | $0.211 \times 10^0$ | $0.135 \times 10^{-2}$ | $0.148 \times 10^{-4}$ |
| 7 | $-0.676 \times 10^0$ | $-0.102 \times 10^4$ | $-0.326 \times 10^{-2}$ | $-0.554 \times 10^{-5}$ |

TABLE 8

| Surface No. | Radii | Separations | n(d) | nu |
|---|---|---|---|---|
| 1 | 0.2856 | 0.0171 | 1.492 | 57.2 |
| 2 | 0.3313 | 0.0453 | | |
| 3 | 0.1351 | 0.0610 | 1.492 | 57.2 |
| 4 | 0.1297* | 0.0260 | | |
| 5 | Stop | 0.0384 | | |
| 6 | 0.7628 | 0.0205 | 1.586 | 29.9 |
| 7 | 10.50* | 0.8855** | | | f = 1.000

TABLE 8-continued

*aspheric
**back focus (to image surface, close up object distance = 3.075f$_0$)

Aspheric Surface Data:

| Surface | A | B | C | D |
|---|---|---|---|---|
| 4 | $0.370 \times 10^2$ | $0.115 \times 10^0$ | $0.167 \times 10^{-3}$ | $0.252 \times 10^{+1}$ |
| 7 | $-0.676 \times 10^0$ | $-0.102 \times 10^4$ | $-0.326 \times 10^{-2}$ | $-0.554 \times 10^{-5}$ |

What is claimed is:

1. A lens system for use in forming an image on a flat or weakly concave recording surface which has a half-diagonal length $D_{\frac{1}{2}}$, said lens system (i) having an equivalent focal length $f_0$, (ii) a diotropic power $K_0$, and (iii) including a stop or aperture, said lens system comprising:

(a) a first group on the object side of the stop or aperture having a positive dioptric power $K_1$ which is in the range from about 0.2 to about 0.5 times $K_0$, said first group comprising a concave surface preceding and adjacent to the stop or aperture, said concave surface having a radius of curvature, if spherical, or a central radius of curvature, if aspheric, lying in the range from about 0.1 to about 0.25 times $f_0$, the vertex or axial point of said concave surface lying within a distance along the lens system's optical axis from the axial point of the stop or aperture not greater than about 1/20 times $f_0$; and (b) a second group on the image side of the stop or aperture consisting of a single component comprising one or more lens elements, said single component having:

(i) only two air surfaces;
   (ii) a positive power;
   (iii) a front vertex which lies axially to the rear of the axial point of the stop or aperture at a distance not greater than about 1/20 times $f_0$;
   (iv) an axial thickness not greater than about 1/20 times $f_0$; and
   (v) a forward surface adjacent to the stop or aperture having a curvature, if spherical, or an axial or central curvature, if aspheric, lying in the range from about $-2.0$ to about $+1.5$ times $K_0$;

said lens system:
   (i) having a total diagonal field of view not exceeding about 62 degrees;
   (ii) having an average field curvature whose magnitude in any azimuth does not exceed about 0.1 times $K_0$;
   (iii) having a distortion not exceeding about 5% of $D_{\frac{1}{2}}$;
   (iv) being corrected at least partially for lateral chromatic aberration; and
   (v) having at least two elements made of materials differing in dispersive powers, at least one of the two elements is plastic.

2. The lens system of claim 1 wherein:

(A) the overall axial length from the lens system's first surface vertex to the focal point in image space does not exceed about 1.030 times $f_0$, external attachments excluded, for an object at infinity; and (B) the overall axial length from the lens system's first surface vertex to the conjugate focus in image space does not exceed about 1.365 times $f_0$, external attachments excluded, for object distances down to but not less than about 4 times $f_0$, object distances being measured from the axial point of the object surface along the axis to the vertex of the first lens surface on the long conjugate side of the lens system.

3. The lens system of claim 2 wherein the overall axial length from the lens system's first surface vertex to its rear surface vertex does not exceed about 0.165 $f_0$, external attachments excluded.

4. A lens system for use in forming an image on a flat or weakly concave recording surface which has a half-diagonal length $D_{\frac{1}{2}}$, said lens system (i) having an equivalent focal length $f_0$, (ii) a dioptric power $K_0$, and (iii) including a stop or aperture, said lens system comprising:

(a) a first group on the object side of the stop or aperture having a positive dioptric power $K_1$ which is in the range from about 0.2 to about 0.5 times $K_0$, said first group comprising:

(i) a concave surface preceding and adjacent to the stop or aperture, said concave surface having a radius of curvature, if spherical, or a central radius of curvature, if aspheric lying, in the range from about 0.1 to about 0.25 times $f_0$, the vertex or axial point of said concave surface lying within a distance along the lens system's optical axis from the axial point of the stop or aperture not greater than about 1/20 times $f_0$; and (ii) at least one aspheric surface; and (b) a second group on the image side of the stop or aperture consisting of two separated subgroups, the first of said two separated subgroups comprising focusing means for focusing the lens system as a whole over a range of object distances from infinity down to about 4.0 times $f_0$, object distances being measured from the axial point of the object surface along the axis to the vertex of the first lens surface on the long conjugate side of the lens system, and the second of said two separated subgroups consisting of a single component comprising one or more lens elements, said single component having:

(i) only two air surfaces;
   (ii) a positive power;
   (iii) a front vertex which lies axially to the rear of the axial point of the stop or aperture at a distance not greater than about 1/20 times $f_0$, said distance containing wholly within it said first of said two separated subgroups;
   (iv) an axial thickness not greater than about 1/20 times $f_0$; and
   (v) a forward surface having a curvature, if spherical, or an axial or central curvature, if aspheric, lying in the range from about $-2.0$ to about $+1.5$ times $K_0$;

said lens system:
   (i) having a total diagonal field of view not exceeding about 62 degrees;
   (ii) having an average field curvature whose magnitude in any azimuth does not exceed about 0.1 times $K_0$;

(iii) having a distortion not exceeding about 5% of $D_i$;

(iv) being corrected at least partially for lateral chromatic aberration; and (v) having at least two elements made of plastic materials differing in dispersive powers.

5. The lens system of claim 4 wherein:

(A) the overall axial length from the lens system's first surface vertex to the focal point in image space does not exceed about 1.030 times $f_0$, external attachments excluded, for an object at infinity; and (B) the overall axial length from the lens system's first surface vertex to the conjugate focus in image space does not exceed about 1.365 times $f_0$, external attachments excluded, for object distances down to but not less than about 4 times $f_0$.

6. The lens system of claim 5 wherein the overall axial length from the lens system's first surface vertex to its rear surface vertex does not exceed about 0.165 $f_0$, external attachments excluded.

7. The lens system of claim 1, 2, 3, 4, 5, or 6 wherein the first group consists of a single element.

8. The lens system of claim 1, 2, 3, 4, 5, or 6 wherein the single component of the second group has an aspheric surface.

9. The lens system of claim 1, 2, 3, 4, 5, or 6 wherein the forward surface of the single component of the second group is convex in the direction of the stop or aperture.

10. The lens system of claim 1 having at least two elements made of plastic materials differing in dispersive powers.

11. The lens system of claim 1 having the following prescription:

| Surface No. | Radii    | Separations | n(d)  | nu   |
|-------------|----------|-------------|-------|------|
| 1           | 0.1369   | 0.0604      | 1.492 | 57.2 |
| 2           | 0.1314*  | 0.0257      |       |      |
| 3           | Stop     | 0.0380      |       |      |
| 4           | 0.843    | 0.0203      | 1.592 | 30.8 |
| 5           | −18.18*  | 0.817**     |       |      | overall length = 0.9614;
48.9°, infinite object distance
f = 1.000
*aspheric
**back focus, inf. obj. dist. (to focal point)

Aspheric Surface Data:

| Surface | A | B | C | D |
|---|---|---|---|---|
| 2 | $0.345 \times 10^2$ | $0.121 \times 10^0$ | $0.180 \times 10^{-3}$ | $0.277 \times 10^{+1}$ |
| 4 | $-0.481 \times 10^0$ | $-0.108 \times 10^4$ | $-0.351 \times 10^{-2}$ | $-0.609 \times 10^{-5}$ |

12. The lens system of claim 1 having the following prescription:

| Surface No. | Radii    | Separations | n(d)  | nu   |
|-------------|----------|-------------|-------|------|
| 1           | 0.1363   | 0.0221      | 1.516 | 64.1 |
| 2           | 0.1631   | 0.0010      |       |      |
| 3           | 0.1664   | 0.0374      | 1.492 | 57.2 |
| 4           | 0.1315*  | 0.0257      |       |      |
| 5           | Stop     | 0.0381      |       |      |
| 6           | 0.8440   | 0.0203      | 1.592 | 30.8 |
| 7           | −18.19*  | 0.817**     |       |      |

OAL = 0.9616; 48.9°, inf. obj. distance
f = 1.000
*aspheric
**back focus, inf. obj. dist. (to focal point)

Aspheric Surface Data:

| Surface | A | B | C | D |
|---|---|---|---|---|
| 4 | $0.354 \times 10^2$ | $0.136 \times 10^0$ | $0.725 \times 10^{-3}$ | $0.275 \times 10^{+1}$ |
| 7 | $-0.479 \times 10^0$ | $-0.108 \times 10^4$ | $-0.349 \times 10^{-2}$ | $-0.605 \times 10^{-5}$ |

13. The lens system of claim 1 having the following prescription:

| Surface No. | Radii   | Separations | n(d)  | nu   |
|-------------|---------|-------------|-------|------|
| 1           | 0.1351  | 0.0610      | 1.492 | 57.2 |
| 2           | 0.1297* | 0.0260      |       |      |
| 3           | Stop    | 0.0384      |       |      |
| 4           | 0.7628  | 0.0205      | 1.586 | 29.9 |
| 5           | 10.50*  | 0.811**     |       |      |

OAL = 0.9569; 49.4°, inf. obj. distance
f = 1.000
*aspheric
**back focus, inf. obj. dist. (to focal point)

Aspheric Surface Data:

| Surface | A | B | C | D |
|---|---|---|---|---|
| 2 | $0.370 \times 10^2$ | $0.115 \times 10^0$ | $0.167 \times 10^{-3}$ | $0.252 \times 10^{+1}$ |

-continued

| | | | | |
|---|---|---|---|---|
| 5 | $-0.676 \times 10^0$ | $-0.102 \times 10^4$ | $-0.326 \times 10^{-2}$ | $-0.554 \times 10^{-5}$ |

14. The lens system of claim 1 having the following prescription:

| Surface No. | Radii | Separations | n(d) | nu |
|---|---|---|---|---|
| 1 | 0.1378 | 0.0223 | 1.516 | 64.1 |
| 2 | 0.1650 | 0.0010 | | |
| 3 | 0.1670 | 0.0378 | 1.492 | 57.2 |
| 4 | 0.1332* | 0.0260 | | |
| 5 | Stop | 0.0385 | | |
| 6 | 0.8694 | 0.0205 | 1.586 | 29.9 |
| 7 | −18.44* | 0.814** | | |

OAL = 0.9601; 49.4°, inf. obj. distance
f = 1.000
*aspheric
**back focus, inf. obj. dist. (to focal point)
Aspheric Surface Data:

| Surface | A | B | C | D |
|---|---|---|---|---|
| 4 | $0.346 \times 10^2$ | $0.129 \times 10^0$ | $0.671 \times 10^{-3}$ | $0.249 \times 10^{+1}$ |
| 7 | $-0.695 \times 10^0$ | $-0.943 \times 10^3$ | $-0.323 \times 10^{-2}$ | $-0.548 \times 10^{-5}$ |

15. The lens system of claim 1 having the following prescription:

| Surface No. | Radii | Separations | n(d) | nu |
|---|---|---|---|---|
| 1 | 0.1442 | 0.0627 | 1.492 | 57.2 |
| 2 | 0.1448* | 0.0295 | | |
| 3 | Stop | 0.0438 | | |
| 4 | 1.1082 | 0.0151 | 1.586 | 29.9 |
| 5 | −7.201* | 0.811** | | |

OAL = 0.9621; 62°, inf. obj. distance
f = 1.000
*aspheric
**back focus, inf. obj. dist. (to focal point)
Aspheric Surface Data:

| Surface | A | B | C | D |
|---|---|---|---|---|
| 2 | $0.323 \times 10^2$ | $0.117 \times 10^0$ | $0.167 \times 10^{-3}$ | $0.253 \times 10^{+1}$ |
| 5 | $-0.136 \times 10^0$ | $-0.439 \times 10^3$ | $-0.327 \times 10^{-2}$ | $-0.556 \times 10^{-5}$ |

16. The lens system of claim 1 having the following prescription:

| Surface No. | Radii | Separations | n(d) | nu |
|---|---|---|---|---|
| 1 | 0.1659 | 0.0339 | 1.621 | 60.3 |
| 2 | 0.2070 | 0.0011 | | |
| 3 | 0.2092 | 0.0161 | 1.492 | 57.2 |
| 4 | 0.1511* | 0.0416 | | |
| 5 | Stop | 0.0410 | | |
| 6 | −0.5831 | 0.0218 | 1.586 | 29.9 |
| 7 | −0.3173* | 0.874** | | |

OAL = 1.0295; 52.2°, inf. obj. distance
f = 1.000
*aspheric
**back focus, inf. obj. dist. (to focal point)
Aspheric Surface Data:

| Surface | A | B | C | D |
|---|---|---|---|---|
| 4 | $0.281 \times 10^2$ | $0.234 \times 10^0$ | $0.453 \times 10^{-3}$ | $0.225 \times 10^{-11}$ |
| 7 | $-0.439 \times 10^1$ | $-0.877 \times 10^3$ | $-0.247 \times 10^{-1}$ | $-0.489 \times 10^{-8}$ |

17. The lens system of claim 1 having the following prescription:

| Surface No. | Radii | Separations | n(d) | nu |
|---|---|---|---|---|
| 1 | 0.1351 | 0.0610 | 1.492 | 57.2 |
| 2 | 0.1297* | 0.0260 | | |
| 3 | Stop | 0.0128 | | |
| 4 | −266.1* | 0.0128 | 1.492 | 57.2 |
| 5 | Plano | 0.0119 | | |
| 6 | 0.7628 | 0.0205 | 1.586 | 29.9 |
| 7 | 10.50* | 0.813** | | |

-continued

OAL = 0.9583; 49.4°, inf. obj. distance
f = 1.000
*aspheric
**back focus, inf. obj. dist. (to focal point)

Aspheric Surface Data:

| Surface | A | B | C | D |
|---|---|---|---|---|
| 2 | $0.370 \times 10^2$ | $0.115 \times 10^0$ | $0.167 \times 10^{-3}$ | $0.252 \times 10^{+1}$ |
| 4 | $0.532 \times 10^1$ | $0.211 \times 10^0$ | $0.135 \times 10^{-2}$ | $0.148 \times 10^{-4}$ |
| 7 | $-0.676 \times 10^0$ | $-0.102 \times 10^4$ | $-0.326 \times 10^{-2}$ | $-0.554 \times 10^{-8}$ |

18. The lens system of claim 1 having the following prescription:

| Surface No. | Radii | Separations | n(d) | nu |
|---|---|---|---|---|
| 1 | 0.2856 | 0.0171 | 1.492 | 57.2 |
| 2 | 0.3313 | 0.0453 | | |
| 3 | 0.1351 | 0.0610 | 1.492 | 57.2 |
| 4 | 0.1297* | 0.0260 | | |
| 5 | Stop | 0.0384 | | |
| 6 | 0.7628 | 0.0205 | 1.586 | 29.9 |
| 7 | 10.50* | 0.8855** | | | f = 1.000
*aspheric
**back focus (to image surface, close up object distance = 3.075f$_0$)

Aspheric Surface Data:

| Surface | A | B | C | D |
|---|---|---|---|---|
| 4 | $0.370 \times 10^2$ | $0.115 \times 10^0$ | $0.167 \times 10^{-3}$ | $0.252 \times 10^{+1}$ |
| 7 | $-0.676 \times 10^0$ | $-0.102 \times 10^4$ | $-0.326 \times 10^{-2}$ | $-0.554 \times 10^{-8}$ |

* * * * *